(12) United States Patent
Noguchi et al.

(10) Patent No.: US 12,206,467 B2
(45) Date of Patent: Jan. 21, 2025

(54) WIRELESS CONNECTOR ATTACHING AND DETACHING METHOD, ROBOT DEVICE, WIRELESS CONNECTOR, AND WIRELESS CONNECTOR UNIT

(71) Applicant: Japan Aviation Electronics Industry, Limited, Tokyo (JP)

(72) Inventors: Hideyuki Noguchi, Tokyo (JP); Hiromasa Tanaka, Tokyo (JP); Yuuri Nakamura, Tokyo (JP); Masayoshi Yoneda, Tokyo (JP); Takahiro Iijima, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 343 days.

(21) Appl. No.: 17/916,446

(22) PCT Filed: Mar. 9, 2021

(86) PCT No.: PCT/JP2021/009215
§ 371 (c)(1),
(2) Date: Sep. 30, 2022

(87) PCT Pub. No.: WO2022/009472
PCT Pub. Date: Jan. 13, 2022

(65) Prior Publication Data
US 2023/0144692 A1 May 11, 2023

(30) Foreign Application Priority Data
Jul. 7, 2020 (JP) .................................. 2020-117092

(51) Int. Cl.
*H04B 5/79* (2024.01)
*H01Q 1/24* (2006.01)
(Continued)

(52) U.S. Cl.
CPC ............... *H04B 5/79* (2024.01); *H01Q 1/248* (2013.01); *H02J 50/005* (2020.01); *H02J 50/10* (2016.02); *H02J 50/40* (2016.02)

(58) Field of Classification Search
CPC ... H04B 5/79; H02J 50/10; H02J 50/40; H02J 50/005; H01Q 1/248
(Continued)

(56) References Cited

U.S. PATENT DOCUMENTS

2010/0178135 A1 7/2010 Laceky et al.
2011/0018667 A1 1/2011 Jaeger et al.
(Continued)

FOREIGN PATENT DOCUMENTS

EP 2 113 930 A2 11/2009
JP S51-047852 U 4/1976
(Continued)

OTHER PUBLICATIONS

International Search Report in PCT/JP2021/009215, dated Apr. 27, 2021.
(Continued)

*Primary Examiner* — Alfonso Perez Borroto
(74) *Attorney, Agent, or Firm* — Collard & Roe, P.C.

(57) ABSTRACT

A wireless connector is composed of a pair of units. Each unit includes an annular transmission/reception unit which is provided with a coil used to wirelessly transmit electric power, and formed of a plurality of coil parts, and a main connector portion which is detachably attached to an object from the outside of the object to transmit the electric power to the object. Each unit is assembled such that each unit can be divided into a plurality of non-annular pieces so that the coil can be formed by coupling the plurality of coil parts via a plurality of connectors for coil. When one of the transmission/reception units is attached to the object, the one of (Continued)

the transmission/reception units is arranged so as to oppose the other one of the transmission/reception units in a non-contact manner such that electric power can be wirelessly transmitted therebetween.

44 Claims, 35 Drawing Sheets

(51) Int. Cl.
  *H02J 50/00* (2016.01)
  *H02J 50/10* (2016.01)
  *H02J 50/40* (2016.01)
(58) Field of Classification Search
  USPC .......................................................... 307/104
  See application file for complete search history.

(56) References Cited

U.S. PATENT DOCUMENTS

| 2015/0279555 | A1* | 10/2015 | Chiyo ................... H02J 50/402 |
| | | | 307/104 |
| 2015/0280447 | A1 | 10/2015 | Akuzawa et al. |
| 2016/0233687 | A1* | 8/2016 | McKernan .............. H02J 50/10 |
| 2018/0062432 | A1 | 3/2018 | Zhao et al. |
| 2018/0102213 | A1 | 4/2018 | Hanabusa et al. |
| 2018/0269709 | A1 | 9/2018 | White, II et al. |
| 2019/0044387 | A1 | 2/2019 | Takikawa et al. |
| 2022/0149660 | A1* | 5/2022 | Miyamoto ............ H02J 50/402 |
| 2022/0149668 | A1* | 5/2022 | Matsumoto ........... H04L 25/085 |
| 2022/0224159 | A1* | 7/2022 | Matsumoto ............. H02J 50/05 |

FOREIGN PATENT DOCUMENTS

| JP | S58-077032 U | 5/1983 |
| JP | S59-121814 U | 8/1984 |
| JP | 2006-049629 A | 2/2006 |
| JP | 2008-518527 A | 5/2008 |
| JP | 2012-514544 A | 6/2012 |
| JP | 2014-090648 A | 5/2014 |
| JP | 2017-070119 A | 4/2017 |
| JP | 2018-064002 A | 4/2018 |
| JP | 2018-512830 A | 5/2018 |
| WO | 2017/141378 A1 | 8/2017 |

OTHER PUBLICATIONS

Japanese Office Action in JP 2020-117092, dated Apr. 16, 2021, with Machine translation.

* cited by examiner

WIRELESS CONNECTOR ATTACHING AND DETACHING METHOD, ROBOT DEVICE, WIRELESS CONNECTOR, AND WIRELESS CONNECTOR UNIT

CROSS REFERENCE TO RELATED APPLICATIONS

This application is the National Stage of PCT/JP2021/009215 filed on Mar. 9, 2021, which claims priority under 35 U.S.C. § 119 of Japanese Application No. 2020-117092 filed on Jul. 7, 2020, the disclosure of which is incorporated by reference. The international application under PCT article 21(2) was not published in English.

TECHNICAL FIELD

The invention relates to a wireless connector attaching and detaching method, a robot device, a wireless connector, and a wireless connector unit.

BACKGROUND TECHNOLOGY

Technology for supplying electric power wirelessly to a load is known. Hereinafter, such a technique is referred to as a "wireless power supply technique". The wireless power supply technique is applied to industrial robots or the like. For example, Patent Document 1 discloses an example of a robot arm device as shown in FIG. 36A. The illustrated robot arm device comprises first to sixth joint portions J1 to J6. The second and fourth joint portions J2 and J4 are provided with first and second wireless power supply units IHU2 and IHU4, respectively. The first and the second wireless power supply units IHU2 and IHU4 wirelessly transmit electric power at the second and the fourth joint portions J2 and J4 via a pair of coils, respectively.

The above-mentioned Patent Document 1 also discloses a configuration of a part of a wireless power transmission system as shown in FIG. 36B. The illustrated wireless power transmission system is provided with a wireless power supply unit 1, a power source device 2, and a load 3. The wireless power supply unit 1 is disposed between the power source device 2 and the load 3. The wireless power supply unit 1 corresponds to the above-mentioned first wireless power supply unit IHU2. The wireless power supply unit 1 is provided with a power transmission device 10 and a reception device 20, as shown in FIG. 36B. The power transmission device 10 is provided with a power transmission antenna 11 including a coil or the like, an inverter circuit 13, and a power transmission control circuit 15. The reception device 20 is provided with a power receiving antenna 21 including a coil or the like, and a rectifying circuit 23.

PRIOR ART DOCUMENT

Patent Document

Patent Document 1: JP 2018-117511 A

SUMMARY OF THE INVENTION

Problem to be Solved by the Invention

In general, a coil for wirelessly transmitting and receiving electric power often generates heat during operation. Therefore, the wireless power supply unit 1 may fail due to disconnection or the like resulting from heat generation of the coil. Such a failure in the wireless power supply unit 1 may interfere with the operation of the robot arm device. Accordingly, it is desirable that the wireless power supply unit 1 can quickly be repaired by replacement or the like.

Patent Document 1 does not disclose how the second and the fourth joint portions J2 and J4 are provided with the wireless power supply unit 1, such as an arrangement of the pair of coils. Further, in the robot arm device described in Patent Document 1, it is conceivable to apply the wireless power supply unit 1 not only to the second and the fourth joint portions J2 and J4 but also to the first and the fifth joint portions J1 and J5. However, Patent Document 1 does not disclose application of the wireless power supply unit 1 to the first and the fifth joint portions J1 and J5 at all. Therefore, it is difficult to obtain a wireless power supply unit that can quickly be repaired even if Patent Document 1 is referred to.

The present invention has been made in view of the above-mentioned situation, and an object thereof is to provide a wireless connector capable of being quickly repaired.

Means for Solving the Problem

In order to achieve the above-mentioned object, according to a first aspect of the present invention, there is provided a wireless connector attaching and detaching method for attaching and detaching a wireless connector to and from a first object and a second object which are rotatably connected around a rotation axis, the wireless connector being configured to wirelessly transmit electric power between the first object and the second object, wherein:

the wireless connector includes:
a first unit including a first transmission/reception unit provided with a first coil configured to wirelessly transmit the electric power and composed of a plurality of first coil parts which are separable from each other or which are separable at one position and bendable with respect to each other; and a first main connector portion configured to transmit the electric power to/from the first object; and
a second unit including a second transmission/reception unit provided with a second coil configured to wirelessly transmit the electric power to/from the first coil and composed of a plurality of second coil parts which are separable from each other or which are separable at one position and bendable with respect to each other; and a second main connector portion configured to transmit the electric power to/from the second object;
the first transmission/reception unit being configured to be openable and closable, and configured to be annular when the first transmission/reception unit is closed so that the first coil is formed by connecting the plurality of first coil parts via one or a plurality of first coil connectors;
the second transmission/reception unit being configured to be openable and closable, and configured to be annular when the second transmission/reception unit is closed so that the second coil is formed by connecting the plurality of second coil parts via one or a plurality of second coil connectors,
the wireless connector attaching and detaching method including:
a step of attaching the wireless connector to the first object and the second object in a state where the first transmission/reception unit and the second transmission/ reception unit are faced to each other in a non-contact manner so as to wirelessly transmit the electric power; and a step of detaching the wireless connector from the first object and the second object;

the step of attaching including:

a step of fitting the one or the plurality of first coil connectors from the outside of the first object so that the first transmission/reception unit is disposed in a closed annular shape so as to surround the rotation axis and that the first main connector portion is attached to the first object; and a step of fitting the one or the plurality of second coil connectors from the outside of the second object so that the second transmission/reception unit is disposed in a closed annular shape so as to surround the rotation axis and that the second main connector portion is attached to the second object;

the step of detaching including:

a step of releasing fitting of the one or the plurality of first coil connectors by work outside the first object so that the first transmission/reception unit is put into an open state and that the first main connector portion is detached from the first object; and a step of releasing fitting of the one or the plurality of second coil connectors by work outside the second object so that the second transmission/reception unit is put into an open state and that the second main connector portion is detached from the second object.

The first coil may comprise the plurality of first coil parts separable from each other.

The second coil may comprise the plurality of second coil parts separable from each other.

The first transmission/reception unit may be configured to be separable at a plurality of positions to be openable and closable and configured to be annular when the first transmission/reception unit is closed so that the first coil is formed by connecting the plurality of first coil parts via the plurality of first coil connectors.

The first unit may be assembled to be divisible into first to i-th primary pieces (i being an integer not smaller than 2), which are not annular, so that the first coil is separated into the plurality of first coil parts by releasing fitting of the plurality of first coil connectors.

The second transmission/reception unit may be configured to be separable at a plurality of positions to be openable and closable and configured to be annular when the second transmission/reception unit is closed so that the second coil is formed by connecting the plurality of second coil parts via the plurality of second coil connectors.

The second unit may be assembled to be divisible into first to j-th secondary pieces (j being an integer not smaller than 2), which are not annular, so that the second coil is separated into the plurality of second coil parts by releasing fitting of the plurality of second coil connectors.

The step of attaching may include:

a step of fitting the plurality of first coil connectors from the outside of the first object so that the first transmission/reception unit is disposed in a closed annular shape so as to surround the rotation axis and that the first main connector portion is attached to the first object; and a step of fitting the plurality of second coil connectors from the outside of the second object so that the second transmission/reception unit is disposed in a closed annular shape so as to surround the rotation axis and that the second main connector portion is attached to the second object.

The first coil may comprise the plurality of first coil parts which are separable at one position and bendable with respect to each other.

The second coil may comprise the plurality of second coil parts which are separable at one position and bendable with respect to each other.

The first unit may include:

first to i-th primary pieces (i being an integer not smaller than 2) which are not annular and which include, respectively, the plurality of first coil parts bendable with respect to each other; and a first connecting mechanism for connecting adjacent ones of the first to the i-th primary pieces so that the first coil is opened in a state of being bent into the plurality of first coil parts by releasing fitting of the one first coil connector.

The second unit may include:

first to j-th secondary pieces (j being an integer not smaller than 2) which are not annular and which include, respectively, the plurality of second coil parts bendable with respect to each other; and a second connecting mechanism for connecting adjacent ones of the first to the j-th secondary pieces so that the second coil is opened in a state of being bent into the plurality of second coil parts by releasing fitting of the one second coil connector.

In order to achieve the above-mentioned object, according to a second aspect of the present invention, there is provided a robot device including:

a first object and a second object which are connected to each other to be rotatable around a rotation axis; and a wireless connector for wirelessly transmitting electric power between the first object and the second object;

wherein the first object includes a first mating connector portion exposed to the outside;

wherein the second object includes a second mating connector portion exposed to the outside;

wherein the wireless connector comprises:

a first unit including:

a first transmission/reception unit provided with a first coil configured to wirelessly transmit the electric power and composed of a plurality of first coil parts which are separable from each other or which are separable at one position and bendable with respect to each other; and a first main connector portion connected to the first mating connector portion in order to transmit the electric power to/from the first object;

a second unit including:

a second transmission/reception unit provided with a second coil configured to transmit the electric power to/from the first coil and composed of a plurality of second coil parts which are separable from each other or which are separable at one position and bendable with respect to each other; and a second main connector portion connected to the second mating connector portion in order to transmit the electric power to/from the second object;

wherein the first transmission/reception unit is configured to be openable and closable and configured to be annular when the first transmission/reception unit is closed so that the first coil is formed by connecting the plurality of first coil parts via one or a plurality of first coil connectors;

wherein the second transmission/reception unit is configured to be openable and closable and configured to be annular when the second transmission/reception unit is closed so that the second coil is formed by connecting the plurality of second coil parts via one or a plurality of second coil connectors;

wherein the first transmission/reception unit and the second transmission/reception unit are arranged, when the first unit and the second unit are attached to the first object and the second object, respectively, each in a closed annular state and in a state of being faced to each other in a non-contact manner so as to transmit the electric power outside the first object and the second object.

The first coil may comprise the plurality of first coil parts separable from each other.

The second coil may comprise the plurality of second coil parts separable from each other.

The first transmission/reception unit may be configured to be separable at a plurality of positions to be openable and closable and configured to be annular when the first transmission/reception unit is closed so that the first coil is formed by connecting the plurality of first coil parts via the plurality of first coil connectors.

The first unit may be assembled to be divisible into first to i-th primary pieces (i being an integer not smaller than 2), which are not annular, so that the first coil is separated into the plurality of first coil parts by releasing fitting of the plurality of first coil connectors.

The second transmission/reception unit may be configured to be separable at a plurality of positions to be openable and closable and configured to be annular when the second transmission/reception unit is closed so that the second coil is formed by connecting the plurality of second coil parts via the plurality of second coil connectors.

The second unit may be assembled to be divisible into first to j-th secondary pieces (j being an integer not smaller than 2), which are not annular, so that the second coil is separated into the plurality of second coil parts by releasing fitting of the plurality of second coil connectors.

The first coil may comprise the plurality of first coil parts which are separable at one position and bendable with respect to each other.

The second coil may comprise the plurality of second coil parts which are separable at one position and bendable with respect to each other.

The first unit may include:
first to i-th primary pieces (i being an integer not smaller than 2) which are not annular and which include, respectively, the plurality of first coil parts bendable with respect to each other; and
a first connecting mechanism for connecting adjacent ones of the first to the i-th primary pieces so that the first coil is opened in a state of being bent into the plurality of first coil parts by releasing fitting of the one first coil connector.

The second unit may include:
first to j-th secondary pieces (j being an integer not smaller than 2) which are not annular and which include, respectively, the plurality of second coil parts bendable with respect to each other; and
a second connecting mechanism for connecting adjacent ones of the first to the j-th secondary pieces so that the second coil is opened in a state of being bent into the plurality of second coil parts by releasing fitting of the one second coil connector.

The wireless connector may be attached to a recess formed at a connecting part of the first object and the second object so as not to protrude outward beyond the first object and the second object when viewed along the rotation axis.

In order to achieve the above-mentioned object, according to a third aspect of the present invention, there is provided a wireless connector for wirelessly transmitting electric power between a first object and a second object, the wireless connector including:
a first unit detachably attached to the first object from the outside of the first object; and
a second unit detachably attached to the second object from the outside of the second object;
wherein the first unit includes:
a first transmission/reception unit provided with a first coil configured to wirelessly transmit the electric power and composed of a plurality of first coil parts which are separable from each other or which are separable at one position and bendable with respect to each other; and
a first main connector portion for transmitting the electric power to/from the first object by being detachably attached to the first object from the outside of the first object;
wherein the second unit includes:
a second transmission/reception unit provided with a second coil configured to wirelessly transmit the electric power to/from the first coil of the first transmission/reception unit and composed of a plurality of second coil parts which are separable from each other or which are separable at one position and bendable with respect to each other; and
a second main connector portion for transmitting the electric power to/from the second object by being detachably attached to the second object from the outside of the second object;
wherein the first transmission/reception unit is configured to be openable and closable and configured to be annular when the first transmission/reception unit is closed so that the first coil is formed by connecting the plurality of first coil parts via one or a plurality of first coil connectors;
wherein the second transmission/reception unit is configured to be openable and closable and configured to be annular when the second transmission/reception unit is closed so that the second coil is formed by connecting the plurality of second coil parts via one or a plurality of second coil connectors;
wherein the first transmission/reception unit and the second transmission/reception unit are arranged, when the first unit and the second unit are attached to the first object and the second object, respectively, each in a closed annular state and in a state of being faced to each other in a non-contact manner so as to wirelessly transmit the electric power.

The first coil may comprise the plurality of first coil parts separable from each other.

The second coil may comprise the plurality of second coil parts separable from each other.

The first transmission/reception unit may be configured to be separable at a plurality of positions to be openable and closable and configured to be annular when the first transmission/reception unit is closed so that the first coil is formed by connecting the plurality of first coil parts via the plurality of first coil connectors.

The first unit may be assembled to be divisible into first to i-th primary pieces (i being an integer not smaller than 2), which are not annular, so that the first coil is separated into the plurality of first coil parts by releasing fitting of the plurality of first coil connectors.

The second transmission/reception unit may be configured to be separable at a plurality of positions to be openable and closable and configured to be annular when the second transmission/reception unit is closed so that the second coil is formed by connecting the plurality of second coil parts via the plurality of second coil connectors.

The second unit may be assembled to be divisible into first to j-th secondary pieces (j being an integer not smaller than 2), which are not annular, so that the second coil is separated into the plurality of second coil parts by releasing fitting of the plurality of second coil connectors.

The first coil may comprise the plurality of first coil parts which are separable at one position and bendable with respect to each other.

The second coil may comprise the plurality of second coil parts which are separable at one position and bendable with respect to each other.

The first unit may include:
first to i-th primary pieces (i being an integer not smaller than 2) which are not annular and which include, respectively, the plurality of first coil parts bendable with respect to each other; and
a first connecting mechanism for connecting adjacent ones of the first to the i-th primary pieces so that the first coil is opened in a state of being bent into the plurality of first coil parts by releasing fitting of the one first coil connector.

The second unit may include:
first to j-th secondary pieces (j being an integer not smaller than 2) which are not annular and which include, respectively, the plurality of second coil parts bendable with respect to each other; and
a second connecting mechanism for connecting adjacent ones of the first to the j-th secondary pieces so that the second coil is opened in a state of being bent into the plurality of second coil parts by releasing fitting of the one second coil connector.

In order to achieve the above-mentioned object, according to a fourth aspect of the present invention, there is provided a wireless connector for wirelessly transmitting electric power between a first object and a second object; the wireless connector including:
a first unit detachably attached to the first object from the outside of the first object; and
a second unit detachably attached to the second object from the outside of the second object;
wherein the first unit includes:
a first transmission/reception unit provided with a first coil configured to wirelessly transmit the electric power and composed of a plurality of first coil parts which are separable from each other or which are separable at one position and bendable with respect to each other; and
a first main connector portion for transmitting the electric power to/from the first object by being detachably attached to the first object from the outside of the first object;
wherein the second unit includes:
a second transmission/reception unit provided with a second coil configured to wirelessly transmit the electric power to/from the first coil of the first transmission/reception unit and composed of a plurality of second coil parts which are separable from each other or which are separable at one position and bendable with respect to each other; and a second main connector portion for transmitting the electric power to/from the second object by being detachably attached to the second object from the outside of the second object;
wherein the first transmission/reception unit is configured to be openable and closable and configured to be annular when the first transmission/reception unit is closed so that the first coil is formed by connecting the plurality of first coil parts via one or a plurality of first coil connectors;
wherein the second transmission/reception unit is configured to be openable and closable and configured to be annular when the second transmission/reception unit is closed so that the second coil is formed by connecting the plurality of second coil parts via one or a plurality of second coil connectors;
wherein the first coil and the second coil are arranged, when the first unit and the second unit are attached to the first object and the second object, respectively, each in a closed annular state and in parallel to each other in a state of being faced to each other in a non-contact manner so as to wirelessly transmit the electric power.

The first coil may comprise the plurality of first coil parts separable from each other.

The second coil may comprise the plurality of second coil parts separable from each other.

The first transmission/reception unit may be configured to be separable at a plurality of positions to be openable and closable and configured to be annular when the first transmission/reception unit is closed so that the first coil is formed by connecting the plurality of first coil parts via the plurality of first coil connectors.

The first unit may be assembled to be divisible into first to i-th primary pieces (i being an integer not smaller than 2), which are not annular, so that the first coil is separated into the plurality of first coil parts by releasing fitting of the plurality of first coil connectors.

The second transmission/reception unit may be configured to be separable at a plurality of positions to be openable and closable and configured to be annular when the second transmission/reception unit is closed so that the second coil is formed by connecting the plurality of second coil parts via the plurality of second coil connectors.

The second unit may be assembled to be divisible into first to j-th secondary pieces (j being an integer not smaller than 2), which are not annular, so that the second coil is separated into the plurality of second coil parts by releasing fitting of the plurality of second coil connectors.

The first coil may comprise the plurality of first coil parts which are separable at one position and bendable with respect to each other.

The second coil may comprise the plurality of second coil parts which are separable at one position and bendable with respect to each other.

The first unit may include:
first to i-th primary pieces (i being an integer not smaller than 2) which are not annular and which include, respectively, the plurality of first coil parts bendable with respect to each other; and
a first connecting mechanism for connecting adjacent ones of the first to the i-th primary pieces so that the first coil is opened in a state of being bent into the plurality of first coil parts by releasing fitting of the one first coil connector.

The second unit may include:
first to j-th secondary pieces (j being an integer not smaller than 2) which are not annular and which include, respectively, the plurality of second coil parts bendable with respect to each other; and a second connecting mechanism for connecting adjacent ones of the first to the j-th secondary pieces so that the second coil is opened in a state of being bent into the plurality of second coil parts by releasing fitting of the one second coil connector.

In order to achieve the above-mentioned object, according to a fifth aspect of the present invention, there is provided a wireless connector for wirelessly transmitting electric power between a first object and a second object, the wireless connector including:

a first unit detachably attached to the first object from the outside of the first object; and a second unit detachably attached to the second object from the outside of the second object;

wherein the first unit includes:

a first transmission/reception unit provided with a first coil configured to wirelessly transmit the electric power and composed of a plurality of first coil parts which are separable from each other or which are separable at one position and bendable with respect to each other; and a first main connector portion for transmitting the electric power to/from the first object by being detachably attached to the first object from the outside of the first object;

wherein the second unit includes:

a second transmission/reception unit provided with a second coil configured to wirelessly transmit the electric power to/from the first coil of the first transmission/reception unit and composed of a plurality of second coil parts which are separable from each other or which are separable at one position and bendable with respect to each other; and a second main connector portion for transmitting the electric power to/from the second object by being detachably attached to the second object from the outside of the second object;

wherein the first transmission/reception unit is configured to be openable and closable and configured to be annular when the first transmission/reception unit is closed so that the first coil is formed by connecting the plurality of first coil parts via one or a plurality of first coil connectors;

wherein the second transmission/reception unit is configured to be openable and closable and configured to be annular when the second transmission/reception unit is closed so that the second coil is formed by connecting the plurality of second coil parts via one or a plurality of second coil connectors;

wherein the first coil and the second coil are arranged, when the first unit and the second unit are attached to the first object and the second object, respectively, each in a closed annular state and in parallel to each other in a state of being faced to each other in a non-contact manner so as to be magnetically coupled to each other.

The first coil may comprise the plurality of first coil parts separable from each other.

The second coil may comprise the plurality of second coil parts separable from each other.

The first transmission/reception unit may be configured to be separable at a plurality of positions to be openable and closable and configured to be annular when the first transmission/reception unit is closed so that the first coil is formed by connecting the plurality of first coil parts via the plurality of first coil connectors.

The first unit may be assembled to be divisible into first to i-th primary pieces (i being an integer not smaller than 2), which are not annular, so that the first coil is separated into the plurality of first coil parts by releasing fitting of the plurality of first coil connectors.

The second transmission/reception unit may be configured to be separable at a plurality of positions to be openable and closable and configured to be annular when the second transmission/reception unit is closed so that the second coil is formed by connecting the plurality of second coil parts via the plurality of second coil connectors.

The second unit may be assembled to be divisible into first to j-th secondary pieces (j being an integer not smaller than 2), which are not annular, so that the second coil is separated into the plurality of second coil parts by releasing fitting of the plurality of second coil connectors.

The first coil may comprise the plurality of first coil parts which are separable at one position and bendable with respect to each other.

The second coil may comprise the plurality of second coil parts which are separable at one position and bendable with respect to each other.

The first unit may include:

first to i-th primary pieces (i being an integer not smaller than 2) which are not annular and which include, respectively, the plurality of first coil parts bendable with respect to each other; and a first connecting mechanism for connecting adjacent ones of the first to the i-th primary pieces so that the first coil is opened in a state of being bent into the plurality of first coil parts by releasing fitting of the one first coil connector.

The second unit may include:

first to j-th secondary pieces (j being an integer not smaller than 2) which are not annular and which include, respectively, the plurality of second coil parts bendable with respect to each other; and a second connecting mechanism for connecting adjacent ones of the first to the j-th secondary pieces so that the second coil is opened in a state of being bent into the plurality of second coil parts by releasing fitting of the one second coil connector.

The first object and the second object may be connected to each other to be rotatable around a rotation axis.

Each of the first transmission/reception unit and the second transmission/reception unit may form, in a closed state, a circular annular shape having a through-hole centered on the rotation axis or a polygonal annular shape having the through-hole.

The first object and the second object may be connected to each other to be rotatable around a rotation axis.

Each of the first coil and the second coil may be arranged, in a state where each of the first transmission/reception unit and the second transmission/reception unit is closed, in a circular annular region having a through-hole centered on the rotation axis or a polygonal annular region having the through-hole.

The first object and the second object may be connected to each other to be rotatable around a rotation axis.

Each of the first transmission/reception unit and the second transmission/reception unit may form, in a closed state, a circular disk shape having a through-hole centered on the rotation axis.

Each of the first coil and the second coil may form a spiral shape in a state where each of the first transmission/reception unit and the second transmission/reception unit is closed.

The first transmission/reception unit may include:
the first coil which is openable at least at one position so that the first coil is formed by connecting the plurality of first coil parts via the one or the plurality of first coil connectors; and
a first holding portion which has one main surface provided with the first coil and which is separable at a position common to the first coil.

The second transmission/reception unit may include:
the second coil which is openable at least at one position so that the second coil is formed by connecting the plurality of second coil parts via the one or the plurality of second coil connectors; and
a second holding portion which has one main surface provided with the second coil and which is separable at a position common to the second coil.

The one main surface of the first holding portion and the one main surface of the second holding portion may be those surfaces of the first holding portion and the second holding portion which are close to each other.

The first transmission/reception unit may include:
the first coil which is openable at least at one position so that the first coil is formed by connecting the plurality of first coil parts via the one or the plurality of first coil connectors; and
a first holding portion which accommodates the first coil and which is separable at a position common to the first coil.

The second transmission/reception unit may include:
the second coil which is openable at least at one position so that the second coil is formed by connecting the plurality of second coil parts via the one or the plurality of second coil connectors; and
a second holding portion which accommodates the second coil and which is separable at a position common to the second coil.

The first object and the second object may be connected to each other to be rotatable around a rotation axis.

Each of the first transmission/reception unit and the second transmission/reception unit may have, in a closed state, a cylindrical shape having a through-hole centered on the rotation axis.

Each of the first transmission/reception unit and the second transmission/reception unit may have, in the closed state, a circular cylindrical shape.

Each of the first coil and the second coil may have a spiral shape along the rotation axis in a state where each of the first transmission/reception unit and the second transmission/reception unit is closed.

The first transmission/reception unit and the second transmission/reception unit may be configured so that, when attached to the first object and the second object, respectively, the first transmission/reception unit and the second transmission/reception unit are spaced from each other along the rotation axis in the closed state.

The first transmission/reception unit may include:
the first coil which is openable at least at one position so that the first coil is formed by connecting the plurality of first coil parts via the one or the plurality of first coil connectors; and
a first holding portion of a cylindrical shape which is provided with the first coil on an inner surface or an outer surface thereof and which is separable at a position common to the first coil.

The second transmission/reception unit may include:
the second coil which is openable at least at one position so that the second coil is formed by connecting the plurality of second coil parts via the one or the plurality of second coil connectors; and
a second holding portion of a cylindrical shape which is provided with the second coil on an inner surface or an outer surface thereof and which is separable at a position common to the second coil.

The first transmission/reception unit may include:
the first coil which is openable at least at one position so that the first coil is formed by connecting the plurality of first coil parts via the one or the plurality of first coil connectors; and
a first holding portion of a cylindrical shape which accommodates the first coil and which is separable at a position common to the first coil.

The second transmission/reception unit may include:
the second coil which is openable at least at one position so that the second coil is formed by connecting the plurality of second coil parts via the one or the plurality of second coil connectors; and
a second holding portion of a cylindrical shape which accommodates the second coil and which is separable at a position common to the second coil.

The first transmission/reception unit and the second transmission/reception unit, each in the closed state, may be disposed so as to overlap each other when viewed from a direction perpendicular to the rotation axis by fitting the second transmission/reception unit to an inside of the first transmission/reception unit with a gap left therefrom.

The first transmission/reception unit may include:
the first coil which is openable at least at one position so that the first coil is formed by connecting the plurality of first coil parts via the one or the plurality of first coil connectors; and
a first holding portion of a cylindrical shape which is provided with the first coil on an inner surface thereof and which is separable at a position common to the first coil.

The second transmission/reception unit may include:
the second coil which is openable at least at one position so that the second coil is formed by connecting the plurality of second coil parts via the one or the plurality of second coil connectors; and
a second holding portion of a cylindrical shape which is provided with the second coil on an outer surface thereof and which is separable at a position common to the second coil.

The first transmission/reception unit may include:
the first coil which is openable at least at one position so that the first coil is formed by connecting the plurality of first coil parts via the one or the plurality of first coil connectors; and
a first holding portion of a cylindrical shape which accommodates the first coil and which is separable at a position common to the first coil.

The second transmission/reception unit may include:
the second coil which is openable at least at one position so that the second coil is formed by connecting the plurality of second coil parts via the one or the plurality of second coil connectors; and
a second holding portion of a cylindrical shape which accommodates the second coil and which is separable at a position common to the second coil.

In order to achieve the above-mentioned object, according to a sixth aspect of the present invention, there is provided a wireless connector for wirelessly transmitting electric power between a first object and a second object which are connected to each other to be rotatable around a rotation axis, the wireless connector including:
- a first unit detachably attached to the first object from the outside of the first object; and
- a second unit detachably attached to the second object from the outside of the second object;
- wherein the first unit includes:
  - a first transmission/reception unit provided with a first coil configured to wirelessly transmit the electric power and composed of a plurality of first coil parts which are separable from each other or which are separable at one position and bendable with respect to each other; and
  - a first main connector portion for transmitting the electric power to/from the first object by being detachably attached to the first object from the outside of the first object;
- wherein the second unit includes:
  - a second transmission/reception unit provided with a second coil configured to wirelessly transmit the electric power to/from the first coil of the first transmission/reception unit and composed of a plurality of second coil parts which are separable from each other or which are separable at one position and bendable with respect to each other; and
  - a second main connector portion for transmitting the electric power to/from the second object by being detachably attached to the second object from the outside of the second object;
- wherein the first transmission/reception unit is configured to be openable and closable and configured to be annular when the first transmission/reception unit is closed so that the first coil is formed by connecting the plurality of first coil parts via one or a plurality of first coil connectors;
- wherein the second transmission/reception unit is configured to be openable and closable and configured to be annular when the second transmission/reception unit is closed so that the second coil is formed by connecting the plurality of second coil parts via one or a plurality of second coil connectors;
- wherein the first transmission/reception unit and the second transmission/reception unit are spaced from each other along the rotation axis in a closed state so as to be disposed in a state of being faced to each other in a non-contact manner.

The first coil may comprise the plurality of first coil parts separable from each other.

The second coil may comprise the plurality of second coil parts separable from each other.

The first transmission/reception unit may be configured to be separable at a plurality of positions to be openable and closable and configured to be annular when the first transmission/reception unit is closed so that the first coil is formed by connecting the plurality of first coil parts via the plurality of first coil connectors.

The first unit may be assembled to be divisible into first to i-th primary pieces (i being an integer not smaller than 2), which are not annular, so that the first coil is separated into the plurality of first coil parts by releasing fitting of the plurality of first coil connectors.

The second transmission/reception unit may be configured to be separable at a plurality of positions to be openable and closable and configured to be annular when the second transmission/reception unit is closed so that the second coil is formed by connecting the plurality of second coil parts via the plurality of second coil connectors.

The second unit may be assembled to be divisible into first to j-th secondary pieces (j being an integer not smaller than 2), which are not annular, so that the second coil is separated into the plurality of second coil parts by releasing fitting of the plurality of second coil connectors.

The first coil may comprise the plurality of first coil parts which are separable at one position and bendable with respect to each other.

The second coil may comprise the plurality of second coil parts which are separable at one position and bendable with respect to each other.

The first unit may include:
- first to i-th primary pieces (i being an integer not smaller than 2) which are not annular and which include, respectively, the plurality of first coil parts bendable with respect to each other; and
- a first connecting mechanism for connecting adjacent ones of the first to the i-th primary pieces so that the first coil is opened in a state of being bent into the plurality of first coil parts by releasing fitting of the one first coil connector.

The second unit may include:
- first to j-th secondary pieces (j being an integer not smaller than 2) which are not annular and which include, respectively, the plurality of second coil parts bendable with respect to each other; and
- a second connecting mechanism for connecting adjacent ones of the first to the j-th secondary pieces so that the second coil is opened in a state of being bent into the plurality of second coil parts by releasing fitting of the one second coil connector.

In order to achieve the above-mentioned object, according to a seventh aspect of the present invention, there is provided a wireless connector for wirelessly transmitting electric power between a first object and a second object which are connected to each other to be rotatable around a rotation axis, the wireless connector including:
- a first unit detachably attached to the first object from the outside of the first object; and
- a second unit detachably attached to the second object from the outside of the second object;
- wherein the first unit includes:
  - a first transmission/reception unit provided with a first coil configured to wirelessly transmit the electric power and composed of a plurality of first coil parts which are separable from each other or which are separable at one position and bendable with respect to each other; and
  - a first main connector portion for transmitting the electric power to/from the first object by being detachably attached to the first object from the outside of the first object;
- wherein the second unit includes:
  - a second transmission/reception unit provided with a second coil configured to wirelessly transmit the electric power to/from the first coil of the first transmission/reception unit and composed of a plurality of second coil parts which are separable from each other or which are separable at one position and bendable with respect to each other; and
  - a second main connector portion for transmitting the electric power to/from the second object by being detachably attached to the second object from the outside of the second object;
- wherein the first transmission/reception unit is configured to be openable and closable and configured to be annular when the first transmission/reception unit is closed so that the first coil is formed by connecting the plurality of first coil parts via one or a plurality of first coil connectors;

wherein the second transmission/reception unit is configured to be openable and closable and configured to be annular when the second transmission/reception unit is closed so that the second coil is formed by connecting the plurality of second coil parts via one or a plurality of second coil connectors;

wherein the first transmission/reception unit and the second transmission/reception unit are spaced from each other along a direction perpendicular to the rotation axis in a closed state so as to be disposed in a state of being faced to each other in a non-contact manner.

The first coil may comprise the plurality of first coil parts separable from each other.

The second coil may comprise the plurality of second coil parts separable from each other.

The first transmission/reception unit may be configured to be separable at a plurality of positions to be openable and closable and configured to be annular when the first transmission/reception unit is closed so that the first coil is formed by connecting the plurality of first coil parts via the plurality of first coil connectors.

The first unit may be assembled to be divisible into first to i-th primary pieces (i being an integer not smaller than 2), which are not annular, so that the first coil is separated into the plurality of first coil parts by releasing fitting of the plurality of first coil connectors.

The second transmission/reception unit may be configured to be separable at a plurality of positions to be openable and closable and configured to be annular when the second transmission/reception unit is closed so that the second coil is formed by connecting the plurality of second coil parts via the plurality of second coil connectors.

The second unit may be assembled to be divisible into first to j-th secondary pieces (j being an integer not smaller than 2), which are not annular, so that the second coil is separated into the plurality of second coil parts by releasing fitting of the plurality of second coil connectors.

The first coil may comprise the plurality of first coil parts which are separable at one position and bendable with respect to each other.

The second coil may comprise the plurality of second coil parts which are separable at one position and bendable with respect to each other.

The first unit may include:
first to i-th primary pieces (i being an integer not smaller than 2) which are not annular and which include, respectively, the plurality of first coil parts bendable with respect to each other; and
a first connecting mechanism for connecting adjacent ones of the first to the i-th primary pieces so that the first coil is opened in a state of being bent into the plurality of first coil parts by releasing fitting of the one first coil connector.

The second unit may include:
first to j-th secondary pieces (j being an integer not smaller than 2) which are not annular and which include, respectively, the plurality of second coil parts bendable with respect to each other; and
a second connecting mechanism for connecting adjacent ones of the first to the j-th secondary pieces so that the second coil is opened in a state of being bent into the plurality of second coil parts by releasing fitting of the one second coil connector.

The first object and the second object may be connected to each other to be rotatable around a rotation axis.

Each of the first transmission/reception unit and the second transmission/reception unit may have a center which substantially coincides with a center of the rotation axis.

The first object and the second object may be connected to each other to be rotatable around a rotation axis.

Each of the first coil and the second coil may have a center which substantially coincides with a center of the rotation axis.

The wireless connector may further comprise:
a protecting portion which includes an elastic member closing at least a part of a gap continuous to a facing space as a space between the first transmission/reception unit and the second transmission/reception unit in the state of being faced to each other, and which prevents intrusion of foreign matter into the facing space.

The protecting portion may further include a first protective cover portion and a second protective cover portion which seal and cover the first coil and the second coil in a closed state, respectively.

The elastic member may have a base end provided in one of the first protective cover portion and the second protective cover portion, and a top end brought into contact with the other of the first protective cover portion and the second protective cover portion, thereby closing at least a part of the gap continuous to the facing space.

Each of the first coil and the second coil may include a printed wiring.

Each of the first coil and the second coil may include a conductor wire.

In order to achieve the above-mentioned object, according to an eighth aspect of the present invention, there is provided a wireless connector unit which constitutes a wireless connector for wirelessly transmitting electric power between two objects and which is attached to each of the objects; the wireless connector unit including:
a transmission/reception unit provided with a coil configured to wirelessly transmit the electric power and composed of a plurality of coil parts which are separable from each other or which are separable at one position and bendable with respect to each other; and
a main connector portion for transmitting the electric power to/from the objects by being detachably attached to the objects from the outside of the objects;
wherein the transmission/reception unit is configured to be openable and closable and configured to be annular when the transmission/reception unit is closed so that the coil is formed by connecting the plurality of coil parts via at least one coil connector;
wherein the transmission/reception unit is disposed, when attached to one of the two objects in a closed state, in a state of being faced to a different transmission/reception unit in a non-contact manner so as to wirelessly transmit the electric power, the different transmission/reception unit being attached to the other of the two objects in the closed state.

Effect of the Invention

According to the present invention, the wireless connector can quickly be repaired.

MODE FOR CARRYING OUT THE INVENTION

Figure 1:
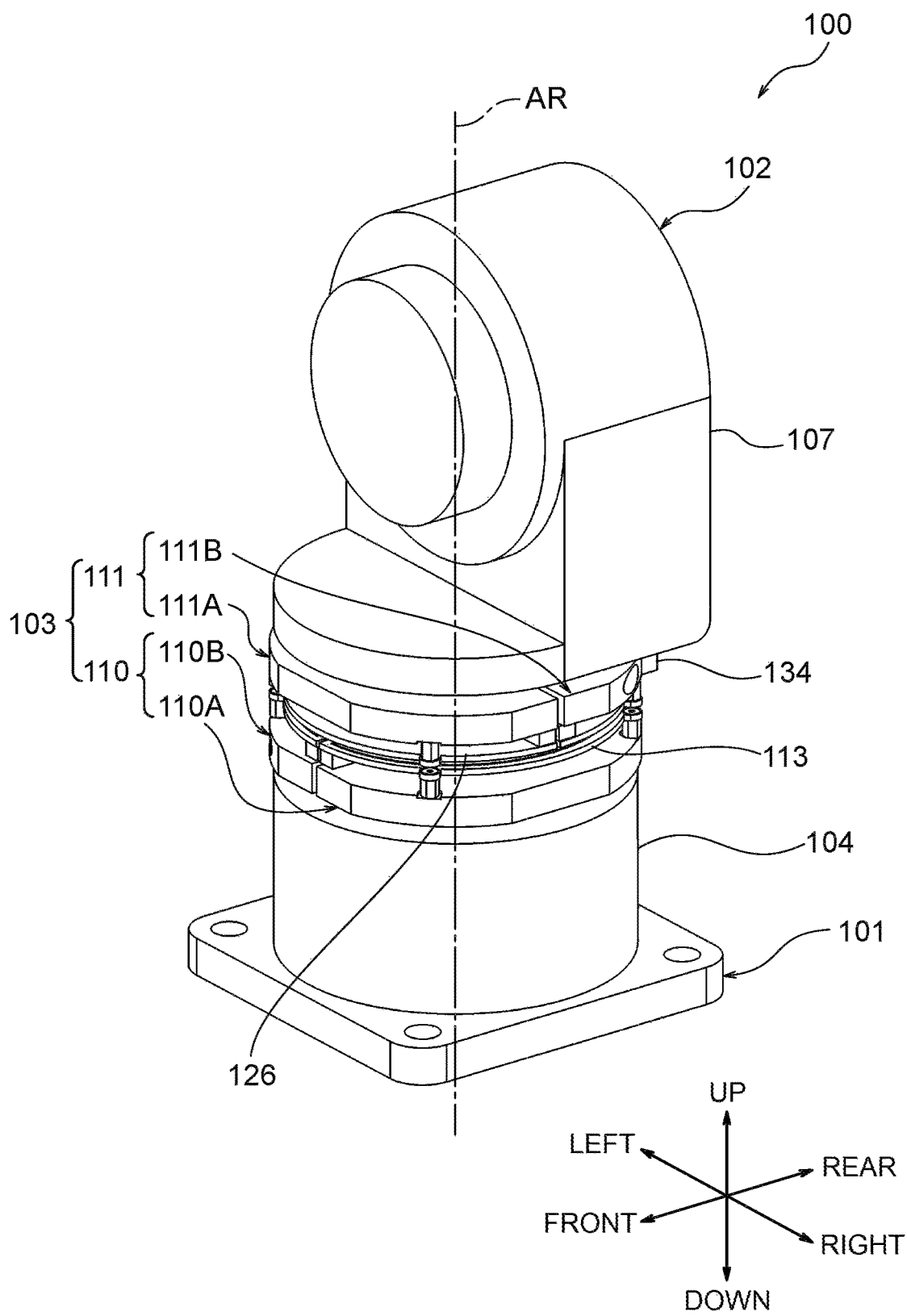
FIG. 1 is a perspective view of a robot device according to a first embodiment of the present invention.

Hereinafter, wireless connectors according to embodiments of the present invention will be described with reference to the drawings. Throughout all drawing figures, the same elements are assigned with the same reference numerals.

First Embodiment (Configuration of Robot Device 100 According to First Embodiment)

A robot device 100 according to a first embodiment of the present invention is an industrial robot in which electric power is wirelessly transmitted between a first object 101 and a second object 102 via a wireless connector 103. As shown in perspective views of FIGS. 1 and 2, the robot device 100 includes the first object 101, the second object 102, and the wireless connector 103 for wirelessly transmitting the electric power between the first object 101 and the second object 102.

Figure 3:
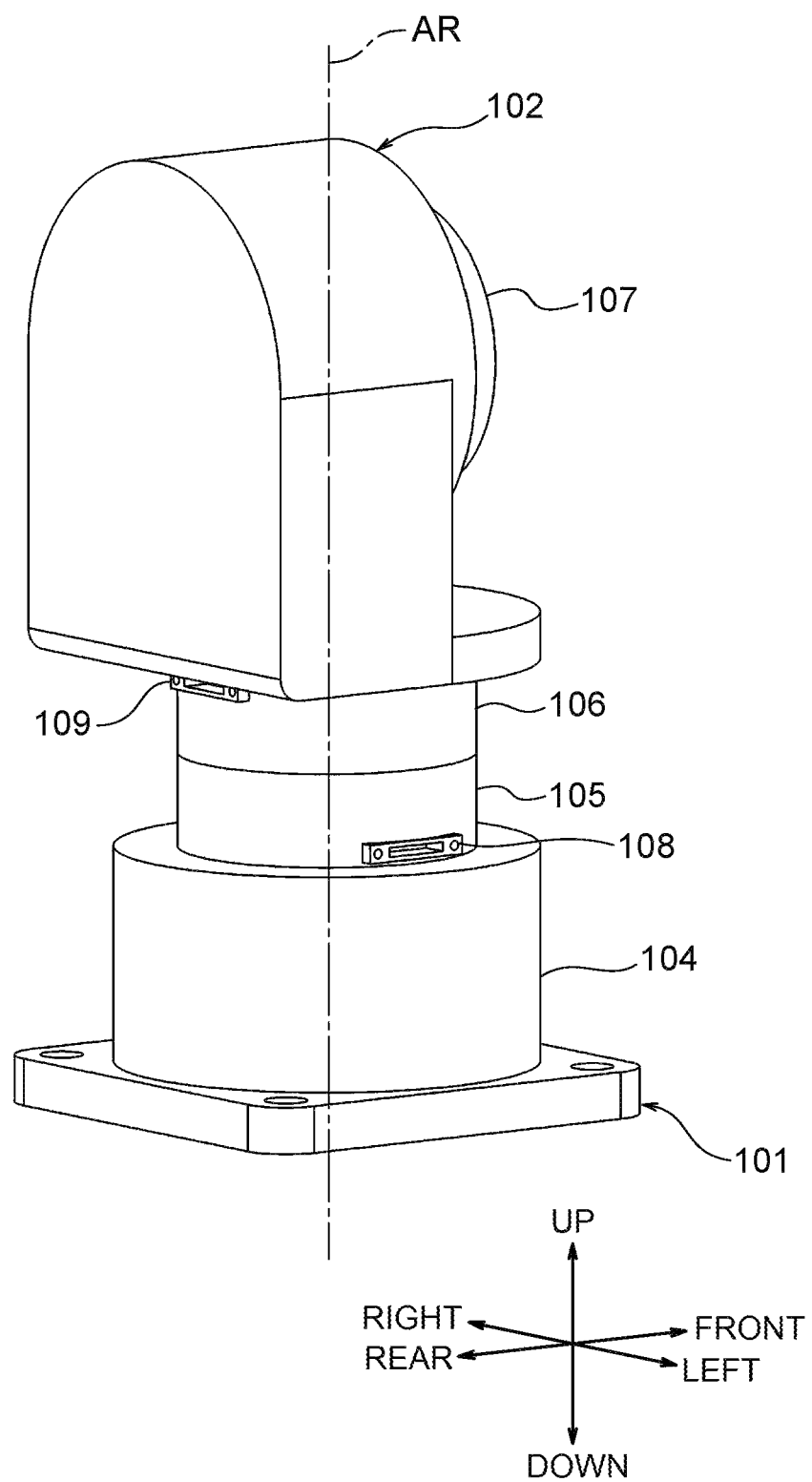
FIG. 3 is a perspective view of a first object and a second object used in the robot device illustrated in FIGS. 1 and 2.

As shown in FIG. 3 being a perspective view, the first object 101 and the second object 102 are members constituting the robot device 100, and are connected to be relatively rotatable around a common rotation axis AR.

Figure 2:
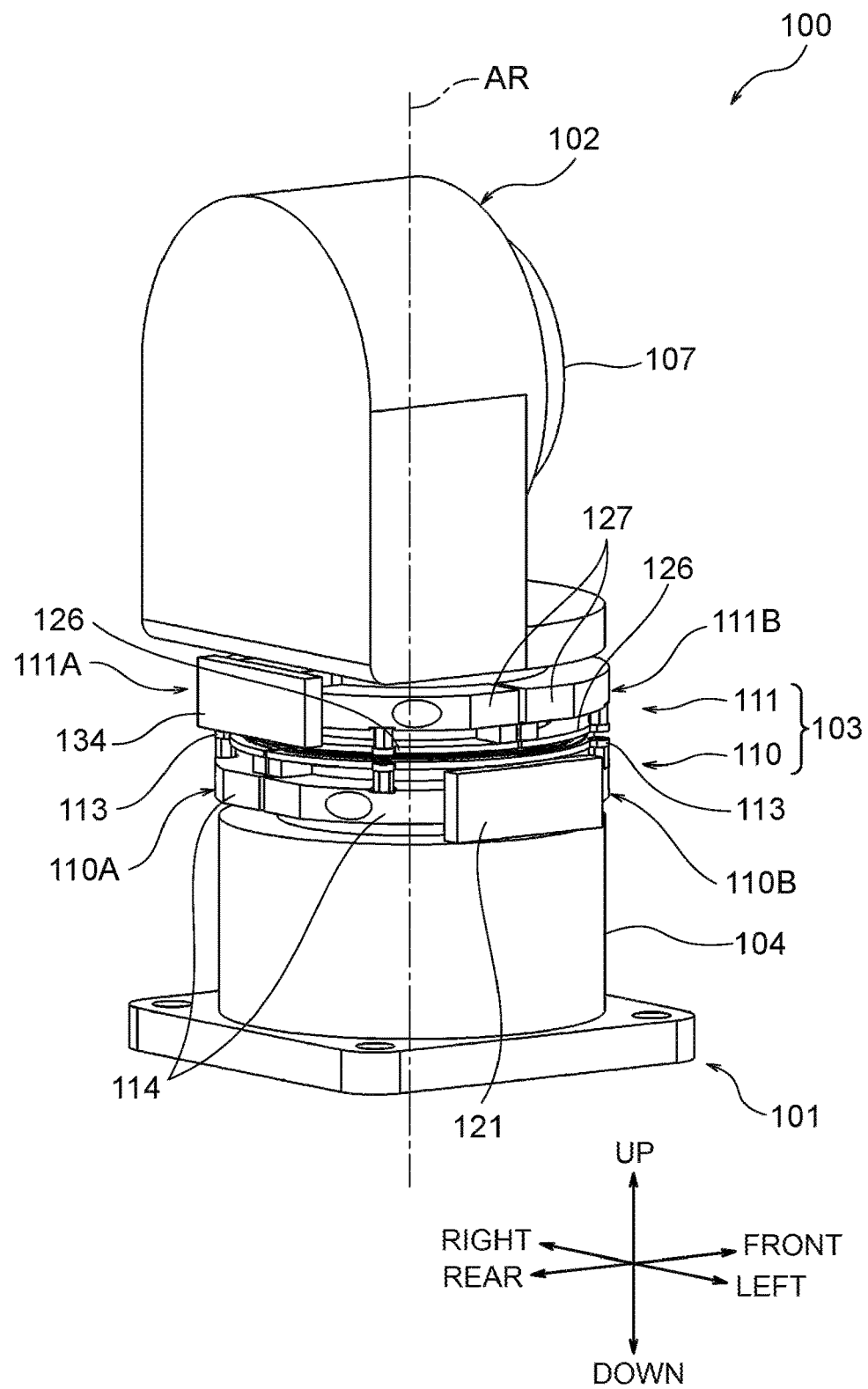
FIG. 2 is another perspective view of the robot device illustrated in FIG. 1.

In the following description, as shown in FIGS. 1 to 3, a direction along the rotation axis AR is defined as an up-and-down direction, a direction in which the first object 101 is positioned with respect to the second object 102 is defined as a lower side, and its reverse direction is defined as an upper side. One direction perpendicular to the up-and-down direction is defined as a frond side, and its reverse direction is defined as a rear side. A left-and-right direction is defined according to a direction as seen from the front side. A back-and-forth direction may be referred to as a first direction or a thickness direction while the left-and-right direction may be referred to as a second direction or a transverse direction, and the up-and-down direction may be referred to as a third direction or a height direction. The first to the third directions are perpendicular to one another and define an orthogonal coordinate system. However, it is to be noted that those terms indicating these directions are used for the purpose of explanation and are not intended to limit the present invention.

In detail, the first object 101 is covered with a first outer shell (not shown). The first object 101 includes a base portion 104 fixed to a base (not shown), and a first shaft portion 105 provided above the base portion 104. The second object 102 is covered with a second outer shell (not shown). The second object 102 includes a second shaft portion 106 disposed above the first shaft portion 105, and a different member connecting portion 107 provided at an upper end of the second shaft portion 106.

Inside the base portion 104 and first shaft portion 105, electric components and the like are accommodated. In FIGS. 1 to 3, an example in which the base portion 104 has a columnar shape extending in the up-and-down direction around the rotation axis AR is shown. However, the shape of the base portion 104 may appropriately be changed.

Examples of the electric components accommodated in the base portion 104 and the first shaft portion 105 may be a driving mechanism including a motor, a gear, and the like for rotating the second object 102 around the rotation axis AR, a power source device, and components constituting various circuits. Since the first object 101 is covered with the first outer shell as described above, constituent components inside the first object 101, such as the electric components accommodated in the base portion 104 and the first shaft portion 105, are not exposed to the outside.

Inside the second shaft portion 106 and the different member connecting portion 107, electric components and the like are accommodated. The different member connecting portion 107 is connected to a different member (an arm portion performing a turning operation, a hand portion for holding a component, and the like).

Examples of the electric components accommodated in the second shaft portion 106 and the different member connecting portion 107 may be a driving mechanism including a gear or the like for rotating with respect to the first object 101 around the rotation axis AR. In addition, the second shaft portion 106 and the different member connecting portion 107 may accommodate a driving mechanism including a motor, a gear, and the like for rotating the different member connected to the different member connecting portion 107, components constituting various circuits, and so on. Since the second object 102 is covered with the second outer shell as described above, constituent components inside the second object 102, such as the electric components inside the different member connecting portion 107, are not exposed to the outside.

The first shaft portion 105 and the second shaft portion 106 are columnar parts having the same diameter and each extending in the up-and-down direction around the rotation axis AR, are arranged on the lower side and the upper side, respectively, and are configured to be relatively rotatable around the rotation axis AR. By rotatably connecting the first shaft portion 105 and the second shaft portion 106, the first object 101 and the second object 102 can be relatively rotated around the common rotation axis AR.

An angle at which the first object 101 and the second object 102 are relatively rotatable may be limited within a predetermined range. However, the first object 101 and the second object 102 according to the first embodiment are configured to be rotatable at any desired angle in all directions around the rotation axis AR.

Since the first shaft portion 105 and the second shaft portion 106 have the same diameter as described above, their outer peripheral surfaces are configured to be flush with each other in the up-and-down direction. A lower surface of the first shaft portion 105 is smaller than an upper surface of the base portion 104, and an upper surface of the second shaft portion 106 is smaller than a lower surface of the different member connecting portion 107. Thus, in the vicinity of a connecting part between the first object 101 and the second object 102, a recess which is recessed toward the rotation axis AR is formed.

When viewed along the rotation axis AR, the wireless connector 103 is attached to the recess so as not to protrude outward beyond the first object 101 and the second object 102. Consequently, it is possible to reduce the possibility that the wireless connector 103 collides with the different member or the like during an operation of the robot device 100, as compared with a case where the wireless connector 103 protrudes outward. Therefore, durability of the wireless connector 103 can be improved.

The first shaft portion 105 and the second shaft portion 106 include a first mating connector portion 108 and a second mating connector portion 109, respectively, which are connected to the wireless connector 103. The first mating connector portion 108 and the second mating connector portion 109 are connectors for transmitting the electric power to/from the wireless connector 103, and are provided on the first object 101 and the second object 102, respectively, so as to be exposed outside.

The second mating connector portion 109 is provided on the second shaft portion 106. FIG. 3 shows an example of a receptacle located on the rear side of the second shaft portion 106 and having a fitting surface facing the rear side. The first mating connector portion 108 is provided on the first shaft portion 105. FIG. 3 shows an example of a receptacle located on a left side of the first shaft portion 105 and having a fitting surface facing the left side.

The robot device 100 may be a humanoid robot or the like. In this case, the first object 101 and the second object 102 may be provided on a waist, a neck, a wrist, or the like of the humanoid robot.

The wireless connector 103 is a connector detachably attached from the outside of the first object 101 and the second object 102. For example, as shown in FIGS. 1 and 2, the wireless connector 103 is attached to the above-mentioned recess formed on an object (101, 102). Here, the term the "object (101, 102)" is a generic term for the first object 101 and the second object 102. This applies in the following also.

When attached to the object (101, 102), the wireless connector 103 wirelessly transmits the electric power, for example, from the first object 101 to the second object 102 by magnetic field coupling (in detail, electromagnetic induction) without interfering with a relative rotating operation of the object (101, 102) around the rotation axis AR. The wireless connector 103 may wirelessly transmit the electric power from the second object 102 to the first object 101. A method of wirelessly transmitting the electric power is not limited to an electromagnetic induction method, but may be a magnetic resonance method as another mode of the magnetic field coupling, or may be transmission/reception of electromagnetic waves such as microwaves.

Figure 4:
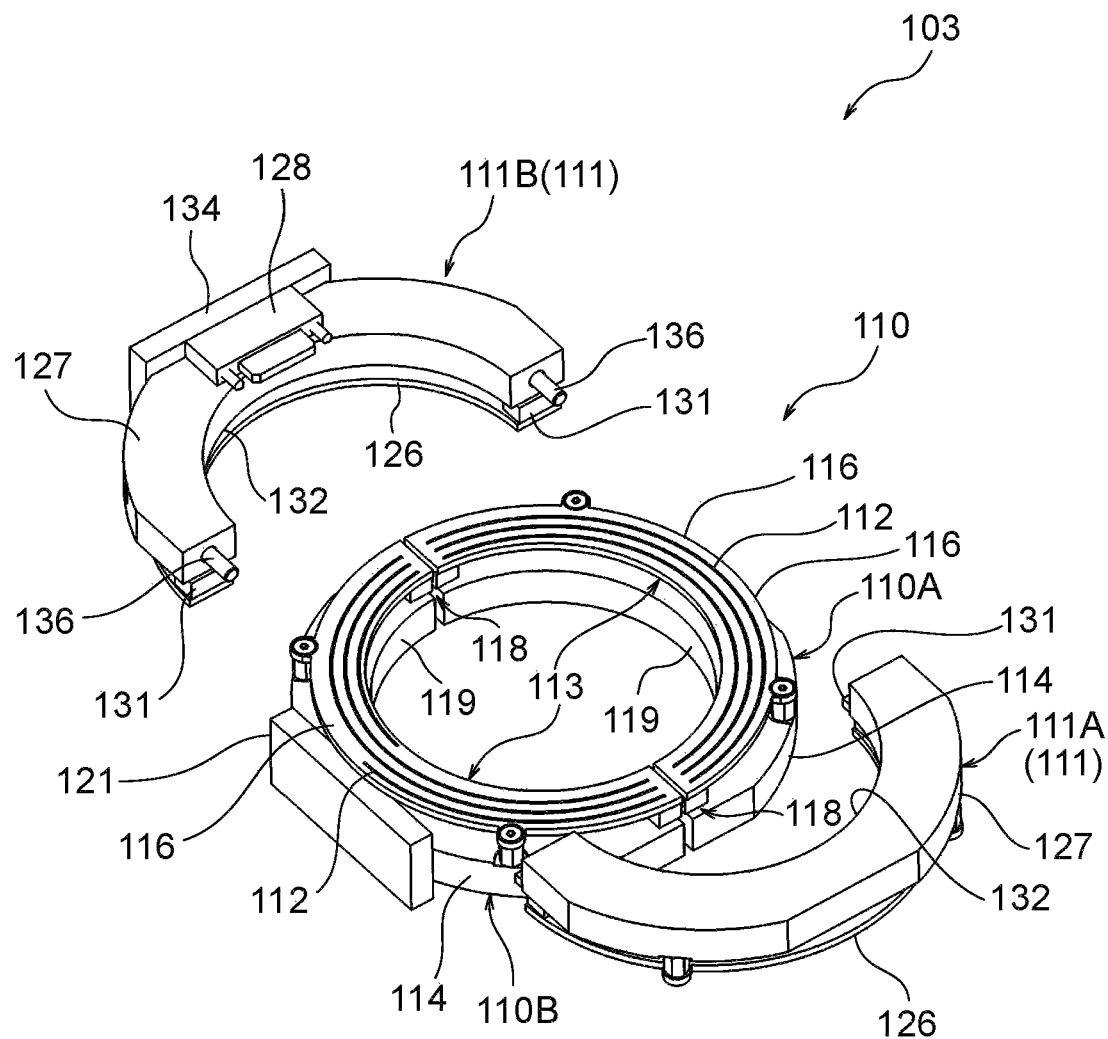
FIG. 4 is a perspective view of a wireless connector used in the robot device illustrated in FIGS. 1 and 2.
Figure 4:
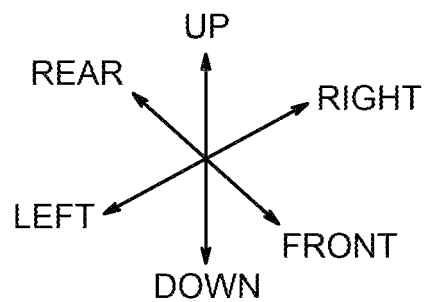

As shown in the perspective views of FIG. 1, FIG. 2, and FIG. 4, the wireless connector 103 includes a first unit 110 and a second unit 111. The first unit 110 is detachably attached to the first object 101 from the outside of the first object 101. The second unit 111 is detachably attached to the second object 102 from the outside of the second object 102.

The first unit 110 and the second unit 111 are, when attached to the first object 101 and the second object 102, respectively, arranged without contacting each other. Therefore, the first unit 110 and the second unit 111 are, when attached to the first object 101 and the second object 102, respectively, allowed to be relatively rotated at any desired angle around the rotation axis AR.

Here, FIG. 4 is a perspective view of the wireless connector 103. As will later be described, the first unit 110 is configured to be divisible into first and second primary pieces 110A and 110B by being openable/closable at a plurality of positions. Similarly, the second unit 111 is configured to be divisible into first and second secondary pieces 111A and 111B by being openable/closable at a plurality of positions. FIG. 4 shows a state where the first unit 110 is attached to the first object 101 (i.e., a state where the first unit 110 is closed). The same figure also shows a state where the second unit 111 is divided into the first and the second secondary pieces 111A and 111B which are pieces constituting the second unit 111 (i.e., a state where the second unit 111 according to the first embodiment is opened).

Figure 5:
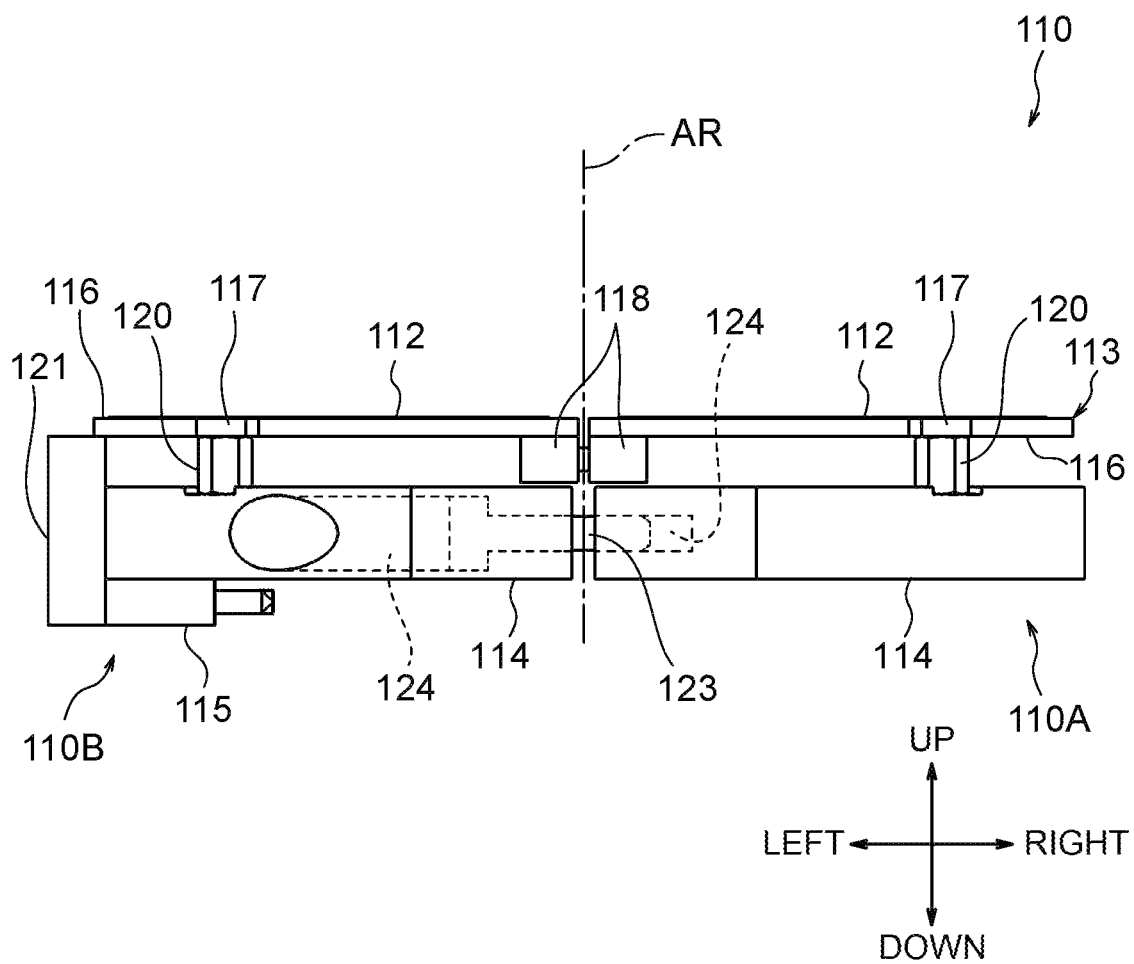
FIG. 5 is a side view of a first unit used in the wireless connector illustrated in FIG. 4.

As shown in a side view of FIG. 5 in the closed state, the first unit 110 includes a first transmission/reception unit 113 of an annular shape provided with a first coil 112, two first guide portions 114 to which the first transmission/reception unit 113 is fixed, and a first main connector portion 115 for transmitting the electric power to/from the first object 101.

In the closed state, the first transmission/reception unit 113 is, as a whole, a generally annular circular member having a through-hole centered on the rotation axis AR and, in the first embodiment, has a generally circular disc shape having the through-hole. The first transmission/reception unit 113 includes the first coil 112 for wirelessly transmitting the electric power, and a first holding plate 116, serving as a first holding portion, for holding the first coil 112.

The first holding plate 116 according to the first embodiment is composed of two rigid substrates. In the closed state, the first holding plate 116 has, as a whole, a generally circular annular shape having a circular through-hole centered on the rotation axis AR. In order to be fixed to the two first guide portions 114 as will later be described, the first holding plate 116 has a plurality of first protrusions 117 protruding outward as a direction away from the rotation axis AR.

The first coil 112 is composed of two first coil parts separable from each other. The first coil 112 is configured by connecting two printed wirings, which are conductors comprising the above-mentioned two first coil parts printed on one main surface (an upper surface in the first embodiment) of the first holding plate 116, through two first coil connectors 118 in a state where the first holding plate 116 is closed. When viewed from above in a state where the first transmission/reception unit 113 is closed, the first coil 112 is arranged in a generally circular annular region having a through-hole centered on the rotation axis AR and, in the first embodiment, is configured to form a generally flat spiral shape. In detail, a part of each printed wiring that is formed at an end portion of each rigid substrate of the first holding plate 116 is electrically connected to the corresponding first coil connector 118 via a through-hole (not shown). Therefore, by electrically connecting the two printed wirings through the two first coil connectors 118, the first coil 112 has a substantially spiral shape. In the first embodiment, a through-hole connector is used as the first coil connector 118. However, the present invention is not limited thereto. Instead of the through-hole connector, for example, a SMT (Surface Mount Technology) connector, an adhesive film connector, or a combination of an FPC (Flexible Printed Circuit) connector and an FPC may be used as the first coil connector 118.

Here, the "spiral shape" means a linear or belt-like shape that is turning from an end portion closest to the rotation axis AR around the rotation axis AR and gradually receding from the rotation axis AR. Alternatively, the "spiral shape" means a linear or belt-like shape that is turning from an end portion farthest from the rotation axis AR around the rotation axis AR and gradually approaching the rotation axis AR. "Spiral" may be formed exclusively by a smooth curve, or may include a bent part.

The first transmission/reception unit 113 may be configured by fixing a flexible substrate with the first coil 112 printed thereon to the first holding plate 116 made of resin or the like by an adhesive, a double-sided tape, or the like.

The two first guide portions 114 are provided separately on the left side and a right side. The two first guide portions 114 are parts to which the first transmission/reception unit 113 is fixed in order to reinforce the first transmission/reception unit 113, and function as a guide when the first unit 110 is attached to the first object 101.

In the state where the first unit 110 is closed, the two first guide portions 114 are generally annular as a whole and have first peripheral surface portions 119 forming an inner surface positioned on a circumference centered on the rotation axis AR when viewed from above. Each of the two first guide portions 114 is made of metal, resin or the like as a material, and the first protrusions 117 are fixed thereto by screwing via first spacers 120.

When viewed from above in the state where the first unit 110 is closed, the first peripheral surface portions 119 are positioned on a circumference that is the same as or smaller than the through-hole of the first transmission/reception unit 113, and are provided on a circumference having the substantially same diameter as the outer peripheral surface of the first shaft portion 105. Therefore, when the first unit 110 is attached to the first object 101, the first peripheral surface portions 119 are disposed in contact with the outer peripheral surface of the first shaft portion 105.

A method of fixing the two first guide portions 114 and the first transmission/reception unit 113 may be any appropriate method such as an adhesive. For example, if the first transmission/reception unit 113 need not be reinforced, the two first guide portions 114 may not be provided. In this case, similarly to the first peripheral surface portions 119, a part surrounding the through-hole of the first transmission/reception unit 113 may be disposed in contact with the outer peripheral surface of the first shaft portion 105 when the first unit 110 is attached to the first object 101.

The first main connector portion 115 transmits the electric power to/from the first object 101 by being detachably attached to the first object 101 from the outside of the first object 101. In detail, the first main connector portion 115 is a plug fitted to the first mating connector portion 108, and is electrically connected to each of both end portions of the first coil 112. The first main connector portion 115 may be a receptacle whereas the first mating connector portion 108 may be a plug.

The first unit 110 is assembled to be divisible into the first primary piece 110A and the second primary piece 110B, which are not annular, so that the first coil 112 can be formed by connecting the two first coil parts constituting the first coil 112 via the two first coil connectors 118. The first unit 110 is only required to be divisible into i primary pieces (i being an integer equal to or greater than two) which are not annular, and the number thereof is not limited to two.

In detail, the first transmission/reception unit 113 is configured to be separable at two positions on the front side and the rear side where the two first coil connectors 118 are provided, so that, by releasing fitting of the two first coil connectors 118, the first coil 112 is separated into the two first coil parts. Therefore, the first unit 110 is divisible into the first primary piece 110A on the right side and the second primary piece 110B on the left side via a first dividing plane including the rotation axis AR, and is formed by combining these primary pieces 110A an and 110B.

The two first coil connectors 118 are composed of a plug and a receptacle and their fitting planes generally coincide with the above-mentioned first dividing plane. The two first coil parts are connected via the two first coil connectors 118 to thereby form the first coil 112 which is separable and has a spiral shape.

Further, the first holding plate 116 is configured to be divisible via the first dividing plane common to the first coil 112. Thus, it is possible to obtain the first transmission/reception unit 113 which is divisible via the first dividing plane generally coinciding with the fitting planes of the two first coil connectors 118 (i.e., which forms an annular shape openable and closable at two positions).

It should be noted that the first dividing plane may be set so as to open the first transmission/reception unit 113 of the annular shape. Therefore, the first coil connectors 118 may be provided depending on the number of the primary pieces constituting the first unit 110 so that their fitting planes coincide with the first dividing plane.

The first guide portion 114 on the right side is included in the first primary piece 110A, and the first guide portion 114 on the left side is included in the second primary piece 110B.

The first main connector portion 115 may be included in either of the first primary piece 110A and the second primary piece 110B. In the first embodiment, the first main connector portion 115 is included in the second primary piece 110B, and is fixed to the first guide portion 114 on the left side via a first circuit portion 121.

The first circuit portion 121 is a circuit board including a power transmission circuit 122 (see FIG. 7) connecting the both end portions of the first coil 112 to the first main connector portion 115, and so on.

The first primary piece 110A and the second primary piece 110B are fastened by two first bolts 123 serving as fastening members to be fixed to each other in order to prevent easy release when the first unit 110 is attached to the first object 101.

In detail, in a state where the first unit 110 is assembled, the two first guide portions 114 have, on the front side and the rear side, two first bolt holes 124 continuous in the left-and-right direction for insertion of the two first bolts 123.

The first bolt hole 124 provided in the first guide portion 114 on the left side is opened on the left side. By inserting the first bolt 123 from the left side, a head of the first bolt 123 is locked in the second primary piece 110B whereas a thread of the first bolt 123 is fitted by a screw action in the first primary piece 110A.

Figure 6:
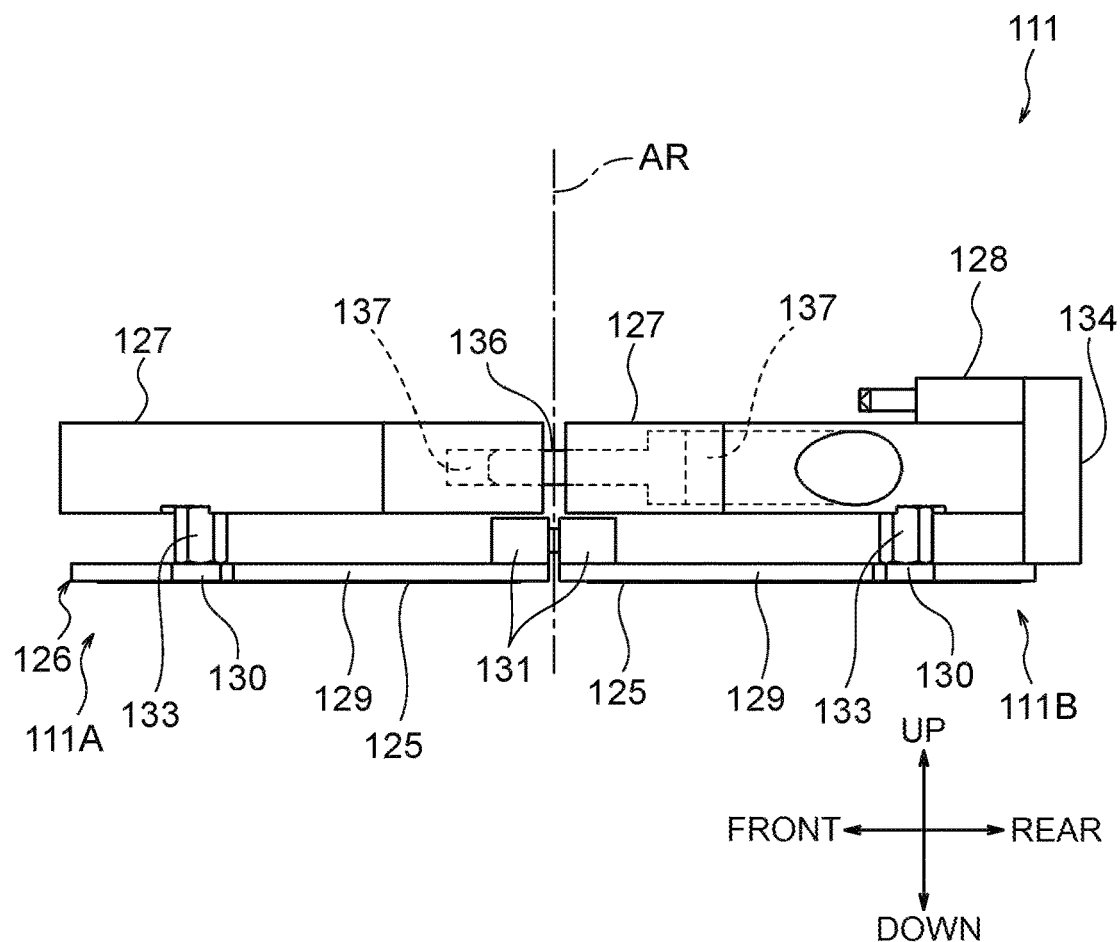
FIG. 6 is a side view of a second unit used in the wireless connector illustrated in FIG. 4.

As shown in a side view of FIG. 6 in a closed state, the second unit 111 generally has a configuration obtained by vertically inverting the first unit 110.

Specifically, the second unit 111 includes a second transmission/reception unit 126 of an annular shape provided with a second coil 125, two second guide portions 127 to which the second transmission/reception unit 126 is fixed, and a second main connector portion 128 for transmitting electric power to/from the second object 102.

In the closed state, the second transmission/reception unit 126 has, as a whole, a generally circular annular shape having a through-hole centered on the rotation axis AR and, in the first embodiment, has a generally circular disc shape having the through-hole. The second transmission/reception unit 126 and the first transmission/reception unit 113 according to the first embodiment are spaced from each other along the rotation axis AR so as to be disposed in a state of being faced to each other in a non-contact manner. The second transmission/reception unit 126 includes the second coil 125 for wirelessly transmitting the electric power and a second holding plate 129, serving as a second holding portion, for holding the second coil 125.

The second holding plate 129 according to the first embodiment is composed of two rigid substrates. In the closed state, the second holding plate 129 has, as a whole, a generally circular annular shape having a through-hole centered on the rotation axis AR. In order to be fixed to the two second guide portions 127 as will later be described, the second holding plate 129 has a plurality of second protrusions 130 protruding outward as the direction away from the rotation axis AR.

The second coil 125 is composed of two second coil parts separable from each other. The second coil 125 is configured by connecting two printed wirings, which are conductors comprising the two second coil parts printed on one main surface (a lower surface in the first embodiment) of the second holding plate 129, through two second coil connectors 131 in a state where the second holding plate 129 is closed. When viewed from above in a state where the second transmission/reception unit 126 is closed, the second coil 125 is arranged in a generally circular annular region having a through-hole centered on the rotation axis AR and, in the first embodiment, is configured to form a generally flat spiral shape. In detail, a part of each printed wiring that is formed at an end portion of each rigid substrate of the second holding plate 129 is electrically connected to the corresponding second coil connector 131 via a through-hole (not shown). Therefore, by electrically connecting the two printed wirings through the two second coil connectors 131, the second coil 125 has a substantially spiral shape. In the first embodiment, a through-hole connector is used as the second coil connector 131. However, the present invention is not limited thereto. Instead of the through-hole connector, for example, a SMT connector, an adhesive film connector, or a combination of an FPC connector and an FPC may be used as the second coil connector 131 as described above.

The second transmission/reception unit 126 may be configured by fixing a flexible substrate with the second coil 125 printed thereon to the second holding plate 129 made of resin or the like by an adhesive, a double-sided tape, or the like.

The two second guide portions 127 are provided separately on the front side and the rear side. Each of the two second guide portions 127 is a part to which the second transmission/reception unit 126 is fixed in order to reinforce the second transmission/reception unit 126, and functions as a guide when the second unit 111 is attached to the second object 102.

In a state where the second unit 111 is closed, the two second guide portions 127 are generally annular as a whole and have second peripheral surface portions 132 forming an inner surface positioned on a circumference centered on the rotation axis AR when viewed from above. Each of the two second guide portions 127 is made of metal, resin or the like as a material, and the second protrusions 130 are fixed by screwing via second spacers 133.

When viewed from above in the state where the second unit 111 is closed, the second peripheral surface portions 132 are positioned on a circumference that is the same as or smaller than the through-hole of the second transmission/reception unit 126, and is provided on a circumference having the substantially same diameter as the outer peripheral surface of the second shaft portion 106. Therefore, when the second unit 111 is attached to the second object 102, the second peripheral surface portions 132 are disposed in contact with the outer peripheral surface of the second shaft portion 106.

A method of fixing the two second guide portions 127 and the second transmission/reception unit 126 may be any appropriate method such as an adhesive. For example, if the second transmission/reception unit 126 need not be reinforced, the second guide portions 127 may not be provided. In this case, similarly to the second peripheral surface portions 132, a part surrounding the through-hole of the second transmission/reception unit 126 may be disposed in contact with the outer peripheral surface of the second shaft portion 106 when the second unit 111 is attached to the second object 102.

The second main connector portion 128 transmits the electric power to/from the second object 102 by being detachably attached to the second object 102 from the outside of the second object 102. In detail, the second main connector portion 128 is a plug fitted to the second mating connector portion 109, and is electrically connected to each of both end portions of the second coil 125. The second main connector portion 128 may be a receptacle whereas the second mating connector portion 109 may be a plug.

The second unit 111 is assembled to be divisible into the first secondary piece 111A and the second secondary piece 111B, which are not annular, so that the second coil 125 can be formed by connecting the two second coil parts constituting the second coil 125 via the two second coil connectors 131. The second unit 111 is only required to be divisible into j secondary pieces (j being an integer equal to or greater than two) which are not annular, and the number thereof is not limited to two.

In detail, the second transmission/reception unit 126 is configured to be separable at two positions on the left side and the right side where the two second coil connectors 131 are provided, so that, by releasing fitting of the two second coil connectors 131, the second coil 125 is separated into the two second coil parts. Therefore, the second unit 111 is divisible into the first secondary piece 111A on the front side and the second secondary piece 111B on the rear side via a second dividing plane including the rotation axis AR, and is formed by combining these secondary pieces 111A an and 111B.

The two second coil connectors 131 are composed of a plug and a receptacle and their fitting planes (planes positioned between the plug and the receptacle fitted to each other) generally coincide with the second dividing plane. The two second coil parts are connected via the two second coil connectors 131 to thereby form the second coil 125 which is separable and has a spiral shape.

Further, the second holding plate 129 is configured to be divisible via the second dividing plane common to the second coil 125. Thus, it is possible to obtain the second transmission/reception unit 126 which is divisible via the second dividing plane generally coinciding with the fitting planes of the two second coil connectors 131 (i.e., which forms an annular shape openable and closable at two positions).

It should be noted that the second dividing plane may be set so as to open the second transmission/reception unit 126 of the annular shape. Therefore, the second coil connectors 131 may be provided depending on the number of secondary pieces constituting the second unit 111 so that their fitting planes coincide with the second dividing plane.

The second guide portion 127 on the front side is included in the first secondary piece 111A, and the second guide portion 127 on the rear side is included in the second secondary piece 111B.

The second main connector portion 128 may be included in either of the first secondary piece 111A and the second secondary piece 111B. In the first embodiment, the second main connector portion 128 is included in the second secondary piece 111B, and is fixed to the second guide portion 127 on the rear side via a second circuit portion 134 of a box-like shape.

The second circuit portion 134 is a circuit board including a power reception circuit 135 (see FIG. 7) connecting the both end portions of the second coil 125 to the second main connector portion 128, and so on.

The first secondary piece 111A and the second secondary piece 111B are fastened by two second bolts 136 serving as fastening members to be fixed to each other in order to prevent easy release when the second unit 111 is attached to the second object 102.

In detail, in a state where the second unit 111 is assembled, the two second guide portions 127 have, on the left side and the right side, two second bolt holes 137 continuous in the front-and-rear direction for insertion of the two second bolts 136.

The second bolt hole 137 provided in the second guide portion 127 on the rear side is opened on the rear side. By inserting the second bolt 136 from the rear side, a head of the second bolt 136 is locked in the second secondary piece 111B whereas a thread of the second bolt 136 is fitted by a screw action in the first secondary piece 111A.

(Operation of Wireless Connector 103 According to First Embodiment)

Now, the operation of the wireless connector 103 according to the first embodiment will be described with reference to a circuit configuration diagram of FIG. 7.

Figure 7:
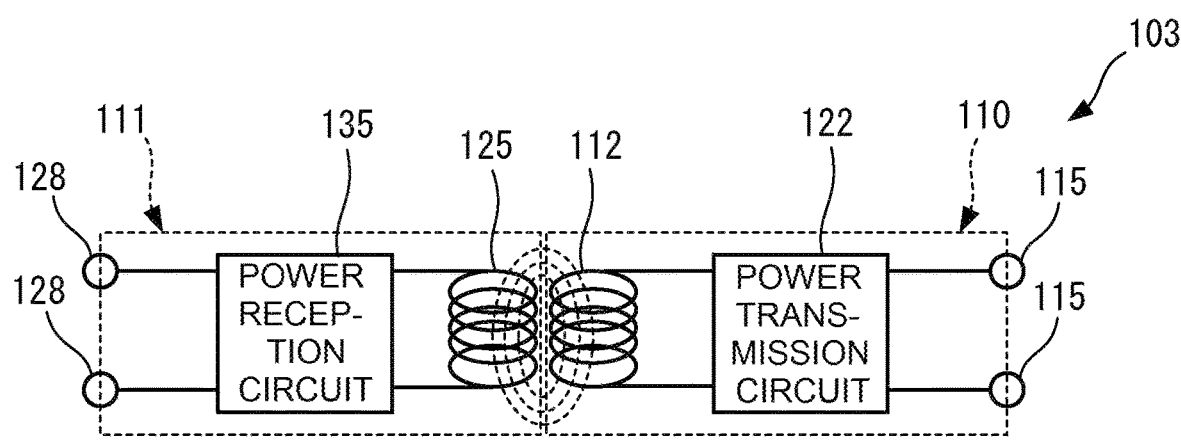
FIG. 7 is a circuit configuration diagram of the wireless connector illustrated in FIG. 4.

As shown in FIG. 7, electric power (DC power) supplied from the first object 101 (power supply side) is converted into AC power (high frequency power) through the first main connector portion 115 and the power transmission circuit 122 and supplied to the first coil 112. The power transmission circuit 122 includes, for example, a capacitor connected in series or in parallel to the first coil 112. The power transmission circuit 122 includes a DC/AC converter, such as an inverter, for converting the DC power into the AC power (high-frequency power). Thus, AC current flows through the first coil 112 and an AC magnetic field is generated around the first coil 112.

The first coil 112 and the second coil 125 are spaced from each other along the rotation axis AR to be disposed in a state of being faced to each other in a non-contact manner Therefore, the first coil 112 and the second coil 125 are magnetically coupled, so that an induced electromotive force corresponding to the AC magnetic field generated around the first coil 112 is generated in the second coil 125. Thus, in the first embodiment, the first coil 112 functions as a power transmission coil whereas the second coil 125 functions as a power reception coil.

Electric power (AC power) generated in the second coil 125 is converted into DC power through the power reception circuit 135 and the second main connector portion 128, and supplied to the second object 102 (load side). The power reception circuit 135 includes, for example, a capacitor connected in series or in parallel to the second coil 125. The power reception circuit 135 includes an AC/DC converter, such as a rectifier, for converting the AC power into the DC power. Thus, the wireless connector 103 can wirelessly transmit the electric power between the first object 101 and the second object 102.

In the first embodiment, as described above, the object (101, 102) rotates around the rotation axis AR and, in association therewith, the first unit 110 and the second unit 111 rotate around the rotation axis AR.

The first coil 112 and the second coil 125 are fixed in the first unit 110 and the second unit 111, respectively. Therefore, even when the first unit 110 and the second unit 111 are rotated, the first coil 112 and the second coil 125 are disposed in the state of being faced to each other in a non-contact manner along the rotation axis AR, and are magnetically coupled by electromagnetic induction.

The magnetic field coupling between the first coil 112 and the second coil 125 is maintained regardless of a relative rotation angle of the first object 101 and the second object 102 around the rotation axis AR and even during the rotating operation of the first object 101 and the second object 102. As a result, regardless of the angle of rotation of the first object 101 and the second object 102 and the rotating operation, the wireless connector 103 can operate in the manner similar to the above-described operation to wirelessly transmit the electric power between the first object 101 and the second object 102.

In the first embodiment, the first coil 112 and the second coil 125 are provided on mutually adjacent surfaces among the main surfaces of the first holding plate 116 and the second holding plate 129. Therefore, the first coil 112 and the second coil 125 can be disposed in close proximity. As a result, coupling force of the magnetic field coupling between the first coil 112 and the second coil 125 is increased to enable efficient wireless power transmission.

(Wireless Connector Attaching and Detaching Method According to First Embodiment)

Heretofore, the operation of the wireless connector 103 according to the first embodiment of the present invention has been described. Now, a wireless connector attaching and detaching method according to the first embodiment will be described with reference to FIGS. 8 to 13.

The wireless connector attaching and detaching method according to the first embodiment is a method of attaching and detaching the wireless connector 103 to/from the object (101, 102) included in the robot device 100, and includes an attaching method and a detaching method for the wireless connector 103.

(Method of Attaching Wireless Connector 103)

Figure 8:
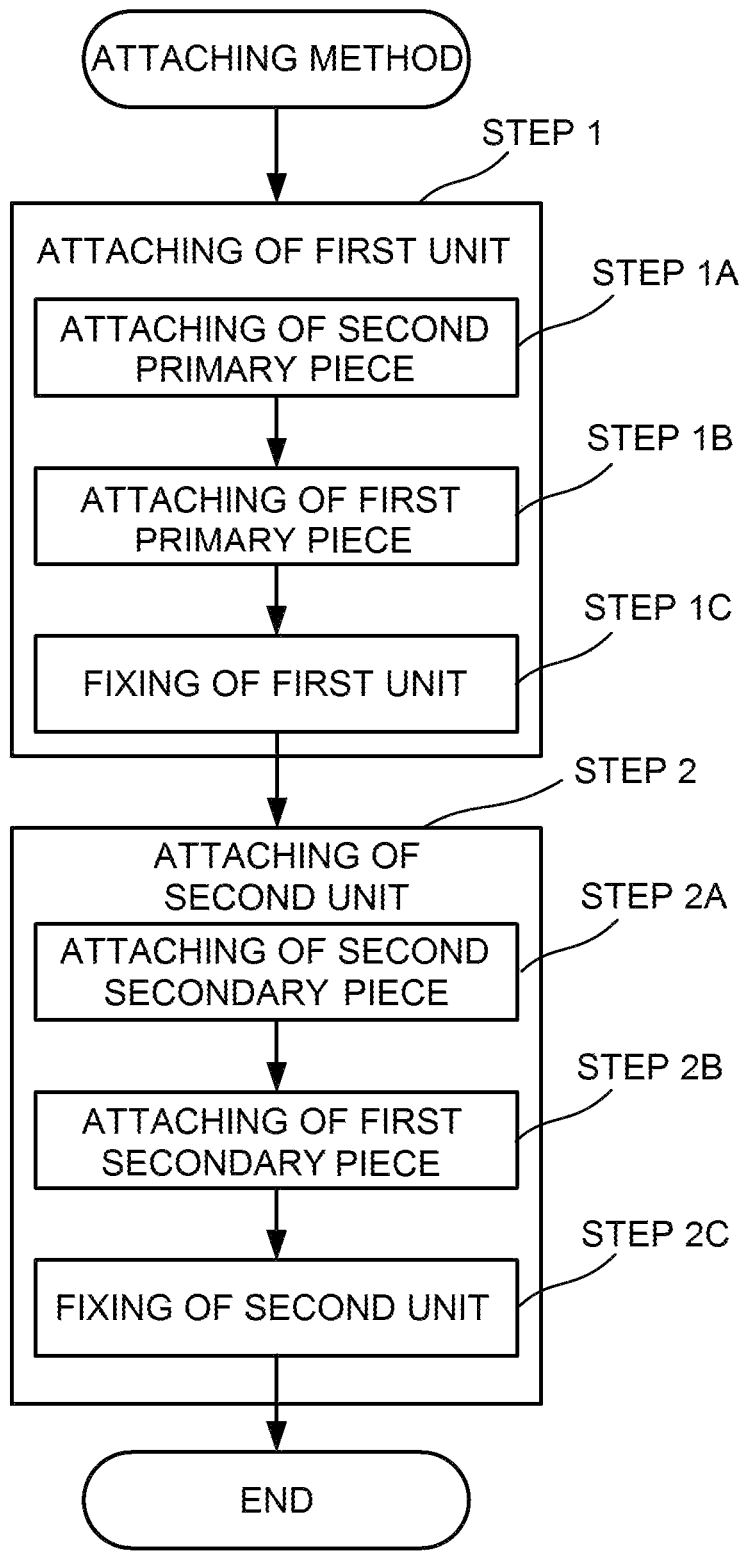
FIG. 8 is a diagram showing a flow of an attaching method of attaching the wireless connector illustrated in FIG. 4 to the first object and the second object illustrated in FIG. 3.
Figure 9:
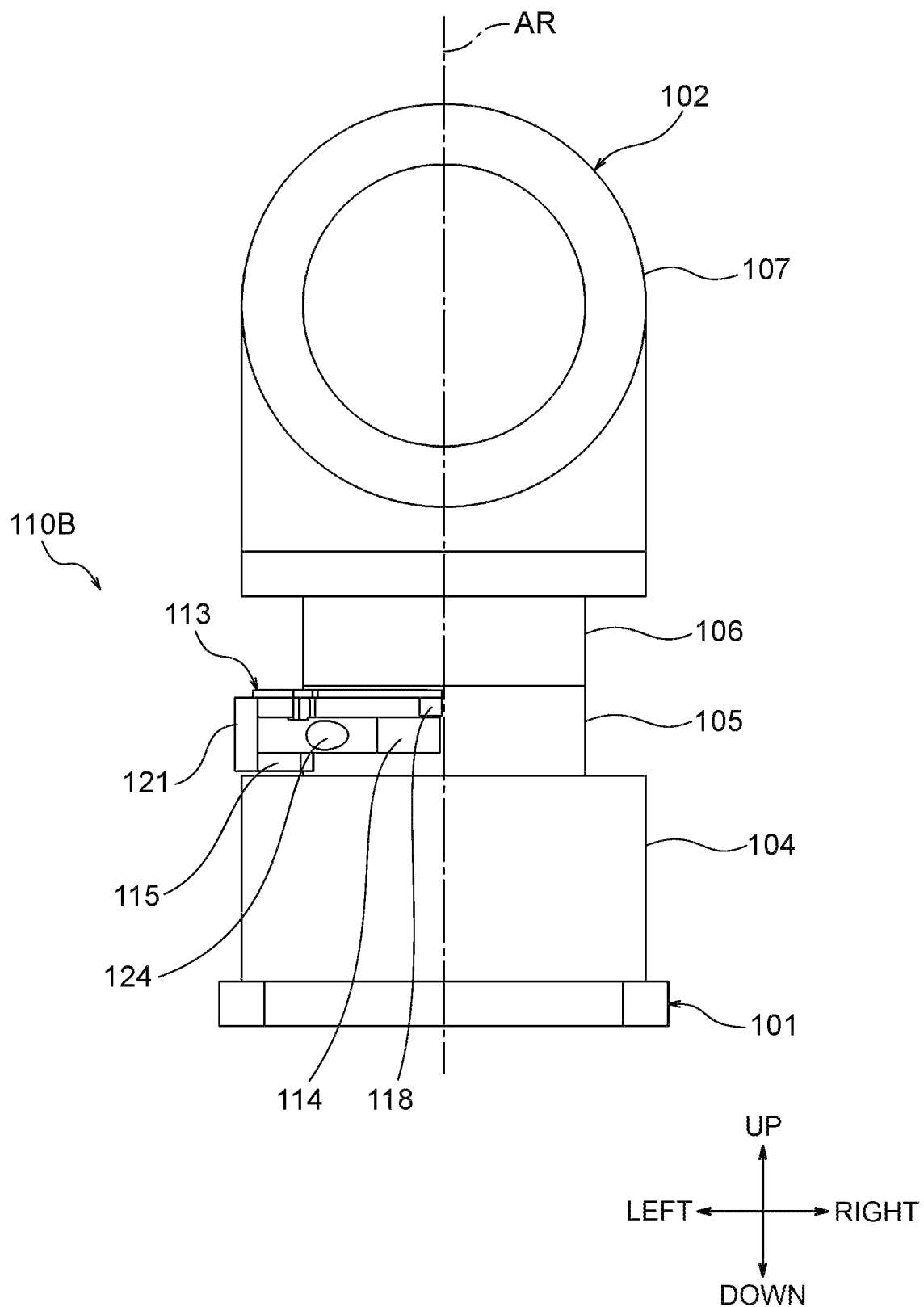
FIG. 9 is a side view showing a state where a second primary piece of the first unit illustrated in FIG. 5 is attached to the first object illustrated in FIG. 3.
Figure 10:
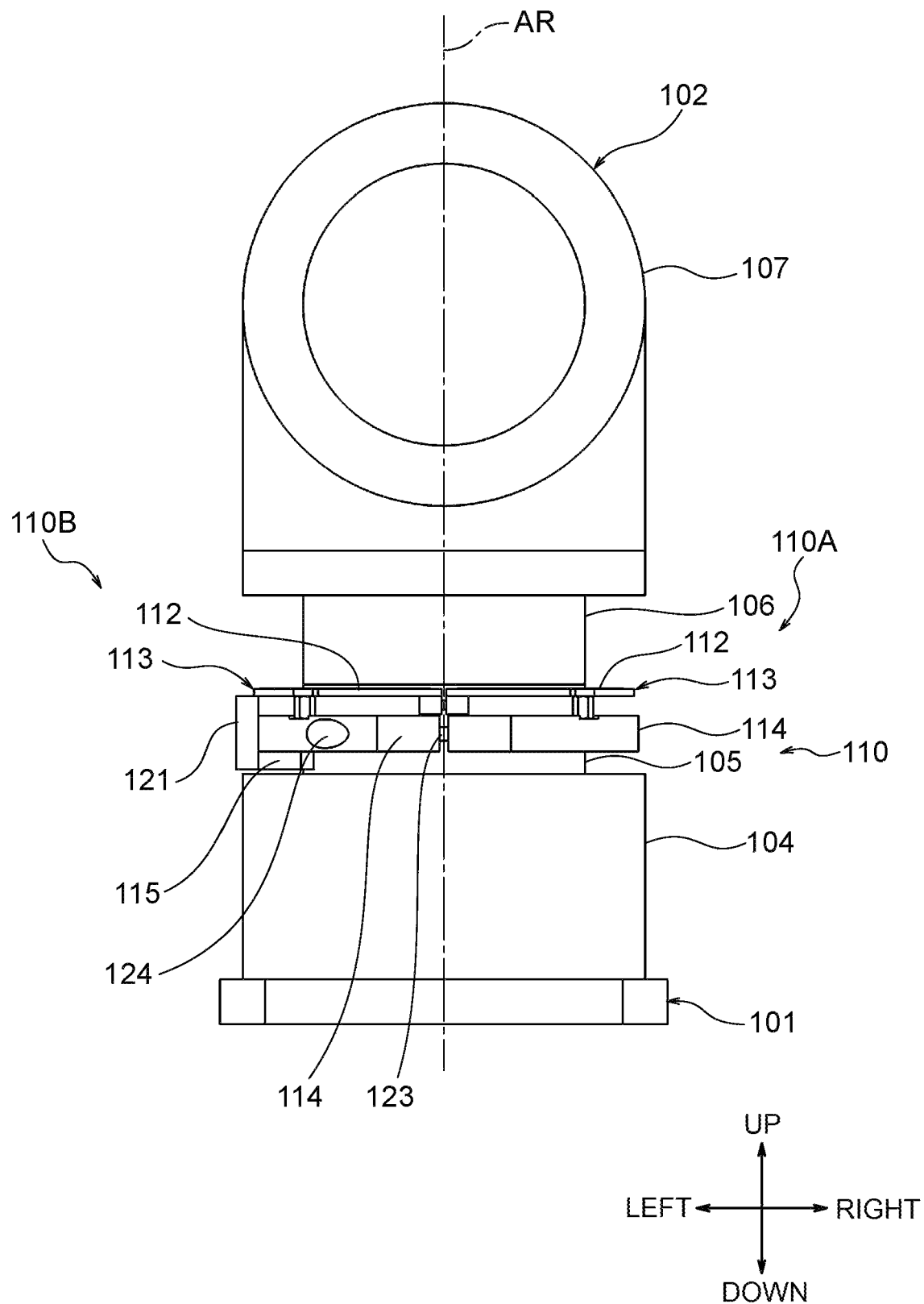
FIG. 10 is a side view showing a state where a first primary piece of the first unit illustrated in FIG. 5 is attached to the first object illustrated in FIG. 9 and fixed to the second primary piece.
Figure 11:
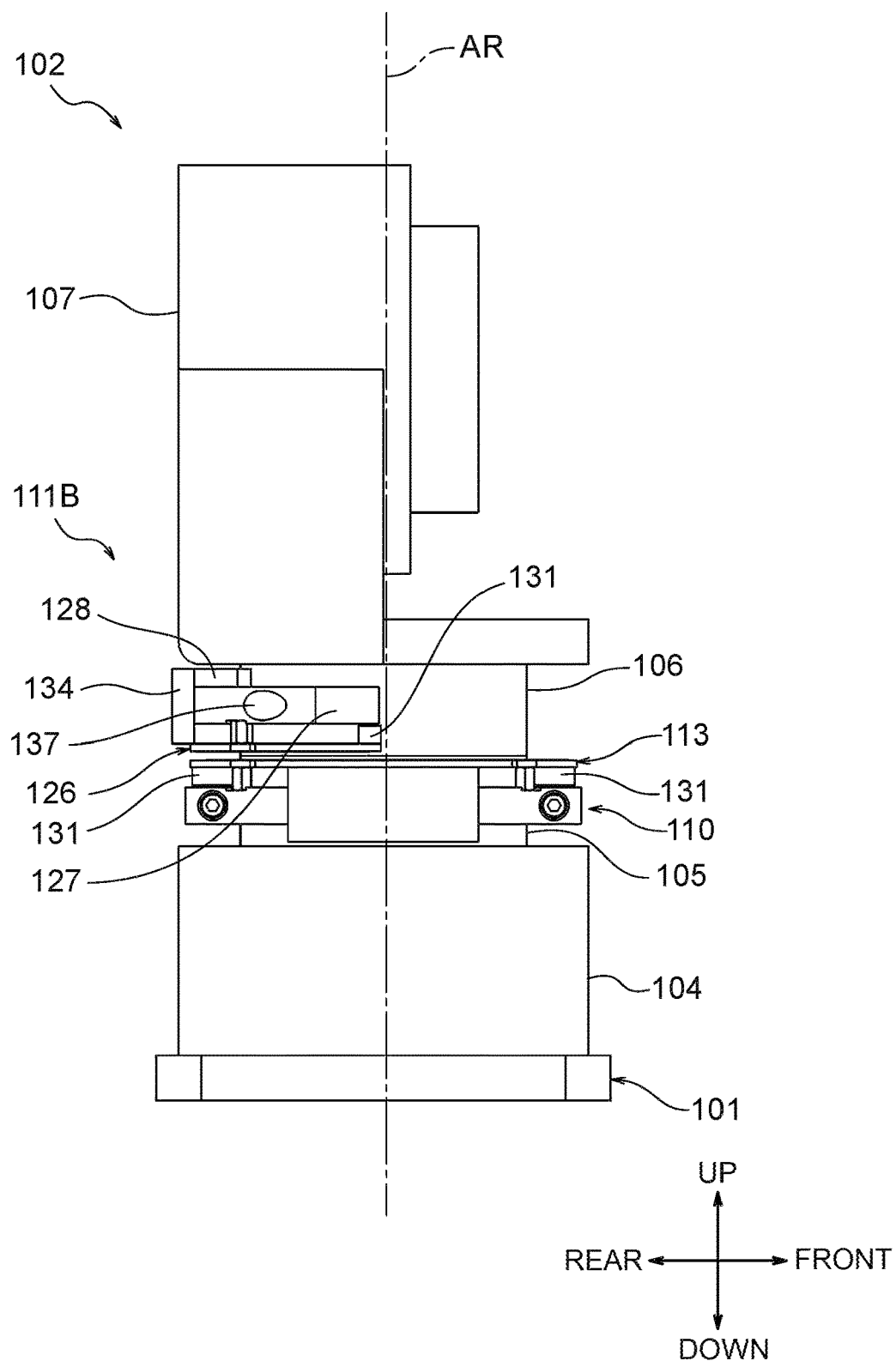
FIG. 11 is a side view showing a state where a second secondary piece of the second unit illustrated in FIG. 6 is attached to the second object illustrated in FIG. 10.
Figure 12:
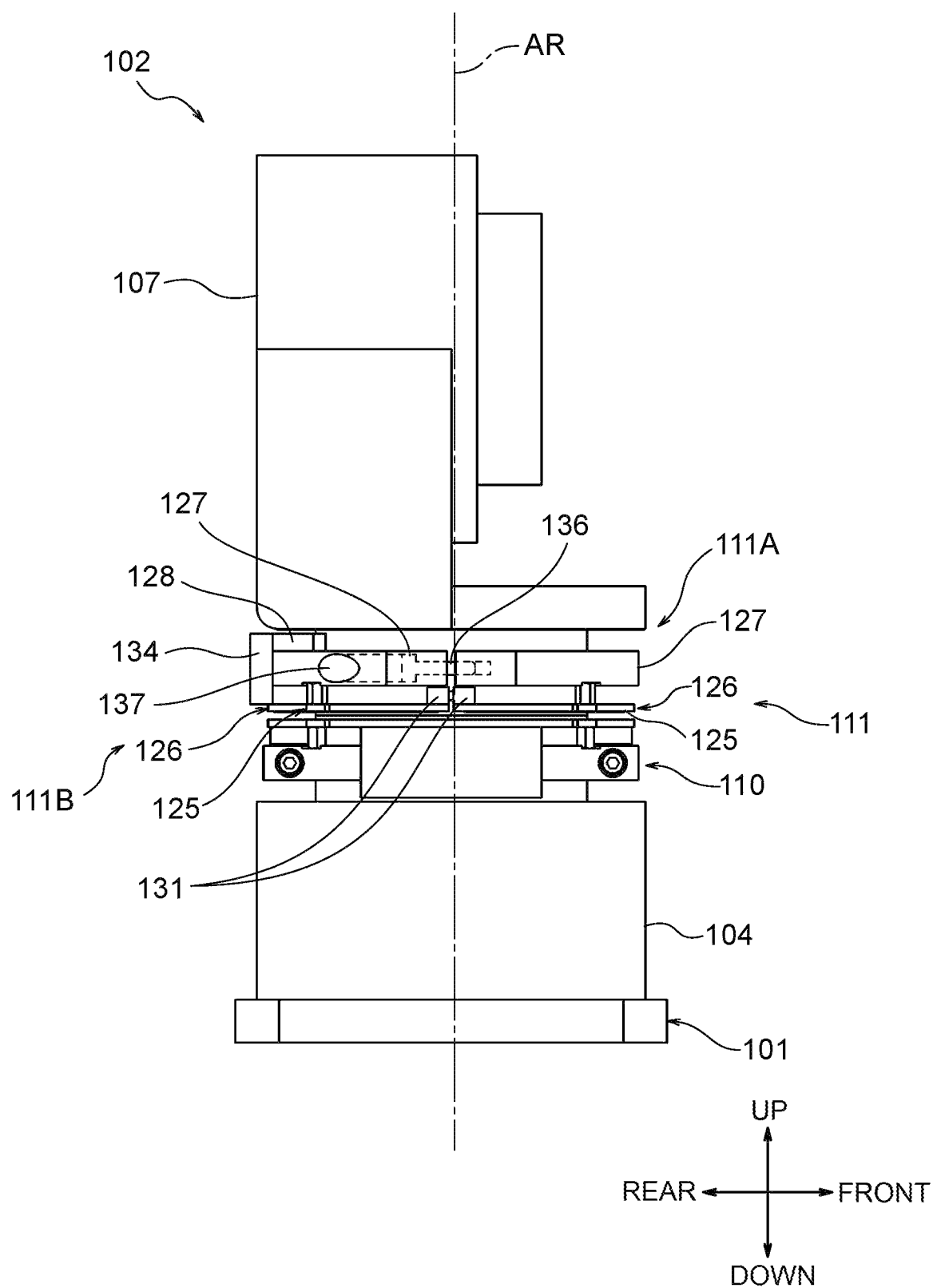
FIG. 12 is a side view showing a state where a first secondary piece of the second unit illustrated in FIG. 6 is attached to the second object illustrated in FIG. 11 and fixed to the second secondary piece.

FIG. 8 is a flowchart illustrating a flow of an attaching method of attaching the wireless connector 103 to the object (101, 102). The method of attaching the wireless connector 103 to the object (101, 102) is started by preparing the robot device (see FIG. 3) including the object (101, 102), and the wireless connector 103. The wireless connector 103 may be prepared in a state where the first unit 110 and the second unit 111 are opened, that is, in a state of being divided into the first primary piece 110A, the second primary piece 110B, the first secondary piece 111A, and the second secondary piece 111B.

As shown in FIG. 8, the first unit 110 is attached to the first object 101 from the outside of the first object 101 (step 1; step of attaching the first unit).

In detail, in step 1, the second primary piece 110B is attached to the first object 101 (step 1A: step of attaching the second primary piece).

In the first embodiment, the second primary piece 110B is disposed so that, in a state where one of the two first coil parts constituting the first coil 112 is directed to the upper side, the first peripheral surface portion 119 is brought into contact with the outer peripheral surface of the first shaft portion 105 while the first main connector portion 115 is fitted to the first mating connector portion 108. Consequently, the first main connector portion 115 and the first mating connector portion 108 are electrically connected to each other, and the second primary piece 110B is attached to the first object 101 as shown in a side view of FIG. 9.

As shown in FIG. 8, the first primary piece 110A is attached to the first object 101 so as to surround the rotation axis AR together with the second primary piece 110B (step 1 B; step of attaching the first primary piece).

In the first embodiment, the first primary piece 110A is disposed so that, in a state where the other of the two first coil parts constituting the first coil 112 is directed to the upper side, the first peripheral surface portion 119 is brought into contact with the outer peripheral surface of the first shaft portion 105. At this time, each of the one first coil connectors 118 provided in the first primary piece 110A is fitted to a corresponding one of the other first coil connectors 118 provided in the second primary piece 110B. Consequently, the first primary piece 110A is attached to the first object 101 to form the first coil 112 comprising the two first coil parts connected via the two first coil connectors 118. In addition, the first transmission/reception unit 113 is put into the closed state and forms an annular shape.

As shown in FIG. 8, the first primary piece 110A and the second primary piece 110B are fastened and fixed by the two first bolts 123 (step 1C; step of fixing the first unit).

In detail, the two first bolts 123 are inserted from the left side of the two first bolt holes 124 and fastened. Consequently, as shown in a side view of FIG. 10, the first unit 110 is assembled and fixed to the first object 101.

As shown in FIG. 8, the second unit 111 is attached to the second object 102 from the outside of the second object 102 (step 2; step of attaching the second unit).

In detail, in step 2, the second secondary piece 111B is attached to the second object 102 (step 2A: step of attaching the second secondary piece).

In the first embodiment, the second secondary piece 111B is disposed so that, in a state where one of the two second coil parts constituting the second coil 125 is directed to the lower side, the second peripheral surface portion 132 is brought into contact with the outer peripheral surface of the second shaft portion 106 while the second main connector portion 128 is fitted to the second mating connector portion 109. Consequently, the second main connector portion 128 and the second mating connector portion 109 are electrically connected to each other, and the second secondary piece 111B is attached to the second object 102 as shown in a side view of FIG. 11.

As shown in FIG. 8, the first secondary piece 111A is attached to the second object 102 so as to surround the rotation axis AR together with the second secondary piece 111B (step 2B; step of attaching the first secondary piece).

In the first embodiment, the first secondary piece 111A is disposed so that, in a state where the other of the two second coil parts constituting the second coil 125 is directed to the lower side, the second peripheral surface portion 132 is brought into contact with the outer peripheral surface of the second shaft portion 106. At this time, each of the one second coil connectors 131 provided in the first secondary piece 111A is fitted to a corresponding one of the other second coil connectors 131 provided in the second secondary piece 111B. Consequently, the first secondary piece 111A is attached to the second object 102 to form the second coil 125 comprising the two second coil parts connected via the two second coil connectors 118. In addition, the second transmission/reception unit 126 is put into the closed state and forms an annular shape.

As shown in FIG. 8, the first secondary piece 111A and the second secondary piece 111B are fastened and fixed by the second bolts 136 (step 2C; step of fixing the second unit).

In detail, the two second bolts 136 are inserted from the rear side of the two second bolt holes 137 and fastened, respectively. Consequently, as shown in a side view of FIG. 12, the second unit 111 is assembled and fixed to the second object 102.

Thus, the method of attaching the wireless connector 103 to the object (101, 102) is finished, and the wireless connector 103 is attached to the first object 101 and the second object 102 in a fixed state. In addition, the first transmission/reception unit 113 and the second transmission/reception unit 126 are disposed generally in parallel to each other in a direction generally perpendicular to the rotation axis AR in a state of being faced to each other in a non-contact manner along the rotation axis AR outside the first shaft portion 105 and the second shaft portion 106 so as to wirelessly transmit the electric power.

For the wireless connector 103 according to the first embodiment, the order of performing the first unit attaching step (step 1) and the second unit attaching step (step 2) may be replaced. In step 1, the order of performing the second primary piece attaching step (step 1A) and the first primary piece attaching step (step 1B) may be replaced. Similarly, in step 2, the order of performing the second secondary piece attaching step (step 2A) and the first secondary piece attaching step (step 2B) may be replaced.

(Method of Detaching Wireless Connector 103)

Figure 13:
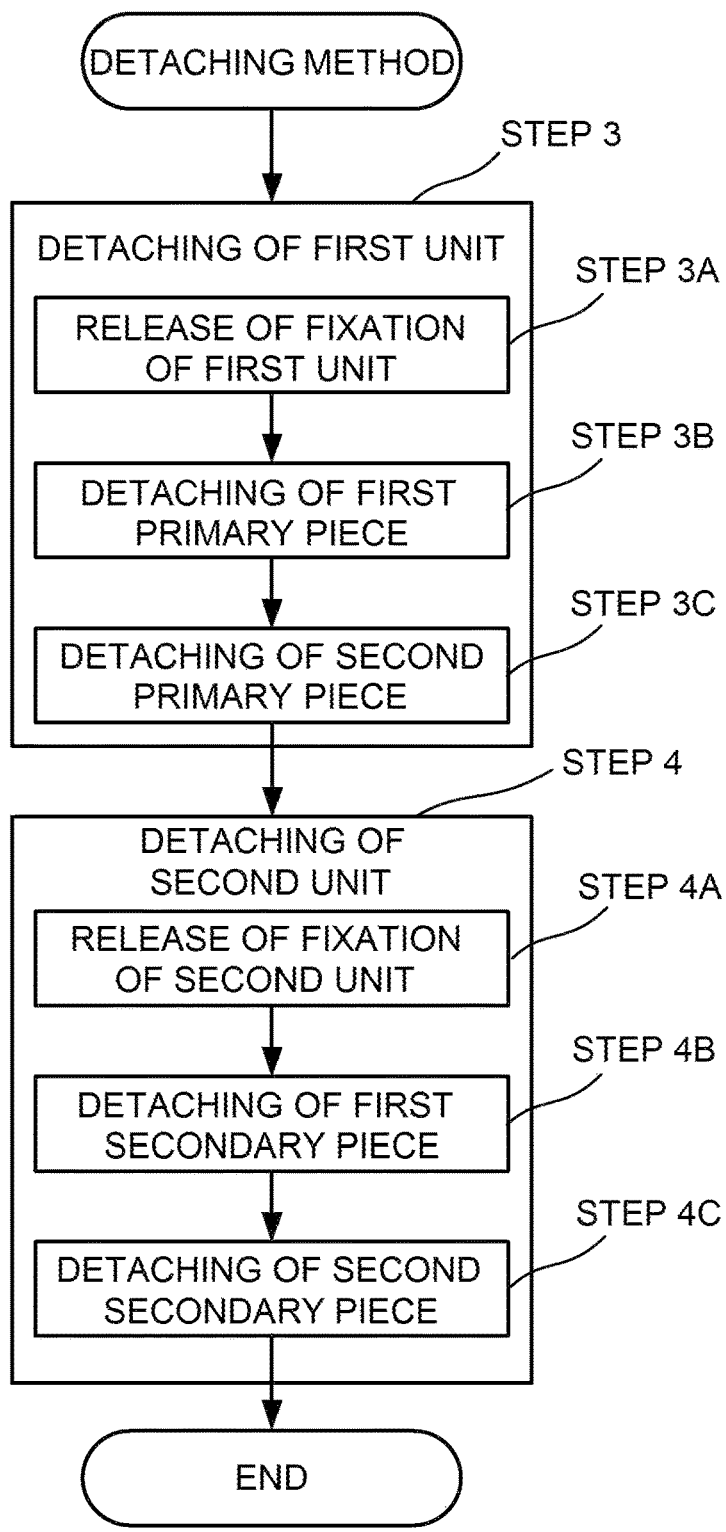
FIG. 13 is a diagram showing a flow of a detaching method of detaching the wireless connector illustrated in FIG. 4 from the first object and the second object illustrated in FIG. 12.

FIG. 13 is a flowchart illustrating a flow of a detaching method of detaching the wireless connector 103 from the object (101, 102). The method of detaching the wireless connector 103 from the object (101, 102) is typically performed as necessary after the wireless connector 103 is attached to the robot device 100 by the above-mentioned method of attaching the wireless connector 103 to the object (101, 102). An example where detachment of the wireless connector 103 from the object (101, 102) is necessary may be a case where the failed wireless connector 103 is replaced with the normal wireless connector 103.

As shown in FIG. 13, the first unit 110 is detached from the first object 101 by work outside the first object 101 (step 3; step of detaching the first unit).

In detail, in step 3, fixation between the first primary piece 110A and the second primary piece 110B is released (step 3A; step of releasing fixation of the first unit).

In the first embodiment, after the two first bolts 123 are loosened to release fitting by the screw action, the two first bolts 123 are pulled out from the left side of the two first bolt holes 124. Thus, the fixation of the first unit 110 is released.

The first primary piece 110A is detached from the first object 101 (step 3B; step of detaching the first primary piece).

In the first embodiment, the first primary piece 110A is pulled out to the right side. Consequently, fitting of the two first coil connectors 118 is released and the first primary piece 110A is detached from the first object 101. In addition, the first transmission/reception unit 113 is put into an open state and has a shape which is not annular.

The second primary piece 110B is detached from the first object 101 (step 3C; step of detaching the second primary piece).

In the first embodiment, the second primary piece 110B is pulled out to the left side. Consequently, fitting of the first main connector portion 115 and the first mating connector portion 108 is released and the second primary piece 110B is detached from the first object 101.

The second unit 111 is detached from the second object 102 by work outside the second object 102 (step 4; step of detaching the second unit).

In detail, in step 4, fixation between the first secondary piece 111A and the second secondary piece 111B is released (step 4A; step of releasing fixation of the second unit).

In the first embodiment, after the two second bolts 136 are loosened to release fitting by the screw action, the two second bolts 136 are pulled out from the rear side of the two second bolt holes 137. Thus, fixation of the second unit 111 is released.

The first secondary piece 111A is detached from the second object 102 (step 4B; step of detaching the first secondary piece).

In the first embodiment, the first secondary piece 111A is pulled out to the front side. Consequently, fitting of the two second coil connectors 131 is released and the first secondary piece 111A is detached from the second object 102. In addition, the second transmission/reception unit 126 is put in an open state and has a shape which is not annular.

The second secondary piece 111B is detached from the second object 102 (step 4C; step of detaching the second secondary piece).

In the first embodiment, the second secondary piece 111B is pulled out to the rear side. Consequently, fitting of the second main connector portion 128 and the second mating connector portion 109 is released and the second secondary piece 111B is detached from the second object 102.

Thus, the method of detaching the wireless connector 103 from the object (101, 102) is finished, and the wireless connector 103 is detached from the object (101, 102).

For the wireless connector 103 according to the first embodiment, the order of performing the first unit detaching step (step 3) and the second unit detaching step (step 4) may be replaced. In step 3, the order of performing the first primary piece detaching step (step 3B) and the second primary piece detaching step (step 3C) may be replaced. Similarly, in step 4, the order of performing the first secondary piece detaching step (step 4B) and the second secondary piece detaching step (step 4C) may be replaced.

According to the first embodiment, when the first main connector portion 115 and the second main connector portion 128 are attached to the first mating connector portion 108 and the second mating connector portion 109, respectively, the first transmission/reception unit 113 and the second transmission/reception unit 126 are disposed in a state of being faced to each other in a non-contact manner along the rotation axis AR outside the first object 101 and the second object 102 so as to wirelessly transmit the electric power.

In other words, when the first unit 110 and the second unit 111 are attached to the first object 101 and the second object 102, respectively, the first transmission/reception unit 113 and the second transmission/reception unit 126 are disposed, each being in a closed annular state, in a state of being faced to each other in a non-contact manner so as to wirelessly transmit the electric power. In this case, the first coil 112 and the second coil 125 are arranged in parallel with each other in a state of being faced to each other in a non-contact manner so as to wirelessly transmit the electric power.

Thus, it is possible to wirelessly transmit the electric power between the first object 101 and the second object 102 even without providing parts interfering with each other between the first unit 110 and the second unit 111 or a part restricting a rotation range of the first object 101 and the second object 102 when the first object 101 and the second object 102 are relatively rotated.

Therefore, it is possible to transmit the electric power between the first object 101 and the second object 102 without restricting a relative rotation range between the first object 101 and the second object 102.

Further, according to the first embodiment, the wireless connector 103 can easily be attached to and detached from the first object 101 and the second object 102 from the outside. Therefore, it is possible to quickly repair the wireless connector 103 when failure occurs.

Heretofore, the first embodiment of the present invention has been described. The present invention is not limited to the first embodiment but includes modes obtained by modifying the first embodiment as follows.

For example, in the first embodiment, an example in which the first coil 112 and the second coil 125 have a flat spiral shape is described. However, the first coil 112 and the second coil 125 may be provided, for example, on curved surfaces having complementary shapes forming a mountain shape and a valley shape, respectively, around the rotation axis AR and may be configured into a spiral shape having a height.

For example, in the first embodiment, description has been made of the case in which the first transmission/reception unit 113 and the first coil 112 in the closed state have the generally circular disc shape having the through-hole, and the second transmission/reception unit 126 and the second coil 125 in the closed state also have the generally circular disc shape having the through-hole. However, the shape of each of the first transmission/reception unit, the first coil, the second transmission/reception unit, and the second coil is only required to be annular in the closed state and is not limited to the generally circular disc shape having the through-hole. The first transmission/reception unit, the first coil, the second transmission/reception unit, and the second coil may have a polygonal annular shape in the closed state. In first and second modifications which will later be described, an example in which the first transmission/reception unit and the first coil have a regular polygonal annular shape in the closed state and the second transmission/reception unit and the second coil also have a regular polygonal annular shape will be described with reference to the drawings.

<First Modification>

Figure 14:
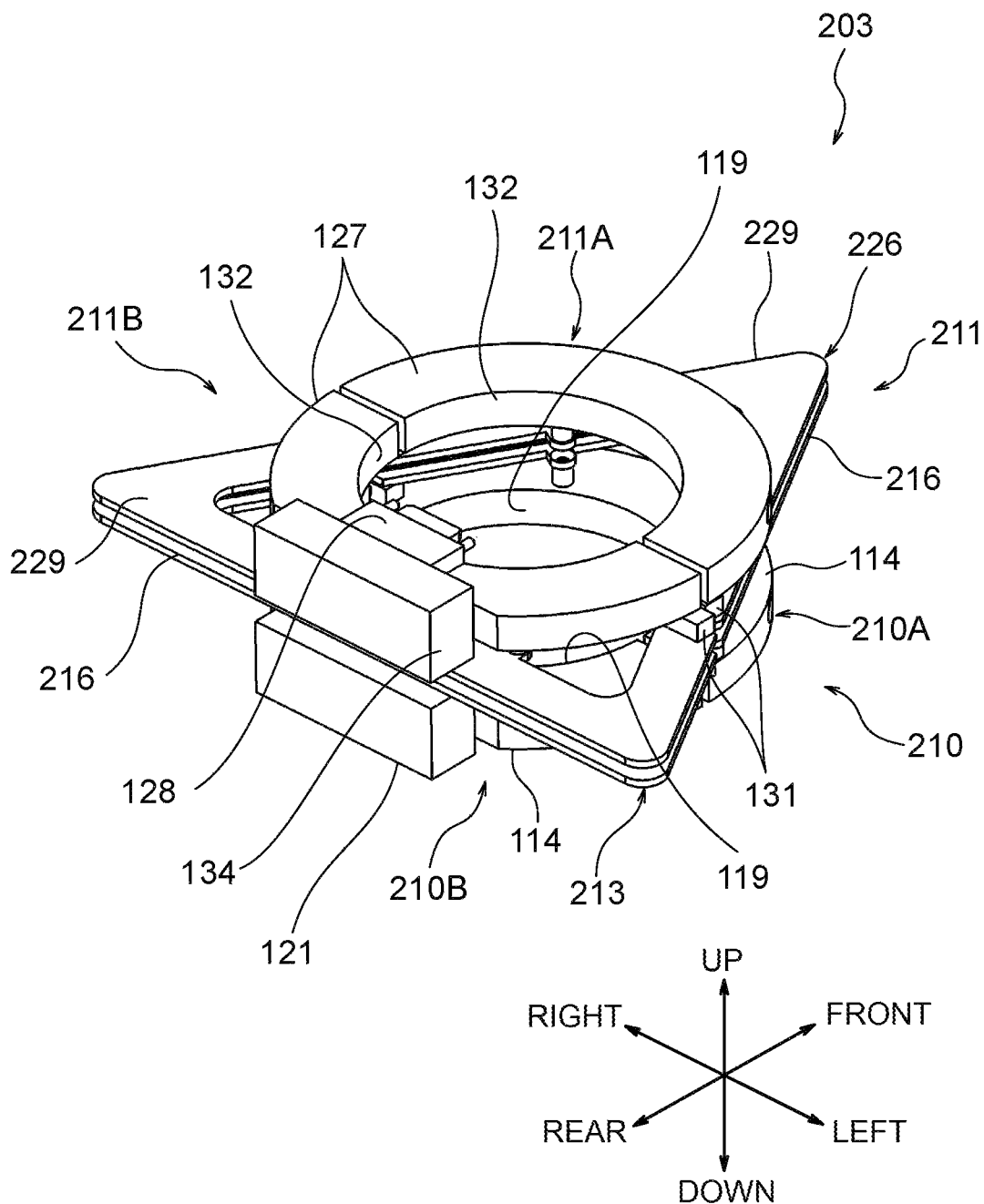
FIG. 14 is a perspective view of a wireless connector according to a first modification of the present invention.

As shown in a perspective view of FIG. 14, a wireless connector 203 according to a first modification includes a first unit 210 including a first transmission/reception unit 213 instead of the first transmission/reception unit 113, and a second unit 211 including a second transmission/reception unit 226 instead of the second transmission/reception unit 126.

Each of the first transmission/reception unit 213 and the second transmission/reception unit 226 is a generally equilateral-triangular annular member having an equilateral-triangular through-hole around the rotation axis AR as a center (center of gravity) in a closed state, and has a plate shape.

The first transmission/reception unit 213 includes a first coil wound in a generally triangular spiral shape by connecting two first coil parts via the two first coil connectors similar to those of the first embodiment, and a first holding plate 216 provided with the first coil on its upper surface. The second transmission/reception unit 226 includes a second coil wound in a generally triangular spiral shape by connecting two second coil parts via the two second coil connectors 131 similar to those of the first embodiment, and a second holding plate 229 provided with the second coil on its lower surface.

As described above, in the wireless connector 203 according to the first modification, the shapes of the first transmission/reception unit 213, the first coil, the first holding plate 216, the second transmission/reception unit 226, the second coil, and the second holding plate 229 are different from the respective shapes according to the above-mentioned first embodiment.

Except the above-mentioned points, the wireless connector 203 is configured similarly to the wireless connector 103 according to the first embodiment.

Specifically, for example, the first unit 210 is configured by combining a first primary pierce 210A on the front side and a second primary piece 210B on the rear side, which are divisible via the first dividing plane including the rotation axis AR. The second unit 211 is configured by combining a first secondary piece 211A on the front side and a second secondary piece 211B on the rear side, which are divisible via the second dividing plane including the rotation axis AR. Each of the first primary piece 210A, the second primary piece 210B, the first secondary piece 211A, and the second secondary piece 211B, when divided, is not annular.

<Second Modification>

Figure 15:
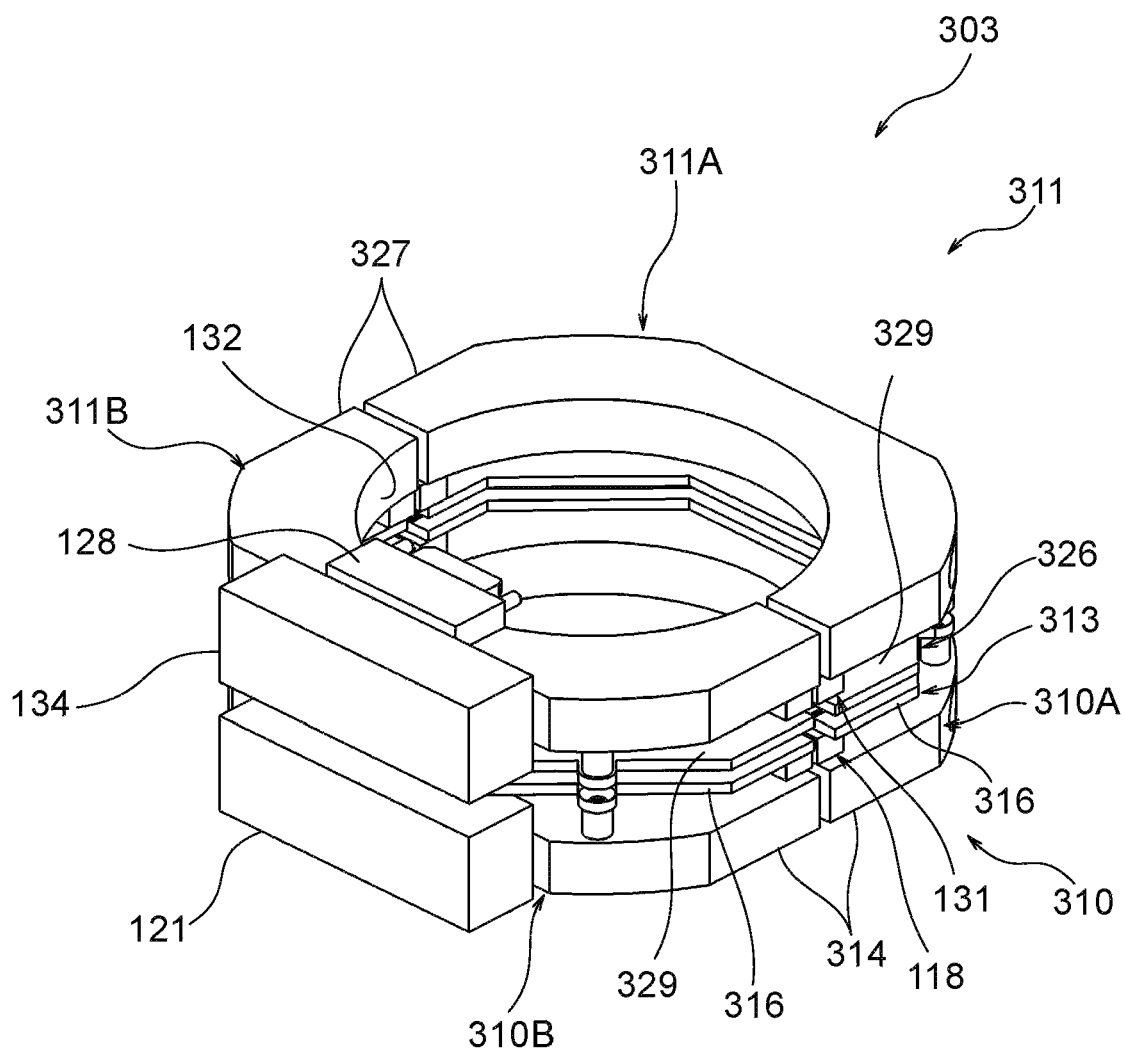
FIG. 15 is a perspective view of a wireless connector according to a second modification of the present invention.
Figure 15:
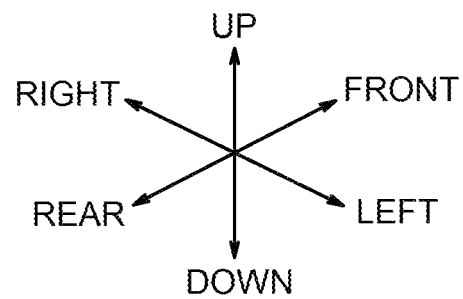

As shown in a perspective view of FIG. 15, a wireless connector 303 according to a second modification includes a first unit 310 instead of the first unit 110, and a second unit 311 instead of the second unit 111.

The first unit 310 includes a first transmission/reception unit 313 instead of the first transmission/reception unit 113, and two first guide portions 314 instead of the two first guide portions 114. The second unit 311 includes a second transmission/reception unit 326 instead of the second transmission/reception unit 126, and two second guide portions 327 instead of the two second guide portions 127.

Each of the first transmission/reception unit 313 and the second transmission/reception unit 326 is a generally regular-octagonal annular member having a regular-octagonal through-hole around the rotation axis AR as a center (center of gravity) in a closed state, and has a plate shape.

The first transmission/reception unit 313 includes a first coil wound in a generally octagonal spiral shape by connecting two first coil parts via the two first coil connectors 118 similar to those of the above-mentioned first embodiment, and a first holding plate 316 provided with the first coil on its upper surface. The second transmission/reception unit 326 includes a second coil wound in a generally octagonal spiral shape by connecting two second coil parts via the two second coil connectors 131 similar to those of the above-mentioned first embodiment, and a second holding plate 329 provided with the second coil on its lower surface.

As described above, in the wireless connector 303 according to the second modification, the shapes of the first transmission/reception unit 213, the first coil, the first holding plate 216, the second transmission/reception unit 226, the second coil, and the second holding plate 229 are different from the respective shapes according to the above-mentioned first embodiment.

Each of the two first guide portions 314 and the two second guide portions 327 has, as an outer shape viewed from above, a generally octagonal shape or a square shape having four corners cut in a gentle arc shape.

Except the above-mentioned points, the wireless connector 303 is configured similarly to the wireless connector 103 according to the above-mentioned first embodiment.

Specifically, for example, the first unit 310 is configured by combining a first primary piece 310A on the front side and a second primary piece 310B on the rear side, which are divisible via the first dividing plane including the rotation axis AR. The second unit 311 is configured by combining a first secondary piece 311A on the front side and a second secondary piece 311B on the rear side, which are divisible via the second dividing plane including the rotation axis AR. Each of the first primary piece 310A, the second primary piece 310B, the first secondary piece 311A, and the second secondary piece 311B, when divided, is not annular.

By the wireless connectors 203 and 303 according to the first and the second modifications, it is possible to wirelessly transmit the electric power between the first object 101 and the second object 102 without restricting the relative rotation range between the first object 101 and the second object 102, similarly to the wireless connector 103 according to the above-mentioned first embodiment. In addition, it is possible to quickly repair the wireless connectors 203 and 303.

Second Embodiment

In the above-mentioned first embodiment and the above-mentioned first and the second modifications described above, description has been made of the examples in which each of the first transmission/reception units 113, 213, 313 and the second transmission/reception units 126, 226, and 326 has a flat-plate shape. However, the shape of each of the first transmission/reception unit and the second transmission/reception unit is only required to be an openable and closable annular shape, and may be an annular shape having a length in the up-and-down direction, that is, a tubular shape. In the second embodiment which will be described below, an example in which each of the first transmission/reception unit and the second transmission/reception unit has a generally circular cylindrical shape, among tubular shapes, will be described.

(Configuration of Robot Device According to Second Embodiment)

A robot device according to a second embodiment of the present invention includes the first object 101 and the second object 102 similar to those of the first embodiment described above, and a wireless connector 403 for wirelessly transmitting the electric power between the first object 101 and the second object 102.

Figure 16:
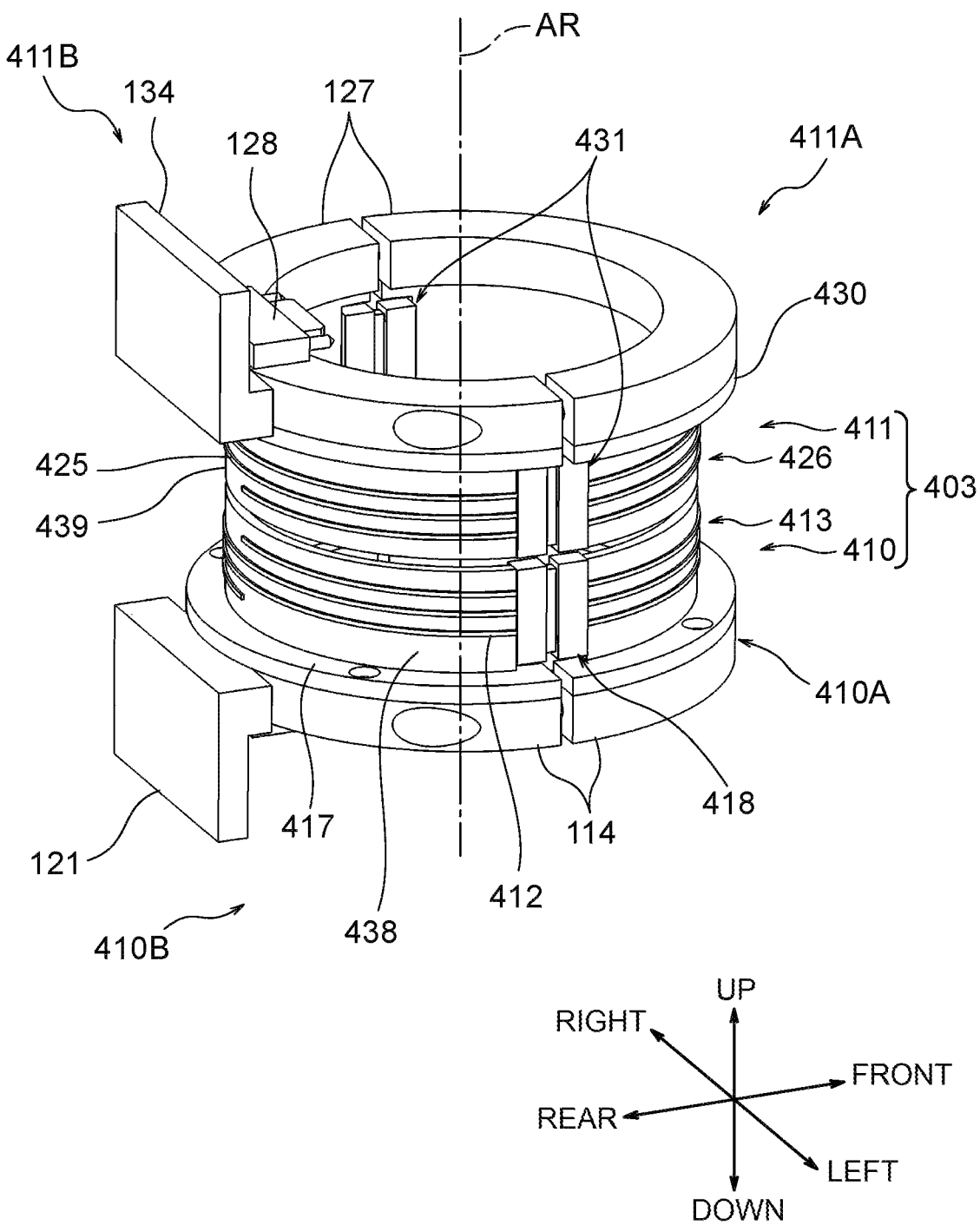
FIG. 16 is a perspective view of a wireless connector according to a second embodiment of the present invention.
Figure 17:
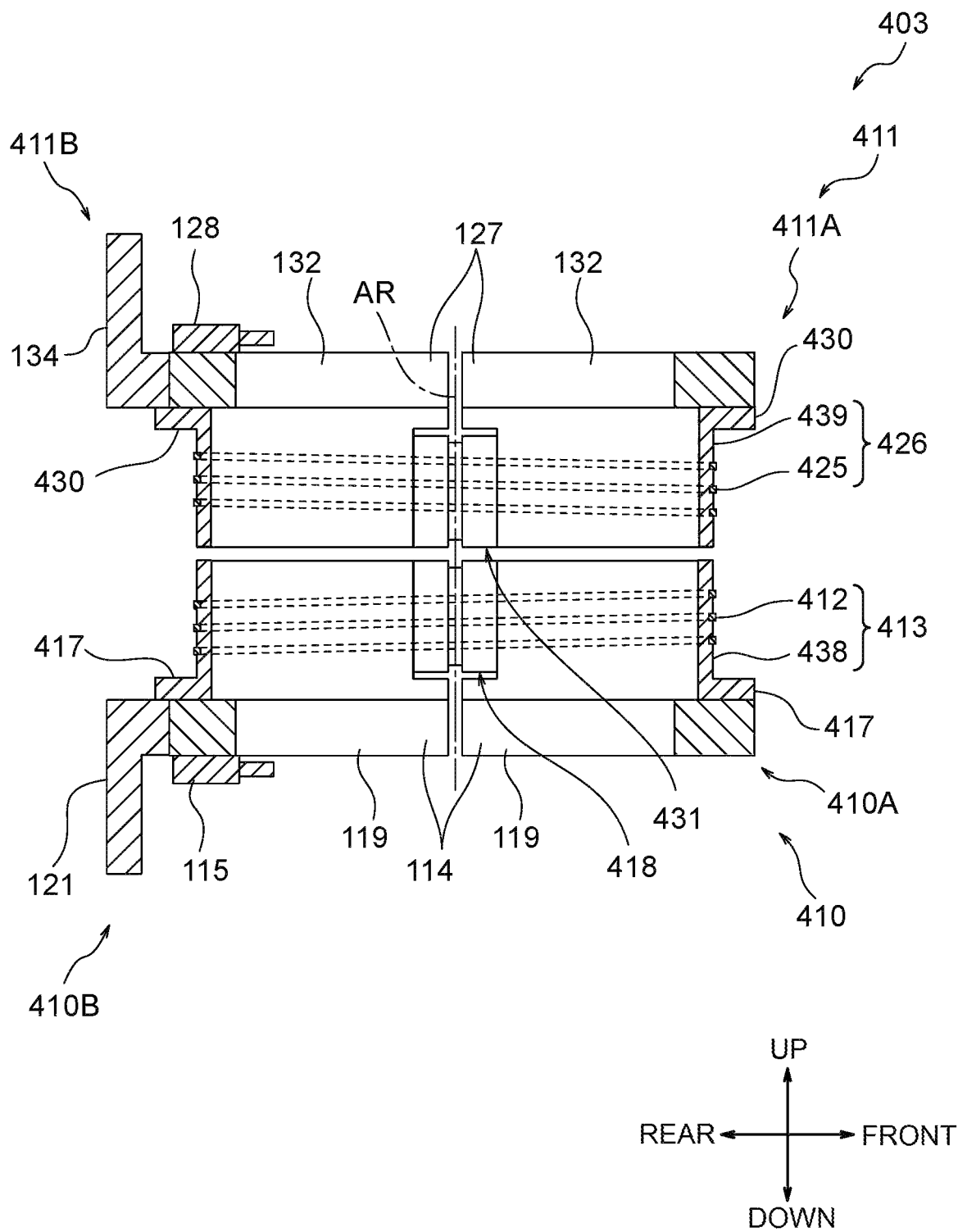
FIG. 17 is a side sectional view of the wireless connector illustrated in FIG. 16.

As shown in a perspective view of FIG. 16 and a side sectional view of FIG. 17, the wireless connector 403 includes a first unit 410 instead of the first unit 110 and a second unit 411 instead of the second unit 111. The first unit 410 includes a first transmission/reception unit 413 instead of the first transmission/reception unit 113, and the second unit 411 includes a second transmission/reception unit 426 instead of the second transmission/reception unit 126.

Except the configurations of the first transmission/reception unit 413 and the second transmission/reception unit 426, the wireless connector 403 according to the second embodiment may be configured generally similarly to the wireless connector 103 according to the above-mentioned first embodiment. In order to simplify the description, in the second embodiment, different points between the first transmission/reception unit 413 and the first transmission/reception unit 113 according to the above-mentioned first embodiment, and different points between the second transmission/reception unit 426 and the second transmission/reception unit 126 according to the first embodiment will mainly be described.

In a closed state, the first transmission/reception unit 413 is, as a whole, a generally circular annular member having a through-hole centered on the rotation axis AR and, in the second embodiment, has a generally circular cylindrical shape having the through-hole. The first transmission/reception unit 413 includes a first coil 412 for wirelessly transmitting the electric power and a first holding portion 438 for holding the first coil 412.

The first holding portion 438 according to the second embodiment is composed of two semi-circular-cylindrical members. In a closed state, the first holding portion 438 is, as a whole, a generally circular cylindrical member having a columnar through-hole centered on the rotation axis AR, and is made of, for example, resin. The first holding portion 438 has flange-shaped first protrusions 417 formed at a lower end and protruding outward to be fixed to the first guide portions 114 similar to those of the first embodiment.

The first coil 412 is composed of two first coil parts separable from each other. The first coil 412 is configured by connecting two wiring patterns, which include the two first coil parts provided on an outer peripheral surface of the first holding portion 438, via two first coil connectors 418 in the state where the first holding portion 438 is closed. The first coil 412 has a spiral shape along the rotation axis AR in a state where the first transmission/reception unit 413 is closed, and is provided in a generally circular annular region (generally on a circumference in the second embodiment) having a through-hole centered on the rotation axis AR when viewed from above. The first coil 412 may be provided on an inner peripheral surface of the first holding portion 438.

The first transmission/reception unit 413 according to the second embodiment may be configured by fixing a flexible substrate with the first coil 412 printed thereon to the first holding portion 438 by an adhesive, a double-sided tape, or the like/

In a closed state, the second transmission/reception unit 426 is, as a whole, a generally circular annular member having a through-hole centered on the rotation axis AR and, in the second embodiment, has a generally circular cylindrical shape having a through-hole similarly to the first transmission/reception unit 413 described above. The dimension thereof is substantially the same as that of the first transmission/reception unit 413.

The second transmission/reception unit 426 and the first transmission/reception unit 413 are, when attached to the second object 102 and the first object 101, respectively, spaced from each other along the rotation axis AR to be disposed in a state of being faced to each other in a non-contact manner, similarly to the above-mentioned first embodiment. Therefore, the second transmission/reception unit 426 and the first transmission/reception unit 413 are arranged so as not to overlap each other when viewed from a direction perpendicular to the rotation axis AR.

The second transmission/reception unit 426 includes a second coil 425 for wirelessly transmitting the electric power and a second holding portion 439 for holding the second coil 425.

Similarly to the above-mentioned first holding portion 438 mentioned above, the second holding portion 439 according to the second embodiment is composed of two semi-circular-cylindrical members. In a closed state, the second holding portion 439 is, as a whole, a generally circular cylindrical member having a columnar through-hole centered on the rotation axis AR, and is made of, for example, resin. The dimension of the second holding portion 439 is generally the same as that of the first holding portion 438. The second holding portion 439 has flange-shaped second protrusions 430 protruding outward to be fixed to the second guide portions 127 similar to those of the above-mentioned first embodiment.

The second coil 425 is composed of two second coil parts separable from each other. The second coil 425 is configured by connecting two wiring patterns, which include two second coil parts provided on an outer peripheral surface of the second holding portion 439, via two second coil connectors 431 in a state where the second holding portion 439 is closed. The second coil 425 has a spiral shape along the rotation axis AR in a state where the second transmission/reception unit 426 is closed, and is provided in a generally circular annular region (generally on a circumference in the second embodiment) having a through-hole centered on the rotation axis AR when viewed from above. The second coil 425 may be provided on an inner peripheral surface of the second holding portion 439.

The second transmission/reception unit 426 according to the second embodiment may be configured by fixing a flexible substrate with the second coil 425 printed thereon to the second holding portion 439 by an adhesive, a double-sided tape, or the like.

Except these points, the wireless connector 403 may be configured similarly to the wireless connector 103 according to the above-mentioned first embodiment.

Specifically, for example, the first unit 410 is configured by combining a first primary piece 410A on the front side and a second primary piece 410B on the rear side, which are divisible via the first dividing plane including the rotation axis AR. The second unit 411 is configured by combining a first secondary piece 411A on the front side and a second secondary piece 411B on the rear side, which are divisible via the second dividing plane including the rotation axis AR. Each of the first primary piece 410A, the second primary piece 410B, the first secondary piece 411A, and the second secondary piece 411B, when divided, is not annular.

FIG. 16 and FIG. 17 show an example in which the first and the second transmission/reception units 413 and 426 are directly fixed to the first and the second guide portions 114 and 127, respectively. However, it is needless to say that, as in the above-mentioned first embodiment, the first and the second transmission/reception units 413 and 426 may be fixed to the first and the second guide portions 114 and 127 via the first and the second spacers 120 and 133, respectively.

(Operation and Attaching and Detaching Method for Wireless Connector 403 According to Second Embodiment)

In the wireless connector 403 according to the second embodiment, the first coil 412 and the second coil 425 are magnetically coupled in the manner similar to the first coil 112 and the second coil 125 of the wireless connector 103 according to the above-mentioned first embodiment described with reference to FIG. 7, respectively. Therefore, the wireless connector 403 can operate similarly to the wireless connector 103 according to the above-mentioned first embodiment.

The wireless connector 403 according to the second embodiment can also be attached and detached by the method similar to that for the wireless connector 103 according to the above-mentioned first embodiment described with reference to FIG. 8 and FIG. 13.

By the wireless connector 403 according to the second embodiment also, it is possible to wirelessly transmit the electric power between the first object 101 and the second object 102 without restricting the relative rotation range between the first object 101 and the second object 102, as in the above-mentioned first embodiment. Further, the wireless connector 403 can easily be attached to and detached from the first object 101 and the second object 102 from the outside, similarly to the wireless connector 103 according to the above-mentioned first embodiment. Therefore, it is possible to quickly repair the wireless connector 403 when failure occurs.

Third Embodiment

In the second embodiment described above, description has been made of the example in which the first transmission/reception unit 413 and the second transmission/reception unit 426 have circular cylindrical shapes substantially same in size. However, the first transmission/reception unit 413 and the second transmission/reception unit 426 may have cylindrical shapes fitted to each other. In the third embodiment which will be described below, an example in which the first transmission/reception unit and the second transmission/reception unit are fitted to each other by having cylindrical shapes different in diameter will be described.

(Configuration of Robot Device 500 According to Third Embodiment)

Figure 18:
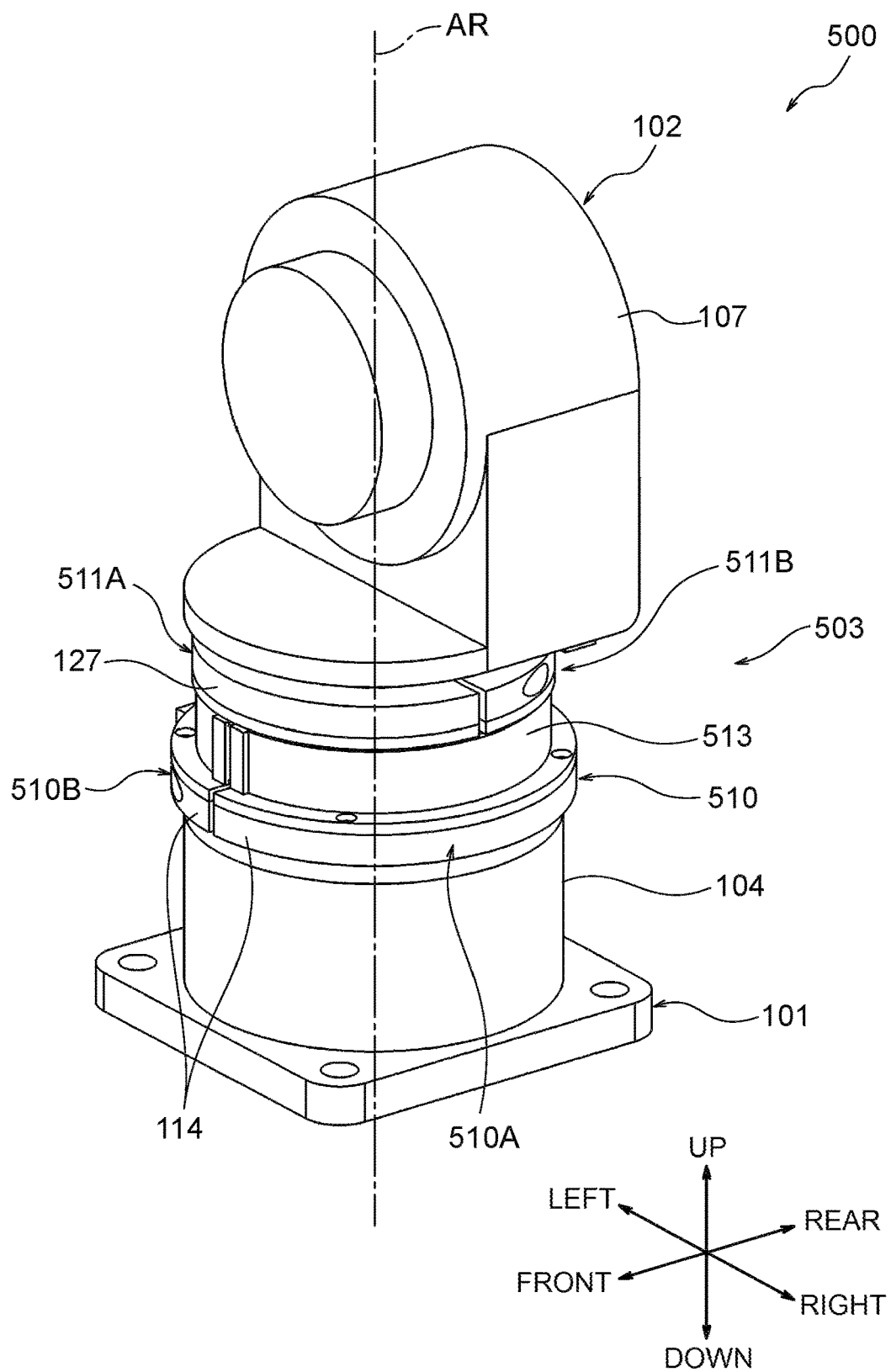
FIG. 18 is a perspective view of a robot device according to a third embodiment of the present invention.

As shown in a perspective view of FIG. 18, a robot device 500 according to the third embodiment of the present invention includes the first object 101 and the second object 102 similar to those of the above-mentioned first embodiment, and a wireless connector 503 for wirelessly transmitting the electric power between the first object 101 and the second object 102.

Figure 19:
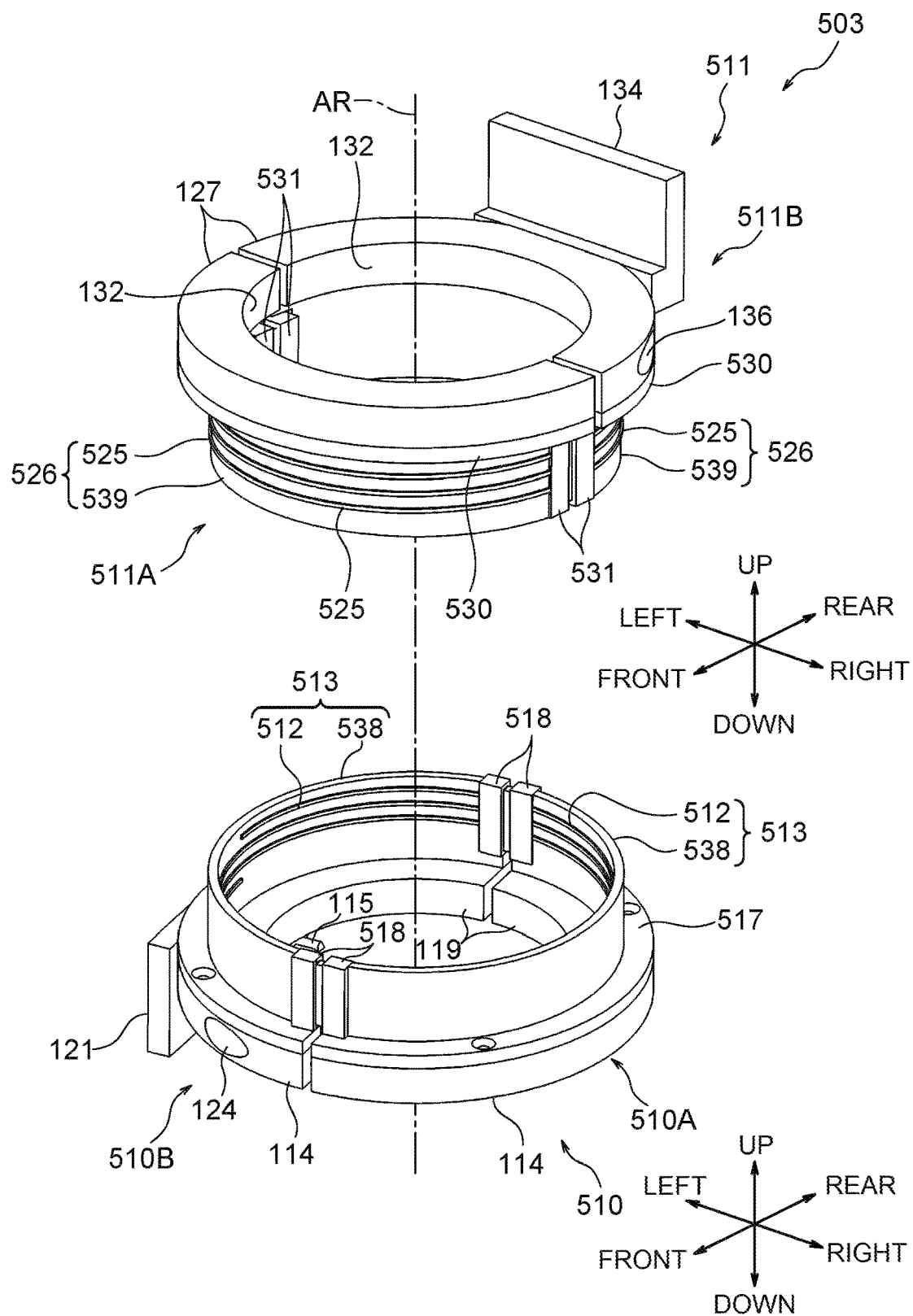
FIG. 19 is a perspective view showing a first unit and a second unit of a wireless connector used in the robot device illustrated in FIG. 18.
Figure 20:
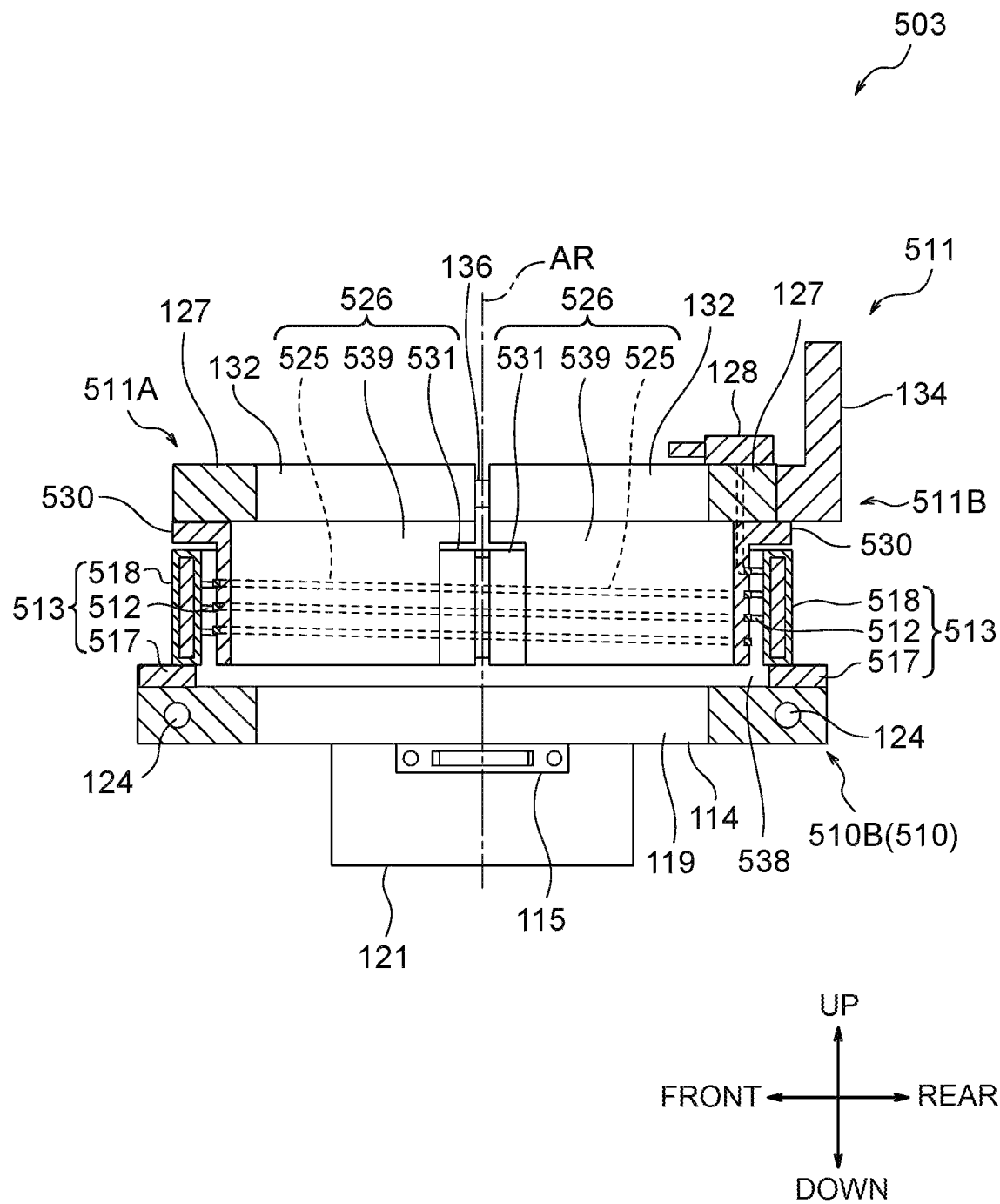
FIG. 20 is a side sectional view of the wireless connector illustrated in FIG. 19 in a state of being attached to the first object and the second object.

As shown in a perspective view of FIG. 19 and a side sectional view of FIG. 20, the wireless connector 503 includes a first unit 510 instead of the first unit 410 and a second unit 511 instead of the second unit 411. The first unit 510 includes a first transmission/reception unit 513 instead of the first transmission/reception unit 413, and the second unit 511 includes a second transmission/reception unit 526 instead of the second transmission/reception unit 426.

Except the configurations of the first transmission/reception unit 513 and the second transmission/reception unit 526, the wireless connector 503 according to the third embodiment may be configured substantially similarly to the wireless connector 403 according to the above-mentioned second embodiment. In order to simplify the description, in the third embodiment, different points between the first transmission/reception unit 513 and the first transmission/reception unit 413 according to the above-mentioned second embodiment, and different points between the second transmission/reception unit 526 and the second transmission/reception unit 426 according to the above-mentioned second embodiment will be described.

In a closed state, the first transmission/reception unit 513 is, as a whole, a generally circular annular member having a through-hole centered on the rotation axis AR, and has a generally circular cylindrical shape having the through-hole as in the above-mentioned second embodiment. The first transmission/reception unit 513 includes a first coil 512 for wirelessly transmitting the electric power, and a first holding portion 538 for holding the first coil 512.

The first holding portion 538 according to the third embodiment may be configured similarly to the first holding portion 438 according to the above-mentioned second embodiment. Specifically, the first holding portion 538 is composed of two semi-circular-cylindrical members. In a closed state, the first holding portion 538 is, as a whole, a generally circular cylindrical member having a columnar through-hole centered on the rotation axis AR, and is made of, for example, resin. The first holding portion 538 has flange-shaped first protrusions 517 formed at a lower end and protruding outward to be fixed to the first guide portions 114 similar to those of the above-mentioned first embodiment.

The first coil 512 is composed of two first coil parts separable from each other. The first coil 512 is configured by connecting two wiring patterns, which include the two first coil parts provided on an inner peripheral surface of the first holding portion 538, via two first coil connectors 518 in the state where the first holding portion 538 is closed. The first coil 512 has a spiral shape along the rotation axis AR in the state where the first transmission/reception unit 513 is closed, and is provided in a generally circular annular region (generally on a circumference in the third embodiment) having a through-hole centered on the rotation axis AR when viewed from above.

The first transmission/reception unit 513 according to the third embodiment may be configured by fixing a flexible substrate with the first coil 512 printed thereon to the inner peripheral surface of the first holding portion 538 by an adhesive, a double-sided tape, or the like.

In a closed state, the second transmission/reception unit 526 is, as a whole, a generally circular annular member having a through-hole centered on the rotation axis AR, and has a generally circular cylindrical shape having the through-hole similarly to the above-mentioned first transmission/reception unit 513.

In the third embodiment, in the closed state, the diameter of an outer peripheral surface of the second transmission/reception unit 526 is smaller than the diameter of an inner peripheral surface of the first transmission/reception unit 513. Thus, the second transmission/reception unit 526 attached to the second object 102 is fitted to the inside of the first transmission/reception unit 513 attached to the first object 101 with a gap left therefrom. Therefore, when the first unit 510 and the second unit 511 are attached to the first object 101 and the second object 102, respectively, the second transmission/reception unit 526 and the first transmission/reception unit 513 are arranged so as to overlap each other when viewed from a direction perpendicular to the rotation axis AR. Thus, the second transmission/reception unit 526 and the first transmission/reception unit 513 according to the third embodiment are spaced from each other along the direction perpendicular to the rotation axis AR to be disposed in a state of being faced to each other in a non-contact manner.

The second transmission/reception unit 526 includes a second coil 525 for wirelessly transmitting the electric power and a second holding portion 539 for holding the second coil 525.

The second holding portion 539 according to the third embodiment is composed of two semi-cylindrical members. In a closed state, the second holding portion 539 is, as a whole, a generally circular cylindrical member having a columnar through-hole centered on the rotation axis AR, and is made of, for example, resin. The dimension of the second holding portion 539 in the direction of the rotation axis AR is generally the same as that of the first holding portion 538. In contrast, the dimension of the second holding portion 539 in a radial direction is smaller than that of the first holding portion 538. The second holding portion 539 has flange-shaped second protrusions 530 formed at an upper end and protruding outward to be fixed to the second guide portions 127 similar to those of the above-mentioned first embodiment.

The second coil 525 is composed of two second coil parts separable from each other. The second coil 525 is configured by connecting two wiring patterns, which include the two second coil parts provided on an outer peripheral surface of the second holding portion 539, via two second coil connectors 531 in the state where the second holding portion 539 is closed. The second coil 525 has a spiral shape along the rotation axis AR in a state where the second transmission/reception unit 526 is closed, and is provided in a generally circular annular region (generally on a circumference in the third embodiment) having a through-hole centered on the rotation axis AR when viewed from above.

The second transmission/reception unit 526 according to the third embodiment may be configured by fixing a flexible substrate with the second coil 525 printed thereon to the outer peripheral surface of the second holding portion 539 by an adhesive, a double-sided tape, or the like.

Except these points, the wireless connector 503 may be configured similarly to the wireless connector 403 according to the above-mentioned second embodiment.

Specifically, for example, the first unit 510 is configured by combining a first primary piece 510A on the right side and a second primary piece 510B on the left side, which are divisible via the first dividing plane including the rotation axis AR. The second unit 511 is configured by combining a first secondary piece 511A on the front side and a second secondary piece 511B on the rear side, which are divisible via the second dividing plane including the rotation axis AR. Each of the first primary piece 510A, the second primary piece 510B, the first secondary piece 511A, and the second secondary piece 511B, when divided, is not annular.

FIG. 18 to FIG. 20 show an example in which the first and the second transmission/reception units 513 and 526 are directly fixed to the first and the second guide portions 114 and 127, respectively. However, it is needless to say that, as in the above-mentioned first embodiment, the first and the second transmission/reception units 513 and 526 may be fixed to the first and the second guide portions 114 and 127 via the first and the second spacers 120 and 133, respectively.

(Operation of Wireless Connector 503 According to Third Embodiment)

According to the wireless connector 503 of the third embodiment, the first coil 512 and the second coil 525 are spaced from each other along the direction perpendicular to the rotation axis AR to be disposed in a state of being faced to each other in a non-contact manner. Similarly to the first coil 112 and the second coil 125 of the wireless connector 103 according to the above-mentioned first embodiment described with reference to FIG. 7, the first coil 512 and the second coil 525 are magnetically coupled. Therefore, the wireless connector 503 can operate similarly to the wireless connector 103 according to the above-mentioned first embodiment.

In the third embodiment, the first coil 512 and the second coil 525 are provided on those peripheral surfaces, which are closely adjacent to each other, among the inner peripheral surfaces and the outer peripheral surfaces of the first holding portion 538 and the second holding portion 539, respectively. Consequently, the first coil 512 and the second coil 525 can be disposed in close proximity. As a result, coupling force of magnetic field coupling between the first coil 512 and the second coil 525 is increased to enable efficient wireless power transmission.

(Wireless Connector Attaching and Detaching Method According to Third Embodiment)

Figure 21:
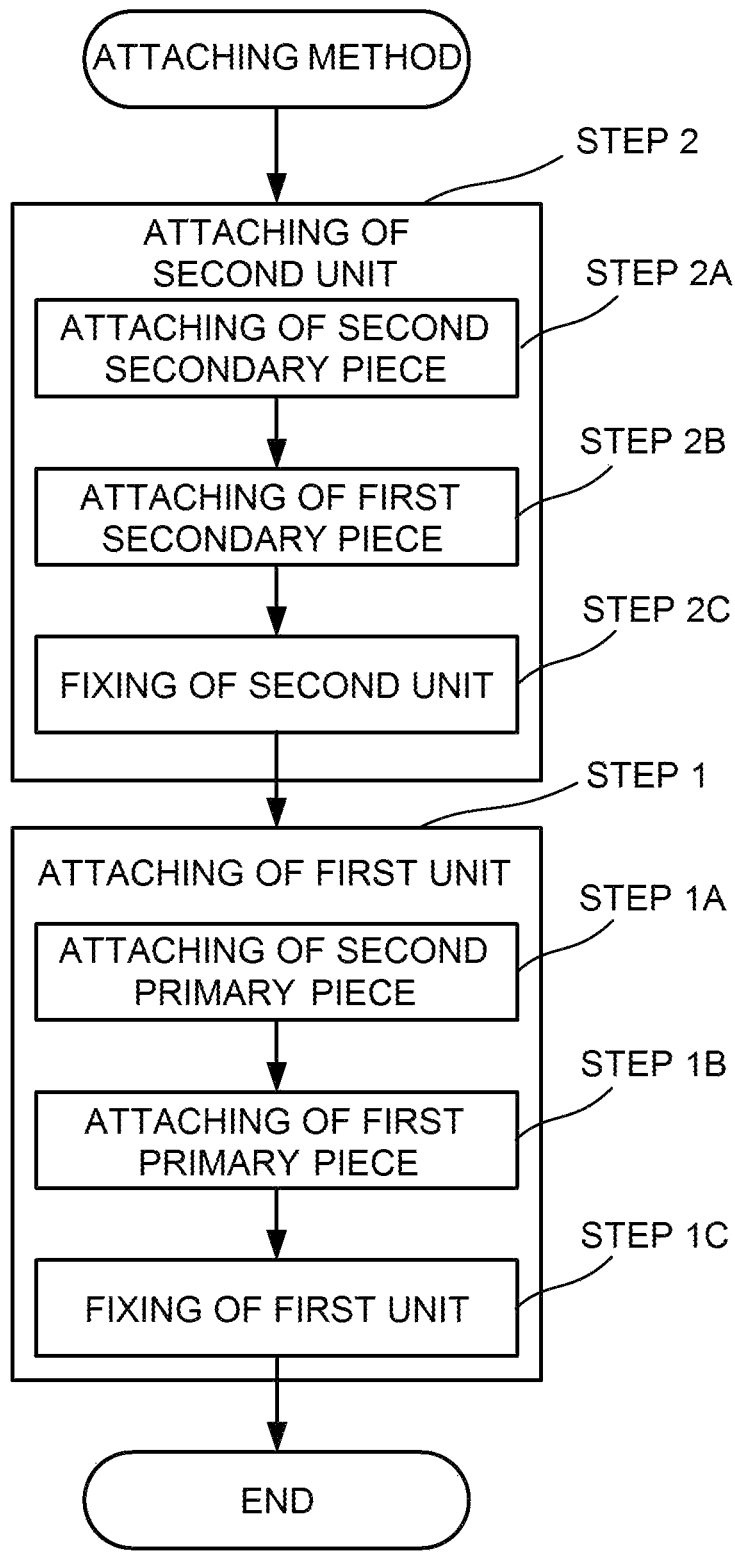
FIG. 21 is a diagram showing a flow of an attaching method of attaching the wireless connector illustrated in FIG. 19 to the first object and the second object illustrated in FIG. 20.

In the wireless connector 503 according to the third embodiment, the second transmission/reception unit 526 is disposed inside the first transmission/reception unit 513. Therefore, in the method of attaching the wireless connector to the object (101, 102) according to the third embodiment, as shown in a flowchart of FIG. 21, a second unit attaching step (step 2) is performed first, followed by a first unit attaching step (step 1). Details of the step 2 and the step 1 are generally similar to those of the above-mentioned first embodiment.

The detaching method of detaching the wireless connector 503 according to the third embodiment from the object (101, 102) may be the method similar to that for the wireless connector 103 according to the above-mentioned first embodiment described with reference to FIG. 13.

By the wireless connector 503 according to the third embodiment also, it is possible to wirelessly transmit the electric power between the first object 101 and the second object 102 without restricting the relative rotation range between the first object 101 and the second object 102, as in the above-mentioned first embodiment. Further, similarly to the wireless connector 103 according to the above-mentioned first embodiment, the wireless connector 503 can easily be attached to and detached from the first object 101 and the second object 102 from the outside. Therefore, it is possible to quickly repair the wireless connector 503 when failure occurs.

Fourth Embodiment

In the above-mentioned first to the third embodiments, description has been made of the example in which the first coils 112, 412, 512 and the second coils 125, 425, and 525 are formed by printed wirings. However, the first coil and the second coil may be a conductor wire, a coated conductor wire obtained by coating the conductor wire, or the like. In a fourth embodiment which will be described below, an example in which first coil and second coil formed by coated conductor wires are used in place of the first coil 112 and the second coil 125 of the wireless connector 103 according to the above-mentioned first embodiment will be described.

The first coil and the second coil formed by the coated conductor wires as described below may be used as the first coil and the second coil according to the other embodiments, such as the second and the third embodiments.

(Configuration of Robot Device 600 According to Fourth Embodiment)

Figure 22:
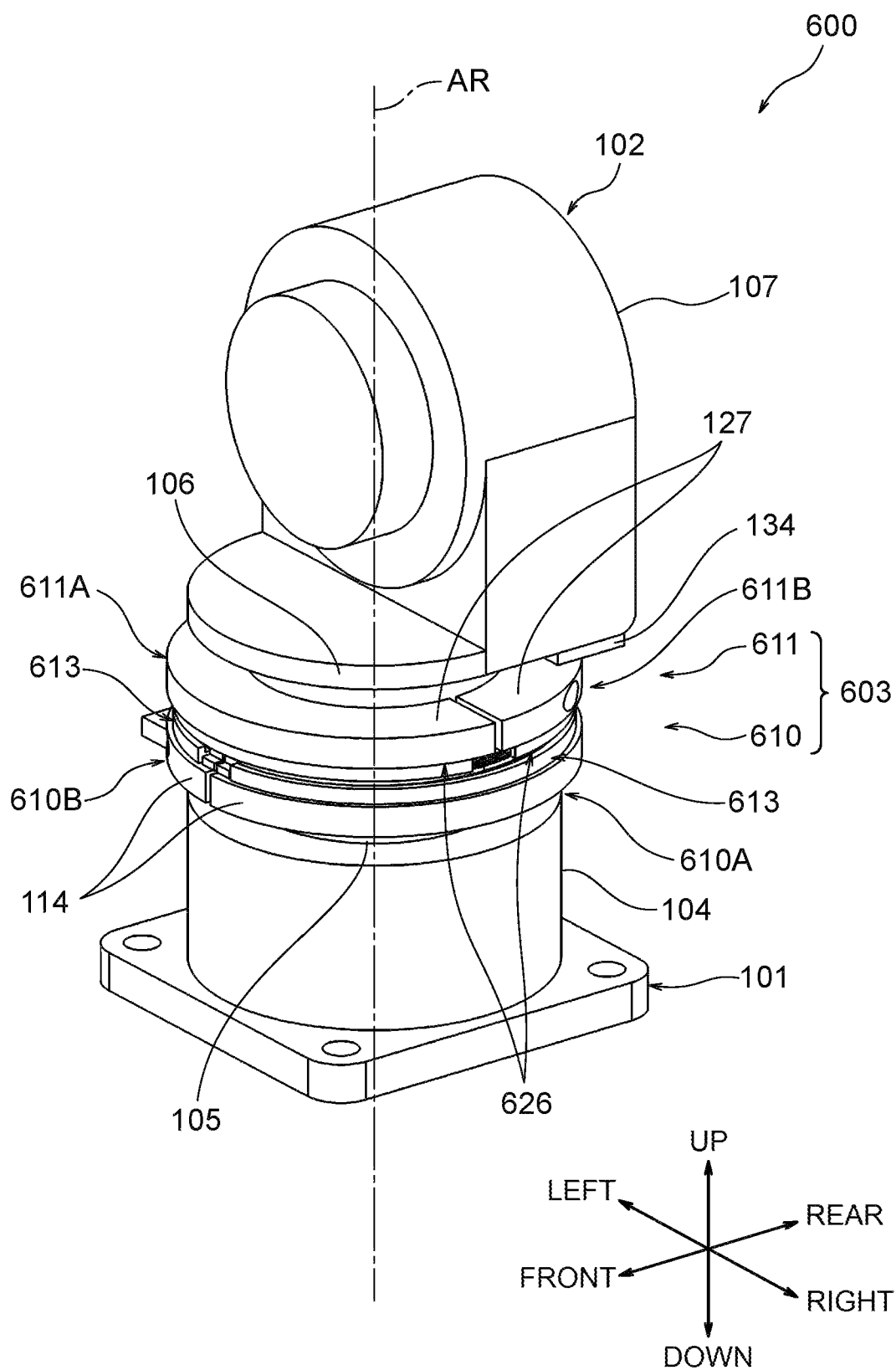
FIG. 22 is a perspective view of a robot device according to a fourth embodiment of the present invention.

As shown in a perspective view of FIG. 22, a robot device 600 according to the fourth embodiment of the present invention includes the first object 101 and the second object 102 similar to those of the above-mentioned first embodiment, and a wireless connector 603 for wirelessly transmitting the electric power between the first object 101 and the second object 102.

As shown in a perspective view of FIG. 22, the wireless connector 603 includes a first unit 610 instead of the first unit 110 and a second unit 611 instead of the second unit 111. As shown in a perspective view of FIG. 23, the first unit 610 includes a first transmission/reception unit 613 instead of the first transmission/reception unit 113. As shown in a perspective view of FIG. 24, the second unit 611 includes a second transmission/reception unit 626 instead of the second transmission/reception unit 126.

Except the configurations of the first transmission/reception unit 613 and the second transmission/reception unit 626, the wireless connector 603 according to the fourth embodiment may be configured generally similarly to the wireless connector 103 according to the above-mentioned first embodiment. In order to simplify the description, in the fourth embodiment, different points between the first transmission/reception unit 613 and the first transmission/reception unit 113 according to the above-mentioned first embodiment, and different points between the second transmission/reception unit 626 and the second transmission/reception unit 126 according to the above-mentioned first embodiment will be described.

Figure 23:
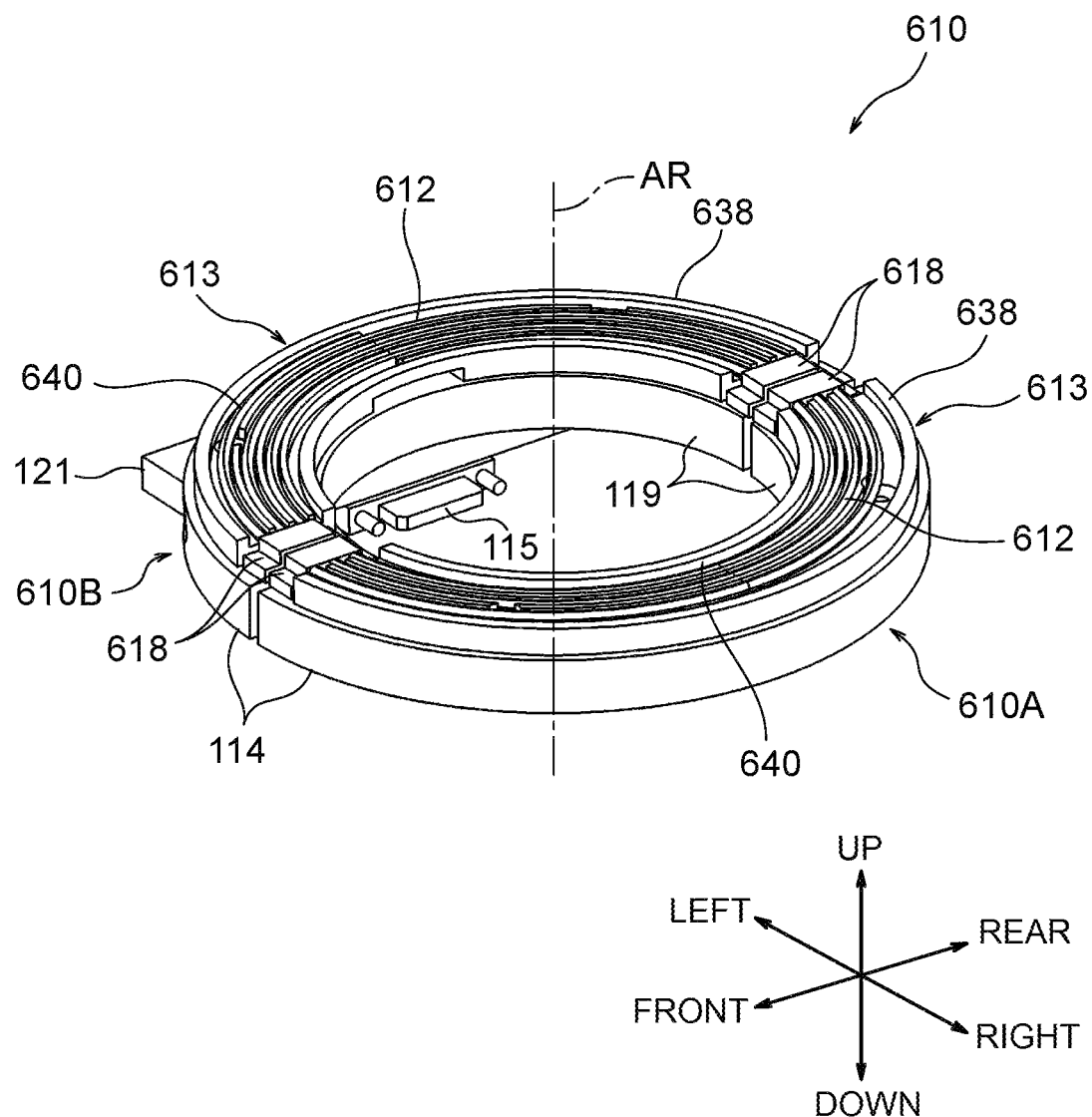
FIG. 23 is a perspective view of a first unit of a wireless connector used in the robot device illustrated in FIG. 22.

As shown in FIG. 23, in a closed state, the first transmission/reception unit 613 is, as a whole, is a generally circular annular member having a through-hole centered on the rotation axis AR, and has a generally circular disc shape having the through-hole as in the above-mentioned first embodiment. The first transmission/reception unit 613 includes a first coil 612 for wirelessly transmitting the electric power and a first holding portion 638 for holding the first coil 612.

In a closed state, the first holding portion 638 according to the fourth embodiment is, as a whole, a generally circular annular member having a circular through-hole centered on the rotation axis AR, and is made of, for example, resin. The first holding portion 638 has a plurality of first annular groove portions 640 on one main surface (an upper surface in the fourth embodiment). The first annular groove portions 640 according to the fourth embodiment are provided in three rows, each forming a circular annular groove. It is required to provide one or more first annular groove portions 640.

The first holding portion 638 has a plurality of through-holes penetrating in the up-and-down direction, and is fixed to the first guide portions 114, similar to those of the above-mentioned first embodiment, by screws provided through the respective through-holes. A method of fixing the first holding portion 638 to the first guide portions 114 is not limited to screwing, and any appropriate method such as an adhesive or a double-sided tape may be adopted.

The first coil 612 is composed of two first coil parts separable from each other. The first coil 612 is configured by connecting two coated conductor patterns, which constitute the two first coil parts fitted to the first annular groove portions 640, via two first coil connectors 618 in the state where the first holding portion 638 is closed. The coated conductor wires constituting the first coil 612 are accommodated in the first holding portion 638 by being fitted into the first annular groove portions 640. The first coil 612 is provided in a generally circular annular region having a through-hole centered on the rotation axis AR when viewed from above in the state where the first transmission/reception unit 613 is closed, and has a generally flat spiral shape in the fourth embodiment. An upper side of the first coil 612 may be covered by fixing a lid (not shown) to the first holding portion 638.

Figure 24:
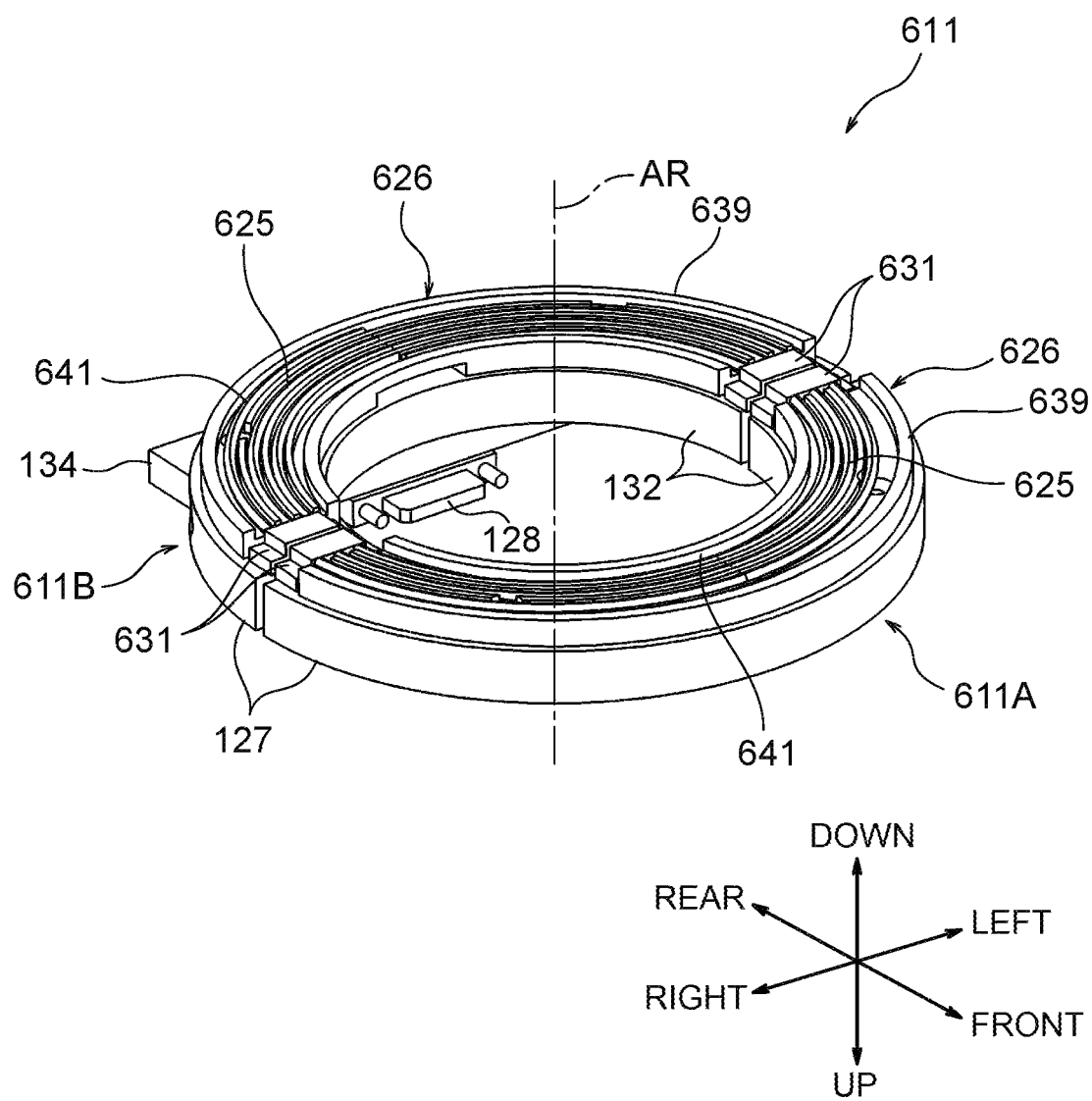
FIG. 24 is a perspective view of a second unit of the wireless connector used in the robot device illustrated in FIG. 22.

As shown in FIG. 24, in a closed state, the second transmission/reception unit 626 is, as a whole, a generally circular annular member having a circular through-hole centered on the rotation axis AR, and has a generally circular disc shape having the through-hole as in the above-mentioned first embodiment. The second transmission/reception unit 626 includes a second coil 625 for wirelessly transmitting the electric power and a second holding portion 639 for holding the second coil 625.

In a closed state, the second holding portion 639 according to the fourth embodiment is, as a whole, a generally circular annular member having a circular through-hole centered on the rotation axis AR, and is made of, for example, resin. The second holding portion 639 has a plurality of second annular groove portions 641 on one main surface (a lower surface in the fourth embodiment). The second annular groove portions 641 according to the fourth embodiment are provided in three rows, each forming a circular annular groove. It is only required to provide one or more second annular groove portions 641.

The second holding portion 639 has a plurality of through-holes penetrating in the up-and-down direction, and is fixed to the second guide portions 127, similar to the above-mentioned first embodiment, by screws provided through the respective through-holes. A method of fixing the second holding portion 639 to the second guide portions 127 is not limited to screwing, and any appropriate method such as an adhesive or a double-sided tape may be adopted.

The second coil 625 is composed of two second coil parts separable from each other. The second coil 625 is configured by connecting two coated conductor patterns, which constitute the two second coil parts fitted to the second annular groove portions 641, via two second coil connectors 631 in the state where the second holding portion 639 is closed. The coated conductor wires constituting the second coil 625 are accommodated in the second holding portion 639 by being fitted into the second annular groove portions 641. The second coil 625 is provided in a generally circular annular region having a through-hole centered on the rotation axis AR when viewed from above in the state where the second transmission/reception unit 626 is closed, and has a generally flat spiral shape in the fourth embodiment. A lower side of the second coil 625 may be covered by fixing a lid (not shown) to the second holding portion 639.

Except these points, the wireless connector 603 may be configured similarly to the wireless connector 103 according to the above-mentioned first embodiment.

Specifically, for example, the first unit 610 is configured by combining a first primary piece 610A on the right side and a second primary piece 610B on the left side, which are divisible via the first dividing plane including the rotation axis AR. The second unit 611 is configured by combining a first secondary piece 611A on the front side and a second secondary piece 611B on the rear side, which are divisible via the second dividing plane including the rotation axis AR. Each of the first primary piece 610A, the second primary piece 610B, the first secondary piece 611A, and the second secondary piece 611B, when divided, is not annular.

FIG. 22 to FIG. 24 show an example in which the first and the second transmission/reception units 613 and 626 are directly fixed to the first and the second guide portions 114 and 127, respectively. However, it is needless to say that, as in the above-mentioned first embodiment, the first and the second transmission/reception units 613 and 626 may be fixed to the first and the second guide portions 114 and 127 via the first and the second spacers 120 and 133, respectively.

(Operation and Attaching and Detaching Method for Wireless Connector 603 According to Fourth Embodiment)

According to the wireless connector 603 of the fourth embodiment, the first coil 612 and the second coil 625 are magnetically coupled similarly to the first coil 112 and the second coil 125 of the wireless connector 103 according to the above-mentioned first embodiment described with reference to FIG. 7. Therefore, the wireless connector 603 can operate similarly to the wireless connector 103 according to the above-mentioned first embodiment.

The wireless connector 603 according to the fourth embodiment can also be attached and detached by the method similar to that for the wireless connector 103 according to the above-mentioned first embodiment described with reference to FIG. 8 and FIG. 13.

By the wireless connector 603 according to the fourth embodiment also, it is possible to wirelessly transmit the electric power between the first object 101 and the second object 102 without restricting the relative rotation range between the first object 101 and the second object 102, as in the above-mentioned first embodiment. Further, similarly to the wireless connector 103 according to the above-mentioned first embodiment, the wireless connector 603 can easily be attached to and detached from the first object 101 and the second object 102 from the outside. Therefore, it is possible to quickly repair the wireless connector 603 when failure occurs.

Fifth Embodiment

The first transmission/reception units 113, 213, 313, 413, 513 and 613 and the second transmission/reception units 126, 226, 326, 426, 526, and 626, which have been described above, are arranged so as to face each other in a non-contact manner with a gap left from each other. Therefore, foreign matters such as liquid droplets and dust may enter a space therebetween. Examples of the dust include metal powder, gravel, and the like which are scattered around.

In a case where such foreign matter is relatively large, rotating operation between the first transmission/reception units 113, 213, 313, 413, 513, and 613 and the second transmission/reception units 126, 226, 326, 426, 526, and 626 may possibly be interfered and these units may be damaged by the foreign matter. Even if the foreign matter is very small, coupling force between the coils due to magnetic field coupling may be weakened when the foreign matter is accumulated together with oil droplets or the like.

In order to prevent such intrusion of the foreign matter into the space between the first transmission/reception units 113, 213, 313, 413, 513, and 613 and the second transmission/reception units 126, 226, 326, 426, 526, and 626, a protecting portion may be provided. In the fifth embodiment, description will be made of an example in which the protecting portion is provided in a wireless connector as a modification of the wireless connector 103 according to the above-mentioned first embodiment. Note that the protecting portion according to the fifth embodiment may be appropriately modified and applied to the wireless connectors according to the other embodiments such as the second to the fourth embodiments.

(Configuration of Robot Device 700 According to Fifth Embodiment)

Figure 25:
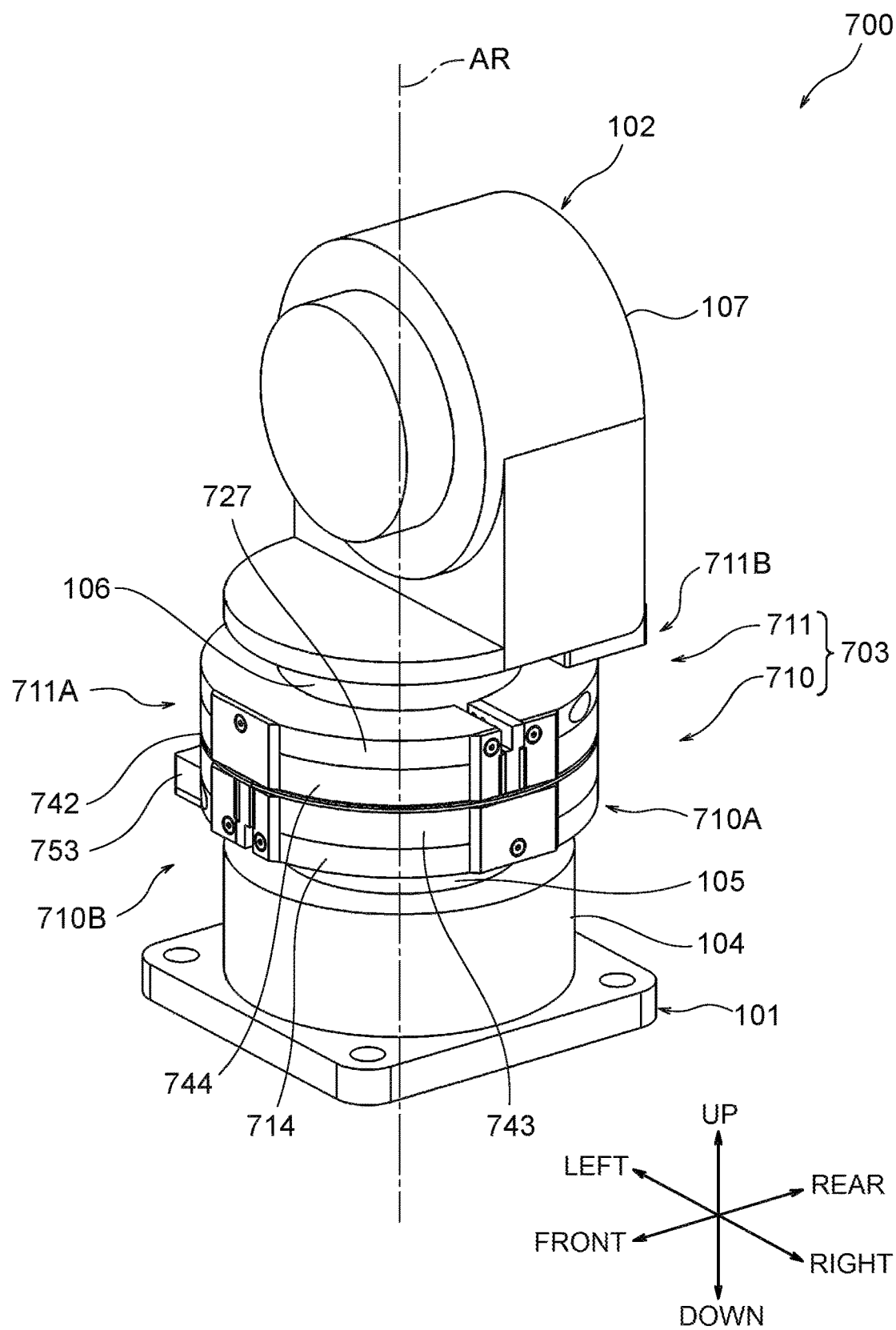
FIG. 25 is a perspective view of a robot device according to a fifth embodiment of the present invention.

As shown in a perspective view of FIG. 25, a robot device 700 according to the fifth embodiment of the present invention includes the first object 101 and the second object 102 similar to those of the above-mentioned first embodiment, and a wireless connector 703 for wirelessly transmitting electric power between the first object 101 and the second object 102.

As shown in FIGS. 25 to 30, the wireless connector 703 includes a first unit 710 instead of the first unit 110 and a second unit 711 instead of the second unit 111. Further, the wireless connector 703 includes an elastic member 742 interposed between the first unit 710 and the second unit 711.

Figure 26:
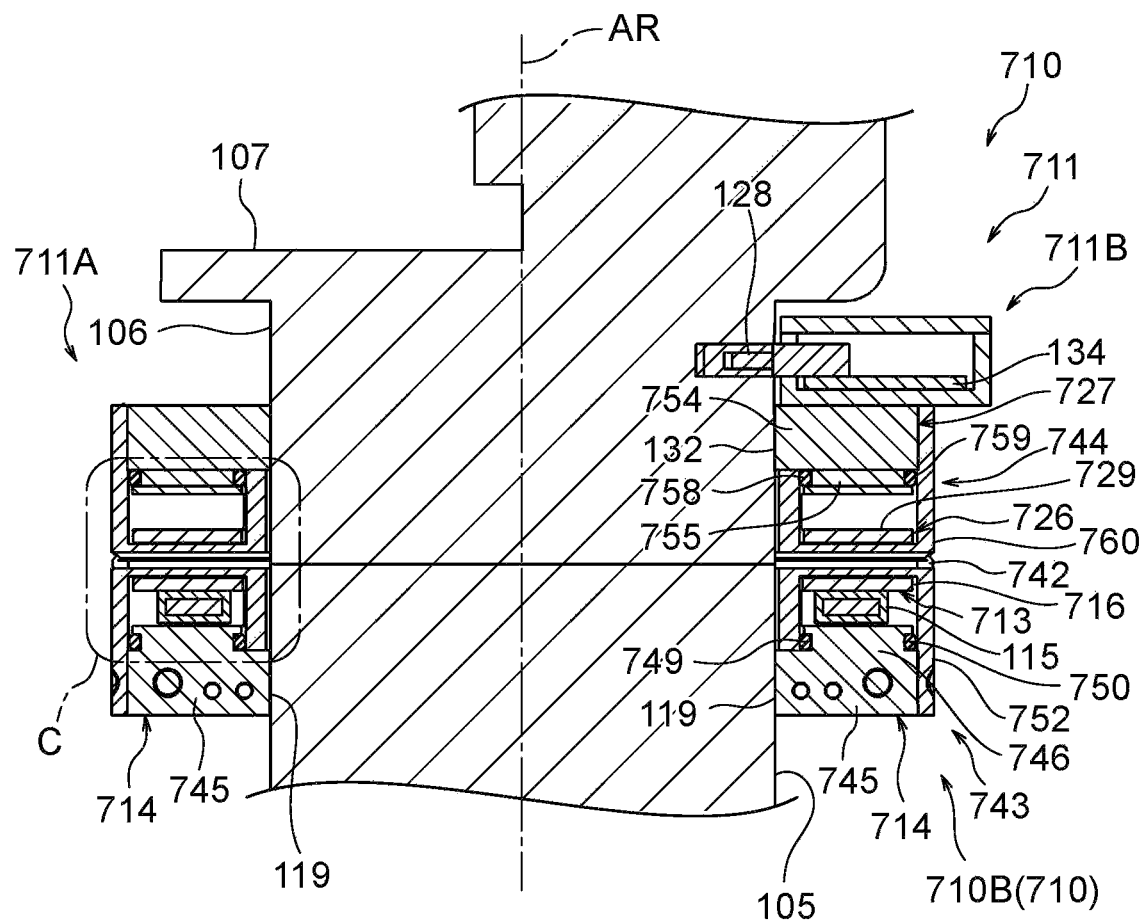
FIG. 26 is a side sectional view of a wireless connector attached to the robot device illustrated in FIG. 25.
Figure 26:
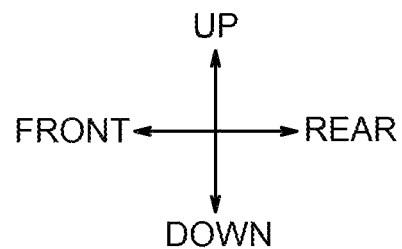
Figure 27:
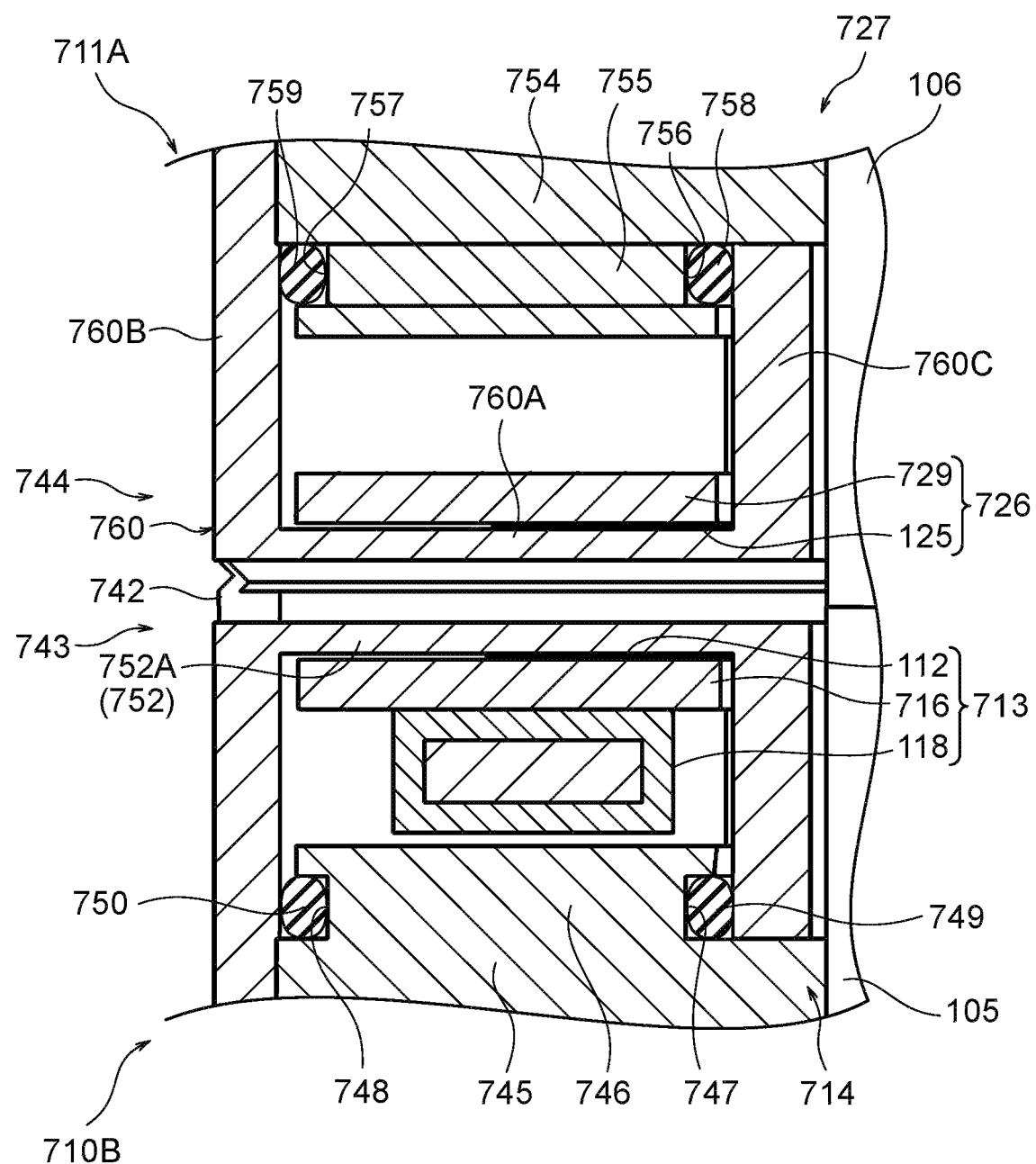
FIG. 27 is an enlarged side sectional view of the vicinity of an area surrounded by a dash-dot-dash line in FIG. 26.
Figure 27:
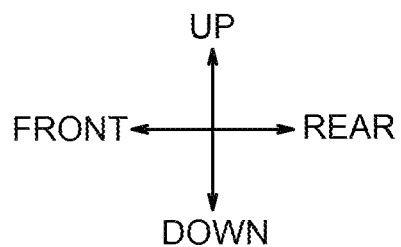

Herein, FIG. 25 is a perspective view of the robot device 700 according to the fifth embodiment. FIG. 26 is a view of a cross section of the wireless connector 703 attached to the object (101, 102) of the robot device 700 at the first dividing plane including the rotation axis AR as viewed from a right side. FIG. 27 is an enlarged sectional view of the vicinity of a part surrounded by a dash-dot-dash line C in FIG. 26.

Figure 28:
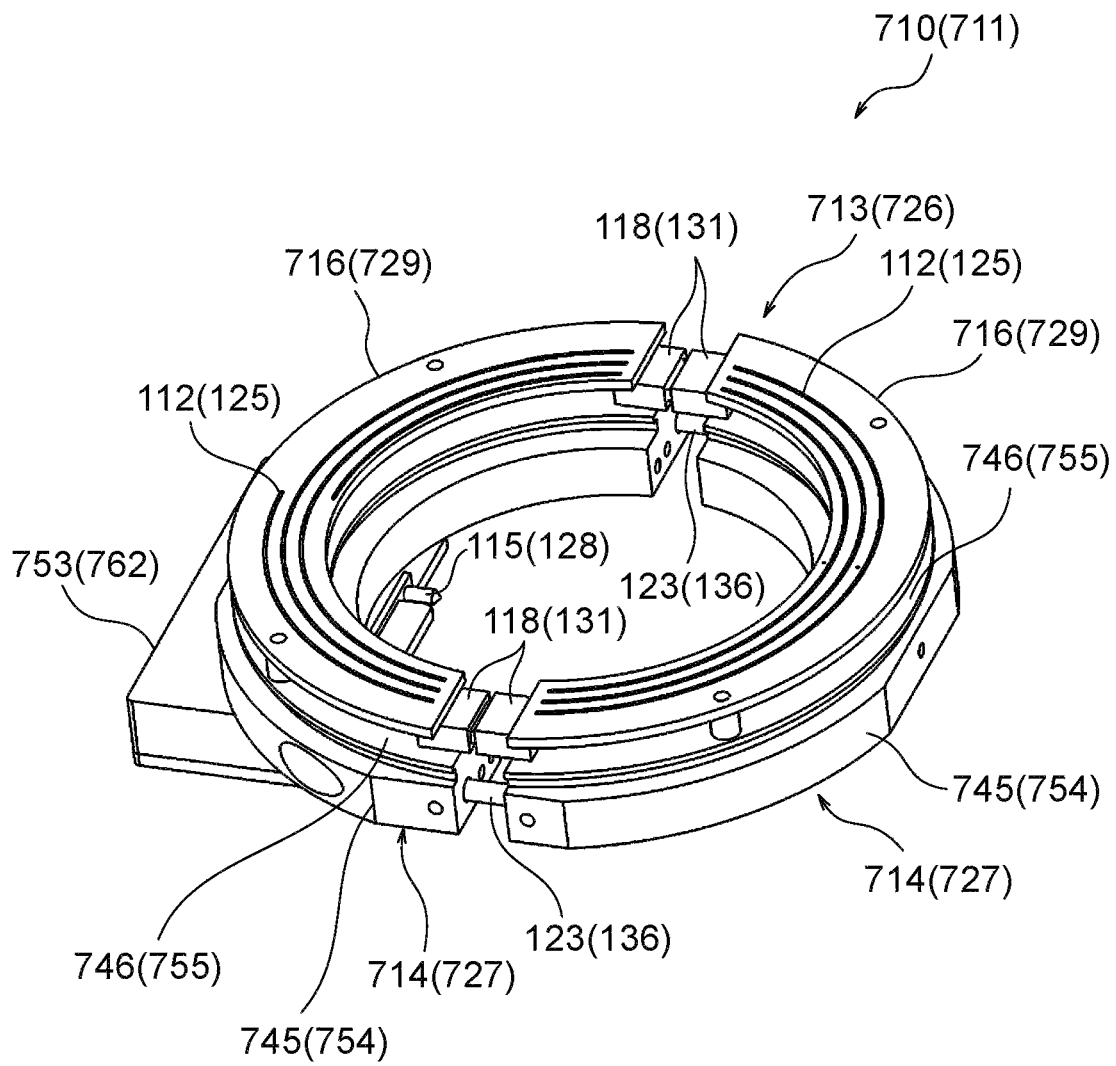
FIG. 28 is a perspective view of a first unit (second unit) constituting the wireless connector used in the robot device illustrated in FIG. 25.

FIG. 28 is a perspective view of the first unit 710 constituting the wireless connector 703 according to the fifth embodiment. In FIG. 28, reference numerals of constituent components of the second unit 711 are indicated in parentheses following reference numerals of corresponding constituent components of the first unit 710. Arrows in parentheses indicating frontward, rearward, upward, downward, leftward, and rightward directions correspond to the second unit 711.

Figure 29:
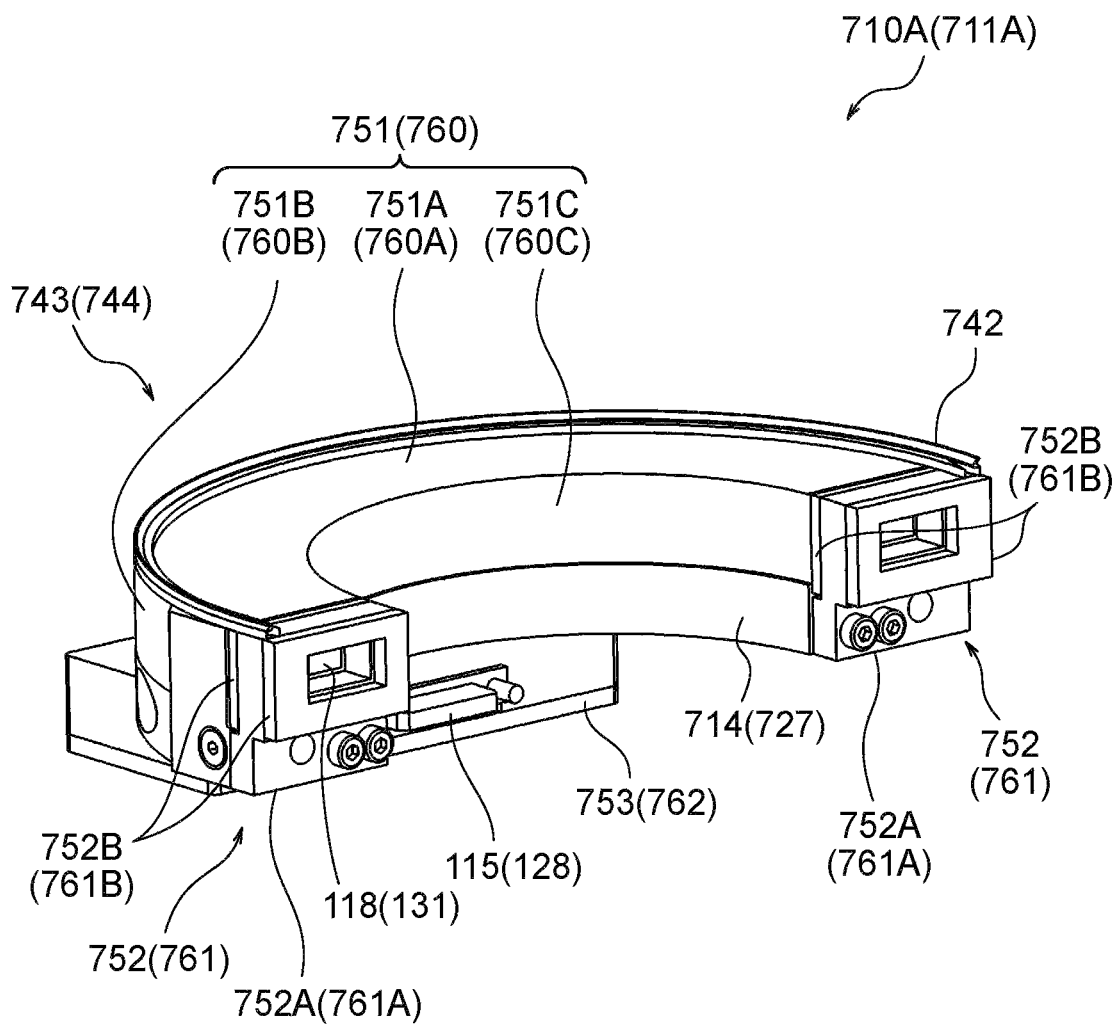
FIG. 29 is a perspective view of a first primary piece (first secondary piece) used in the first unit (second unit) illustrated in FIG. 28.
Figure 29:
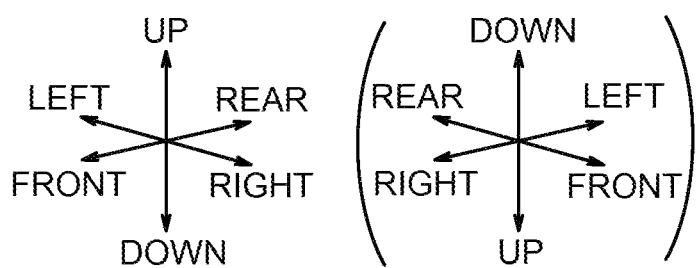

Also in the fifth embodiment, the first unit 710 is configured by combining a first primary piece 710A on the right side and a second primary piece 710B on the left side, which are divisible via the first dividing plane including the rotation axis AR. FIG. 29 is a perspective view showing the first primary piece 710A, and FIG. 30 is a perspective view showing the second primary piece 710B.

The second unit 711 is configured by combining a first secondary piece 711A on the front side and a second secondary piece 711B on the rear side, which are divisible via the second dividing plane including the rotation axis AR. The first secondary piece 711A and the second secondary piece 711B have generally the same configurations as the first primary piece 710A and the second primary piece 710B, respectively, except that the elastic member 742 is not provided.

Therefore, in FIG. 29, reference numerals of constituent components of the first secondary piece 711A are indicated in parentheses following reference numerals of the corresponding components of the first primary piece 710A. In addition, in FIG. 29, arrows in parentheses indicating frontward, rearward, upward, downward, leftward, and rightward directions correspond to the first secondary piece 711A.

Figure 30:
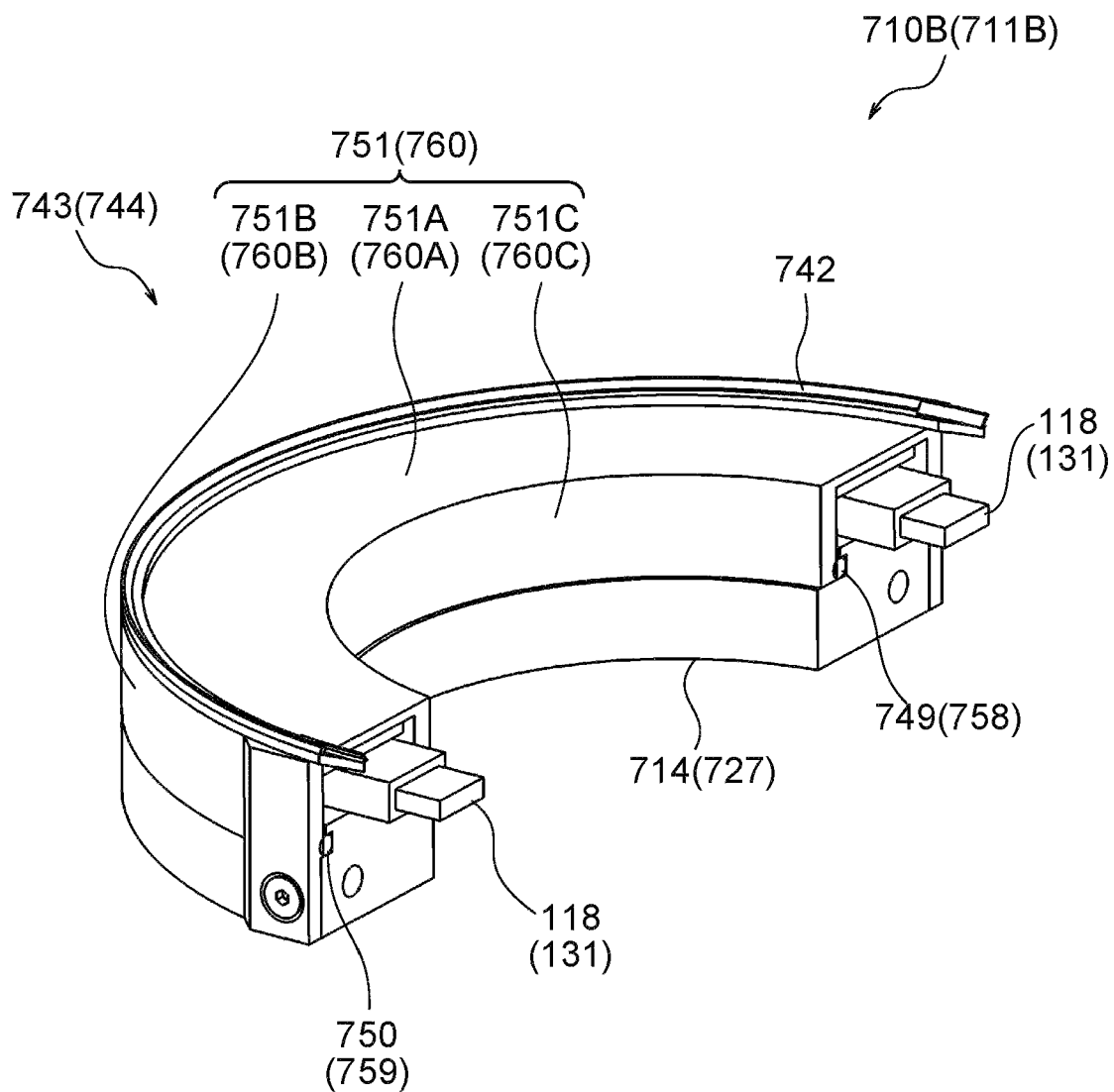
FIG. 30 is a perspective view of a second primary piece (second secondary piece) used in the first unit (second unit) illustrated in FIG. 28.
Figure 30:
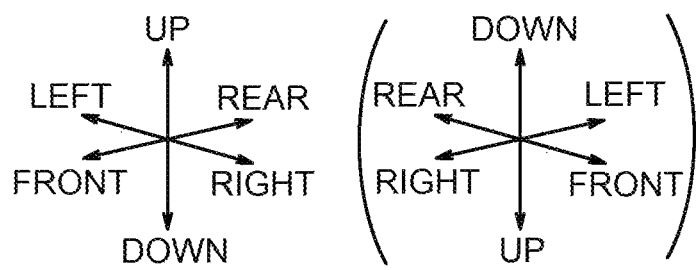

Similarly, in FIG. 30, reference numerals of constituent components of the second secondary piece 711B are indicated in parentheses following reference numerals of corresponding constituent components of the second primary piece 710B. In addition, in FIG. 30, arrows in parentheses indicating frontward, rearward, upward, downward, leftward, and rightward directions correspond to the second secondary piece 711B.

As shown in FIGS. 26 to 30, the first unit 710 includes the first main connector portion 115 similar to that of the above-mentioned first embodiment, and a first transmission/reception unit 713 and two first guide portions 714 instead of the first transmission/reception unit 113 and the two first guide portions 114 according to the above-mentioned first embodiment. Further, the first unit 710 includes a first protective cover portion 743.

The first transmission/reception unit 713 includes the first coil 112 similar to that of the above-mentioned first embodiment, and a first holding plate 716 instead of the first holding plate 116 according to the above-mentioned first embodiment.

In a closed state, the first holding plate 716 is, as a whole, a generally circular annular rigid substrate having a circular through-hole centered on the rotation axis AR, and holds the first coil 112 as a first holding portion. The first holding plate 716 is different from the first holding plate 116 according to the above-mentioned first embodiment in that the first protrusions 117 are not provided.

The first coil 112 is not provided in a belt-like annular part along an outer edge of the first holding plate 716. Through through-holes formed in that part, the first holding plate 716 is screwed to the first guide portions 714. Without being limited to screwing, the first holding plate 716 may be fixed to the first guide portions 714 by any appropriate method.

Similarly to the two first guide portions 114 according to the above-mentioned first embodiment, the two first guide portions 714 are provided separately on the left side and the right side, are parts to which the first transmission/reception unit 713 is fixed in order to reinforce the first transmission/reception unit 713, and function as a guide when the first unit 710 is attached to the first object 101.

The two first guide portions 714 are generally annular as a whole in a state where the first unit 710 is closed, and each include a first flat plate portion 745, a first protruding portion 746, a first inner groove portion 747, and a first outer groove portion 748.

The first flat plate portion 745 is a flat circular annular part and has the first peripheral surface portions 119 similar to those of the above-mentioned first embodiment. The first protruding portion 746 is a part protruding to the upper side from the first flat plate portion 745. The first inner groove portion 747 forms a groove, which is recessed outward, on an inner peripheral surface of the first protruding portion 746. The first outer groove portion 748 forms a groove, which is recessed inward, on an outer peripheral surface of the first protruding portion 746.

The first protective cover portion 743 is fixed to the two first guide portions 714, and seals and covers the first coil 112, thereby forming the substantially liquid-tight first unit 710 together with the two first guide portions 714. However, terminal parts of the first main connector portion 115 are exposed so as to be fitted with the first mating connector portion 108. Here, "liquid-tight" means sealing to the extent that liquid is not allowed to pass through.

In detail, the first protective cover portion 743 includes first inner sealing members 749, first outer sealing members 750, first coil cover portions 751, first connection cover portions 752, and a first connector cover portion 753.

Each of the first inner sealing members 749 and the first outer sealing members 750 is a sealing member made of an elastic material such as rubber, and is generally annular as a whole. Each first inner sealing member 749 is fitted to the first inner groove portion 747, and each first outer sealing member 750 is fitted to the first outer groove portion 748.

Each first coil cover portion 751 is an arc-shaped part provided in correspondence to the printed wiring of the first coil 112, and is made of, for example, resin. Each first coil cover portion 751 includes a first annular flat plate portion 751A of an arc shape disposed above the printed wiring of the first coil 112, a first outer wall portion 751B extending downward from an outer peripheral part of the first annular flat plate portion 751A, and a first inner wall portion 751C extending downward from an inner peripheral part of the first annular flat plate portion 751A.

The first outer wall portion 751B and the first inner wall portion 751C are arranged to sandwich the first outer sealing member 750 and the first inner sealing member 749 in close contact therewith. Consequently, the first coil cover portions 751 liquid-tightly cover an upper side and lateral sides of the printed wiring of the first coil 112.

Each first connection cover portion 752 is a hollow arc-shaped part provided in correspondence to the first coil connectors 118. The first connection cover portions 752 include first interposed portions 752A, for example, made of resin or the like, and first elastic portions 752B covering almost the whole of both end faces of the first interposed portions 752A. By disposing the first coil connectors 118 inside, the first connection cover portions 752 liquid-tightly cover the periphery of the first coil connectors 118.

In a state where the first unit 710 is assembled, end faces of the first coil cover portions 751 and the first elastic portions 752B are brought into close contact with each other by fastening the two first bolts 123. End faces of the first inner sealing members 749 and the first outer sealing members 750 are also in close contact with the first elastic portions 752B. Therefore, in the state where the first unit 710 is assembled, the first transmission/reception unit 713 is liquid-tightly covered by the first protective cover portion 743 and the first guide portions 714.

The first connector cover portion 753 liquid-tightly covers the first main connector portion 115 and the first circuit portion 121 except the terminal parts of the first main connector portion 115.

When the first unit 710 is divided into the first primary piece 710A and the second primary piece 710B, the first connection cover portion 752 may be provided, one at each connecting part between the first primary piece 710A and the second primary piece 710B. In the fifth embodiment, as shown in FIG. 29, the first connection cover portions 752 are fixed to respective end portions of the second primary piece 710B provided with the first main connector portion 115.

The second unit 711 generally has a configuration obtained by vertically inverting the first unit 710. As shown in FIGS. 26 to 30, the second unit 711 includes the second main connector portion 128 similar to that of the above-mentioned first embodiment, and a second transmission/reception unit 726 and two second guide portions 727 instead of the second transmission/reception unit 126 and the two second guide portions 127 according to the above-mentioned first embodiment, respectively. Further, the second unit 711 includes a second protective cover portion 744.

In a closed state, the second transmission/reception unit 726 is, as a whole, a generally circular annular member having a through-hole centered on the rotation axis AR and, in the fifth embodiment, has a generally circular disc shape having the through-hole. Similarly to the above-mentioned first embodiment, the second transmission/reception unit 726 and the above-mentioned first transmission/reception unit 713 according to the fifth embodiment are spaced from each other along the rotation axis AR to be disposed in a state of being faced to each other in a non-contact manner. The second transmission/reception unit 726 includes the second coil 125 similar to that of the above-mentioned first embodiment, and two second holding plates 729 instead of the two second holding plates 129 according to the above-mentioned first embodiment.

In a closed state, the two second holding plates 729 are, as a whole, generally circular annular rigid substrates having circular through-holes centered on the rotation axis AR, and hold the second coil 125 as a second holding portion. The two second holding plates 729 are different from the two second holding plates 129 according to the above-mentioned first embodiment in that the second protrusions 130 are not provided.

Further, the second coil 125 is not provided in belt-like annular parts along outer edges of the two second holding plates 729. Through through-holes formed in those parts, the two second holding plates 729 are screwed to the two second guide portions 727. Without being limited to screwing, the two second holding plates 729 may be fixed to the two second guide portions 727 by any appropriate method.

Similarly to the two second guide portions 127 according to the above-mentioned first embodiment, the two second guide portions 727 are provided separately on the front side and the rear side. The two second guide portions 727 are parts to which the second transmission/reception unit 726 is fixed in order to reinforce the second transmission/reception unit 726, and function as a guide when the second unit 711 is attached to the second object 102.

The two second guide portions 727 are generally annular as a whole in a state where the second unit 711 is closed, and includes a second flat plate portion 754, a second protruding portion 755, a second inner groove portion 756, and a second outer groove portion 757.

The second flat plate portion 754 is a flat circular annular portion and has the second peripheral surface portion 132 similar to that of the above-mentioned first embodiment. The second protruding portion 755 is a part protruding downward from the second flat plate portion 754. The second inner groove portion 756 forms a groove, which is recessed outward, on an inner peripheral surface of the second protruding portion 755. The second outer groove portion 757 forms a groove, which is recessed inward, on an outer peripheral surface of the second protruding portion 755.

The second protective cover portion 744 is fixed to each of the two second guide portions 727, and seals and covers the second coil 125, thereby forming the substantially liquid-tight second unit 711 together with the two second guide portions 727. However, in the second protective cover portion 744, terminal parts of the second main connector portion 128 are exposed so as to be fitted with the second mating connector portion 109.

In detail, the second protective cover portion 744 includes second inner sealing members 758, second outer sealing members 759, second coil cover portions 760, second connection cover portions 761, and a second connector cover portion 762.

Each of the second inner sealing members 758 and the second outer sealing members 759 is a sealing member made of an elastic material such as rubber, and is generally annular as a whole. The second inner sealing members 758 are fitted to the second inner groove portion 756, and the second outer sealing members 759 are fitted to the second outer groove portion 757.

Each second coil cover portion 760 is an arc-shaped part provided in correspondence to the printed wiring of the second coil 125, and is made of, for example, resin. Each second coil cover portion 760 includes an arc-shaped second annular flat plate portion 760A disposed above the printed wiring of the second coil 125, a second outer wall portion 760B extending downward from an outer peripheral portion of the second annular flat plate portion 760A, and a second inner wall portion 760C extending downward from an inner peripheral portion of the second annular flat plate portion 760A.

The second outer wall portion 760B and the second inner wall portion 760C are arranged to sandwich the second outer sealing member 759 and the second inner sealing member 758 in close contact therewith. Consequently, the second coil cover portions 760 liquid-tightly cover an upper side and lateral sides of the printed wiring of the second coil 125.

Each second connection cover portion 761 is a hollow arc-shaped part provided in correspondence to each of the second coil connectors 131. The second connection cover portions 761 include second interposed portions 761A, for example, made of resin or the like, and second elastic portions 761B covering almost the whole of both end faces of the second interposed portions 761A. By disposing the second coil connectors 131 inside, the second connection cover portions 761 liquid-tightly cover the periphery of the second coil connectors 131.

In a state where the second unit 711 is assembled, end faces of the second coil cover portions 760 and the second elastic portions 761B are brought into close contact with each other by fastening the two second bolts 136. End faces of the second inner sealing members 758 and the second outer sealing members 759 are also in close contact with the second elastic portions 761B. Therefore, in the state where the second unit 711 is assembled, the second transmission/reception unit 726 is liquid-tightly covered by the second protection cover portion 744 and the second guide portions 127.

The second connector cover portion 762 liquid-tightly covers the second main connector portion 128 and the second circuit portion 134 except the terminal parts of the second main connector portion 128.

When the second unit 711 is divided into the first secondary piece 711A and the second secondary piece 711B, the second connection cover portion 761 may be provided, one at each connecting part between the first secondary piece 711A and the second secondary piece 711B. In the fifth embodiment, as shown in FIG. 29, the second connection cover portions 761 are fixed to respective end portions of the second secondary piece 711B provided with the second main connector portion 128.

The elastic member 742 is a member which closes a gap continuous to a facing space. Herein, the "facing space" is a space between the first transmission/reception unit 713 and the second transmission/reception unit 726 in a state of being faced to each other by attaching the first unit 710 and the second unit 711 to the first object 101 and the second object 102, respectively.

The elastic member 742 is a member having elasticity and made of rubber or the like as a material. When the first unit 710 and the second unit 711 are attached to the first object 101 and the second object 102, respectively, the elastic member 742 generally forms a circular annular shape.

In detail, the elastic member 742 has a base end fixed to an upper surface of the first protective cover portion 743 and a top end brought into contact with a lower surface of the second protective cover portion 744, so as to close the gap continuous to the facing space.

The elastic member 742 may be provided in either one of the first protective cover portion 743 and the second protective cover portion 744, with the top end kept in contact with the other of the first protective cover portion 743 and the second protective cover portion 744. In addition, the elastic member 742 may close at least a part of the gap continuous to the facing space. For example, the top end of the elastic member 742, if extending so as to be close to the other of the first protective cover portion 743 and the second protective cover portion 744, may not be in contact therewith. With this, it is also possible to reduce the possibility that the foreign matter intrudes the facing space.

Except these points, the wireless connector 703 may be configured similarly to the wireless connector 103 according to the above-mentioned first embodiment.

Specifically, as described above, for example, the first unit 710 is configured by combining the first primary piece 710A on the right side and the second primary piece 710B on the left side which are divisible via the first dividing plane including the rotation axis AR. The second unit 711 is configured by combining the first secondary piece 711A on the front side and the second secondary piece 711B on the rear side which are divisible via the second dividing plane including the rotation axis AR. Each of the first primary piece 710A, the second primary piece 710B, the first secondary piece 711A, and the second secondary piece 711B, when divided, is not annular.

FIG. 25 to FIG. 30 show an example in which the first and the second transmission/reception units 713 and 726 are directly fixed to the first guide portions 714 and the second guide portions 727, respectively. However, as a matter of course, the first and the second transmission/reception units 713 and 726 may be fixed to the first guide portion 714 and the second guide portion 727 via the first spacers 120 and the second spacers 133, respectively, as in the first embodiment.

(Operation and Attaching and Detaching Method for Wireless Connector 703 According to Fifth Embodiment)

According to the wireless connector 703 of the fifth embodiment, the first coil 112 and the second coil 125 are magnetically coupled similarly to the first coil 112 and the second coil 125 of the wireless connector 103 according to the above-mentioned first embodiment described with reference to FIG. 7. Therefore, the wireless connector 703 can also operate similarly to the wireless connector 103 according to the above-mentioned first embodiment.

The wireless connector 703 according to the fifth embodiment can also be attached and detached by the method similar to that for the wireless connector 103 according to the above-mentioned first embodiment described with reference to FIG. 8 and FIG. 13.

By the wireless connector 703 according to the fifth embodiment also, it is possible to wirelessly transmit the electric power between the first object 101 and the second object 102 without restricting the relative rotation range between the first object 101 and the second object 102, as in the above-mentioned first embodiment. Further, similarly to the wireless connector 103 according to the above-mentioned first embodiment, the wireless connector 703 can easily be attached to and detached from the first object 101 and the second object 102 from the outside. Therefore, it is possible to quickly repair the wireless connector 703 when failure occurs.

Further, in the fifth embodiment, the elastic member 742 as the protecting portion is provided. Therefore, it is possible to prevent foreign matter from intruding into the facing space and to reduce the possibility that the foreign matter intrudes into the facing space. This reduces the possibility of a failure, such as a damage of the wireless connector 703 and weakened coupling force in the magnetic field coupling between the first coil 112 and the second coil 125, due to intrusion of foreign matter into the facing space. Therefore, the durability of the wireless connector 703 can be improved.

Further, in the fifth embodiment, the first coil 112 is sealed by the first protective cover portion 743, and the second coil 125 is sealed by the second protective cover portion 744. Consequently, it is possible to prevent the coupling force in the magnetic field coupling between the first coil 112 and the second coil 125 from being weakened due to adhesion or accumulation of dirt and foreign matter. Therefore, the durability of the wireless connector 703 can further be improved.

Sixth Embodiment

In the above-mentioned first to the fifth embodiments, description has been made the examples in which the first transmission/reception unit is connected by the plurality of first coil connectors whereas the second transmission/reception unit is connected by the plurality of second coil connectors, so that each of the first transmission/reception unit and the second transmission/reception unit is configured in an annular shape which is openable and closable at a plurality of positions. Description has also been made of the examples in which the first unit is divided into a plurality of independent primary pieces together with the first transmission/reception unit and the second unit is divided into a plurality of independent secondary pieces together with the second transmission/reception unit.

However, if the first transmission/reception unit has the openable/closable annular shape, the plurality of primary pieces may be connected by a connection mechanism such as a hinge. Similarly, if the second transmission/reception unit has the openable/closable annular shape, the plurality of secondary pieces may also be connected by a connection mechanism such as a hinge. In the sixth embodiment, an example in which the connection mechanisms are applied to the wireless connector 103 according to the above-mentioned first embodiment will be described. The connection mechanisms according to the sixth embodiment may appropriately be modified and applied to the wireless connectors according to the other embodiments such as the second to the fifth embodiments.

(Configuration of Robot Device 800 According to Sixth Embodiment)

Figure 31:
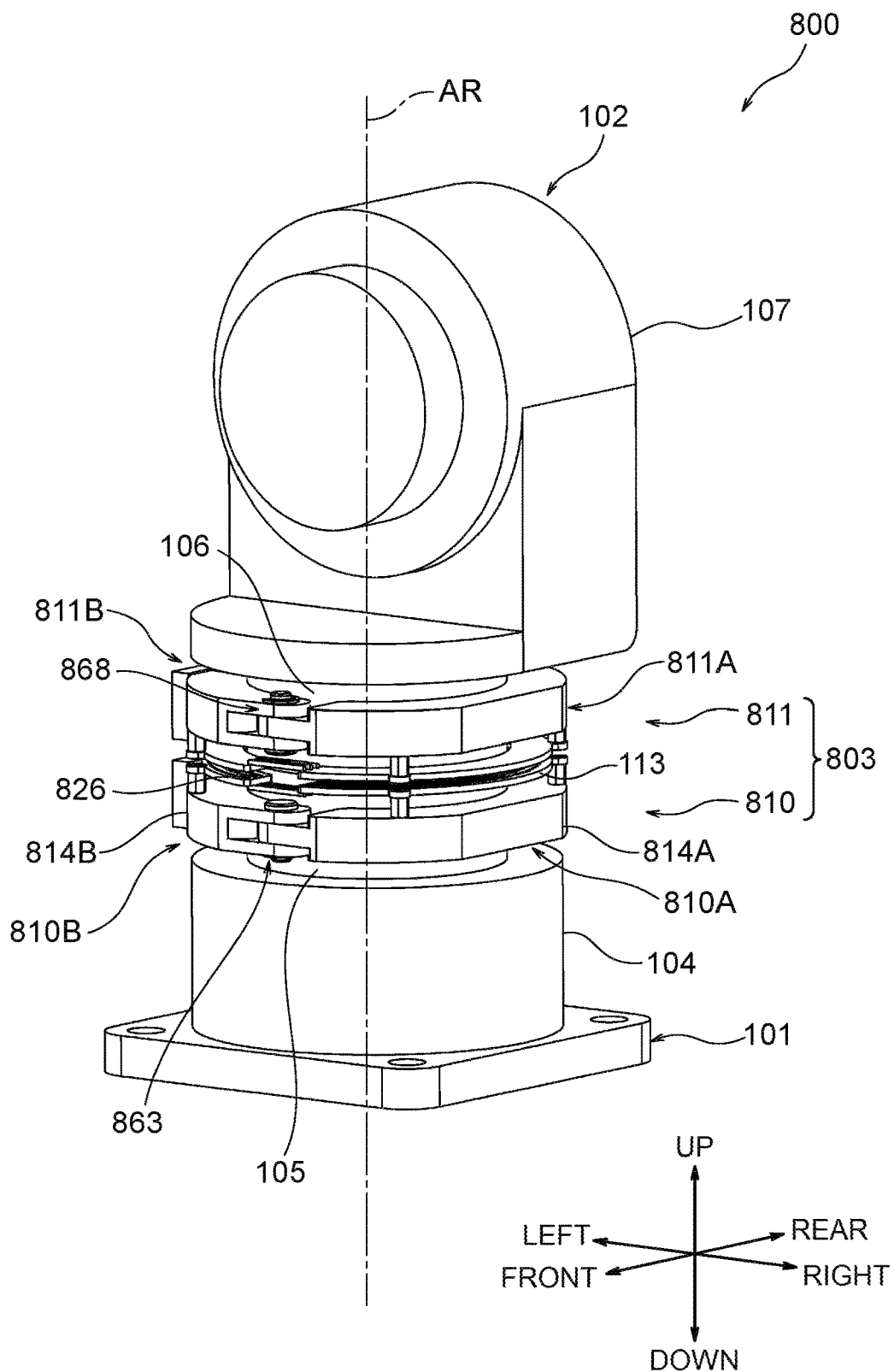
FIG. 31 is a perspective view of a robot device according to a sixth embodiment of the present invention.

As shown in a perspective view of FIG. 31, a robot device 800 according to the sixth embodiment of the present invention includes the first object 101 and the second object 102 similar to those of the above-mentioned first embodiment, and a wireless connector 803 for wirelessly transmitting the electric power between the first object 101 and the second object 102.

As shown in FIG. 31, the wireless connector 803 includes a first unit 810 instead of the first unit 110 and a second unit 811 instead of the second unit 111.

Figure 32:
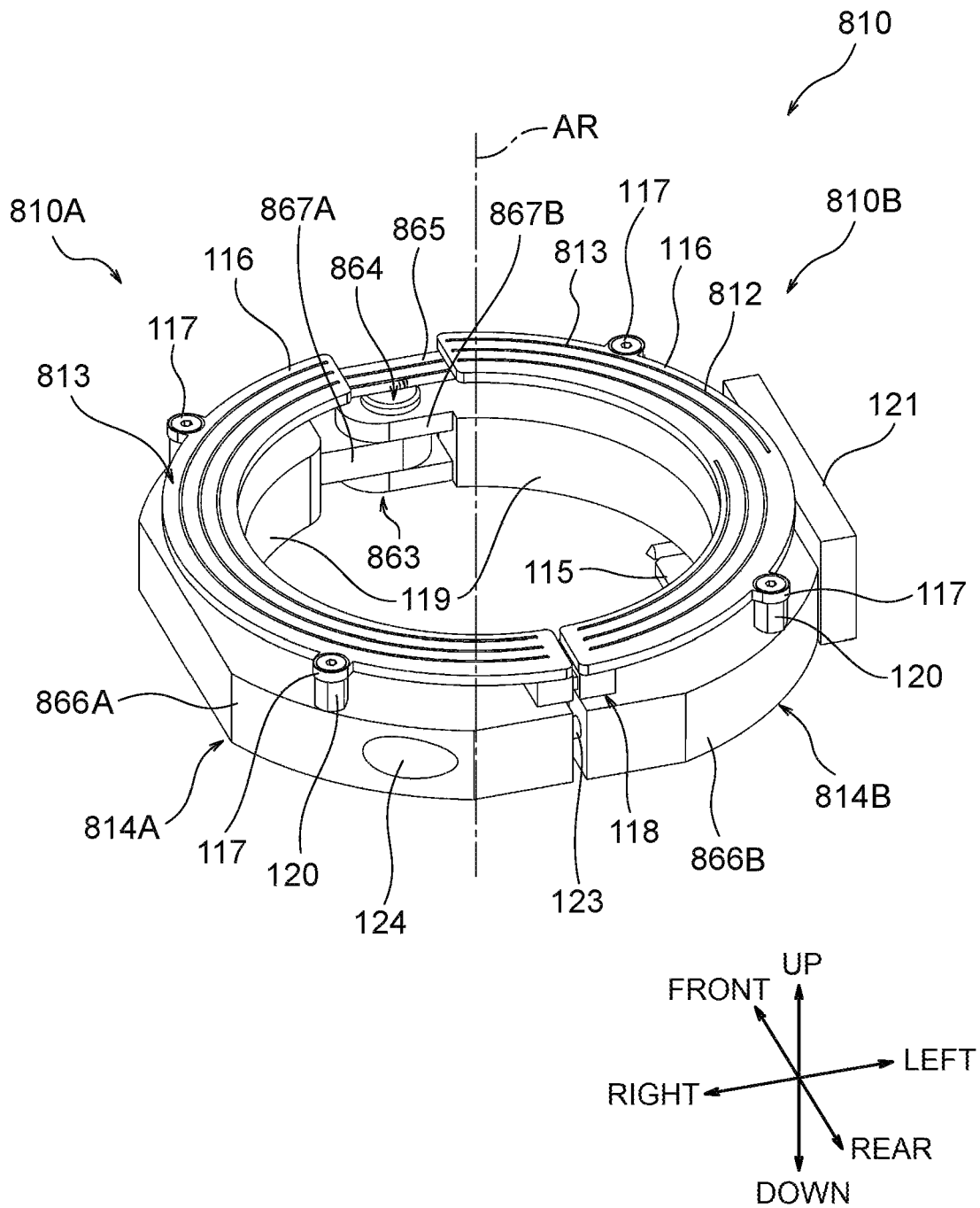
FIG. 32 is a perspective view showing a closed state of a first unit constituting a wireless connector used in the robot device illustrated in FIG. 31.

As shown in FIG. 32 being a perspective view showing a closed state, the first unit 810 is configured by combining a first primary piece 810A on the right side and a second primary piece 810B on the left side, which are separable from each other at one position on the rear side via the first dividing plane including the rotation axis AR.

The first unit 810 according to the sixth embodiment further includes a first connecting mechanism 863 connecting the first primary piece 810A and the second primary piece 810B, which are adjacent primary pieces, on the front side. By providing the first connecting mechanism 863, the first primary piece 810A and the second primary piece 810B are connected so as to open and close on the rear side.

In detail, the first unit 810 includes the first main connector portion 115 similar to that of the above-mentioned first embodiment, and a first transmission/reception unit 813 and first guide portions (814A, 814B) instead of the first transmission/reception unit 113 and the first guide portions 114 according to the above-mentioned first embodiment. Further, the first unit 810 according to the sixth embodiment includes a first connecting element 864.

Similarly to the first transmission/reception unit 113 according to the above-mentioned first embodiment, in a closed state, the first transmission/reception unit 813 has, as a whole, a generally circular disc shape having a through-hole centered on the rotation axis AR. The first transmission/reception unit 813 includes a first coil 812 instead of the first coil 112 according to the above-mentioned first embodiment, and the first holding plate 116 similar to that of the above-mentioned first embodiment. The first coil 812 is composed of two first coil parts separable at one position and bendable with respect to each other.

The first coil 812 is configured by connecting two printed wirings, which are conductors comprising the two first coil parts printed on one main surface (an upper surface in the sixth embodiment) of the first holding plate 116, via the one first coil connector 118 and a first connection wiring 865. The first connection wiring 865 is, for example, a conductor wire coated with an insulator.

In detail, among four end portions of the two printed wirings formed on two rigid substrates of the first holding plate 116, the two end portions close to the first connecting mechanism 863 are connected by the first connection wiring 865, whereas the two end portions far from the first connecting mechanism 863 are connected by the first coil connector 118.

Consequently, the first coil 812 is provided in a generally circular annular region having a through-hole centered on the rotation axis AR when viewed from above in the state where the first transmission/reception unit 813 is closed and, in the sixth embodiment, is configured to form a generally flat spiral shape. In detail, parts of the printed wiring formed at the two end portions of each rigid substrate of the first holding plate 116, which are far from the first connecting mechanism 863, are electrically connected to the first coil connector 118 via a through-hole (not shown). Therefore, by electrically connecting the two printed wirings via the one first coil connector 118 and the first connection wiring 865, the first coil 812 has a substantially spiral shape. In the sixth embodiment, the through-hole connector is used as the first coil connector 118. However, the present invention is not limited thereto. Specifically, similarly to the above-mentioned first embodiment, for example, an SMT connector, an adhesive film connector, or a combination of an FPC connector and an FPC may be used as the first coil connector 118, as described above, instead of the through-hole connector.

Similarly to the above-mentioned first embodiment, the four end portions of the two printed wirings formed on the first holding plate 116 may be connected by the two first coil connectors 118.

The first guide portions (814A, 814B) are composed of a first primary guide piece 814A on the right side and the second primary guide piece 814B on the left side. This point is similar to the first guide portions 114 according to the above-mentioned first embodiment. Unlike the above-mentioned first embodiment, the first guide portions (814A, 814B) according to the sixth embodiment are connected by the first connecting mechanism 863 so as not to be completely separated.

In detail, the first primary guide piece 814A includes a first primary guide body 866A and a first primary connecting segment 867A. Similarly, the second primary guide piece 814B includes a second primary guide body 866B and second primary connecting segments 867B.

The first primary guide body 866A and the second primary guide body 866B are configured similarly to the first guide portions 114 according to the above-mentioned first embodiment. Specifically, in a state where the first unit 810 is closed, the first primary guide body 866A and the second primary guide body 866B have a generally annular shape as a whole, and have the first peripheral surface portions 119 disposed in contact with the first shaft portion 105 as in the above-mentioned first embodiment.

The first primary connecting segment 867A is a flat-plate-shaped part extending leftward from one end face of the first primary guide body 866A. In the sixth embodiment, the first primary connecting segment 867A is one flat-plate-shaped part extending leftward from a front end face among those end faces of the first primary guide body 866A which face the second primary guide body 866B, and is provided with a through hole in the up-and-down direction.

The second primary connecting segments 867B are flat-plate-shaped parts extending rightward from one end face of the second primary guide body 866B. In the sixth embodiment, the second primary connecting segments 867B are two flat-plate-shaped parts extending rightward from upper and lower ends of a front end face among those end faces of the second primary guide body 866B which face the first primary guide body 866A, and is provided with a through-hole in the up-and-down direction.

The first primary connecting segment 867A is disposed between the pair of second primary connecting segments 867B, so that the first primary connecting segment 867A is sandwiched in the up-and-down direction by the pair of second primary connecting segments 867B. The through-holes formed in the first primary connecting segment 867A and the pair of second primary connecting segments 867B are arranged to penetrate in the up-and-down direction.

Figure 33:
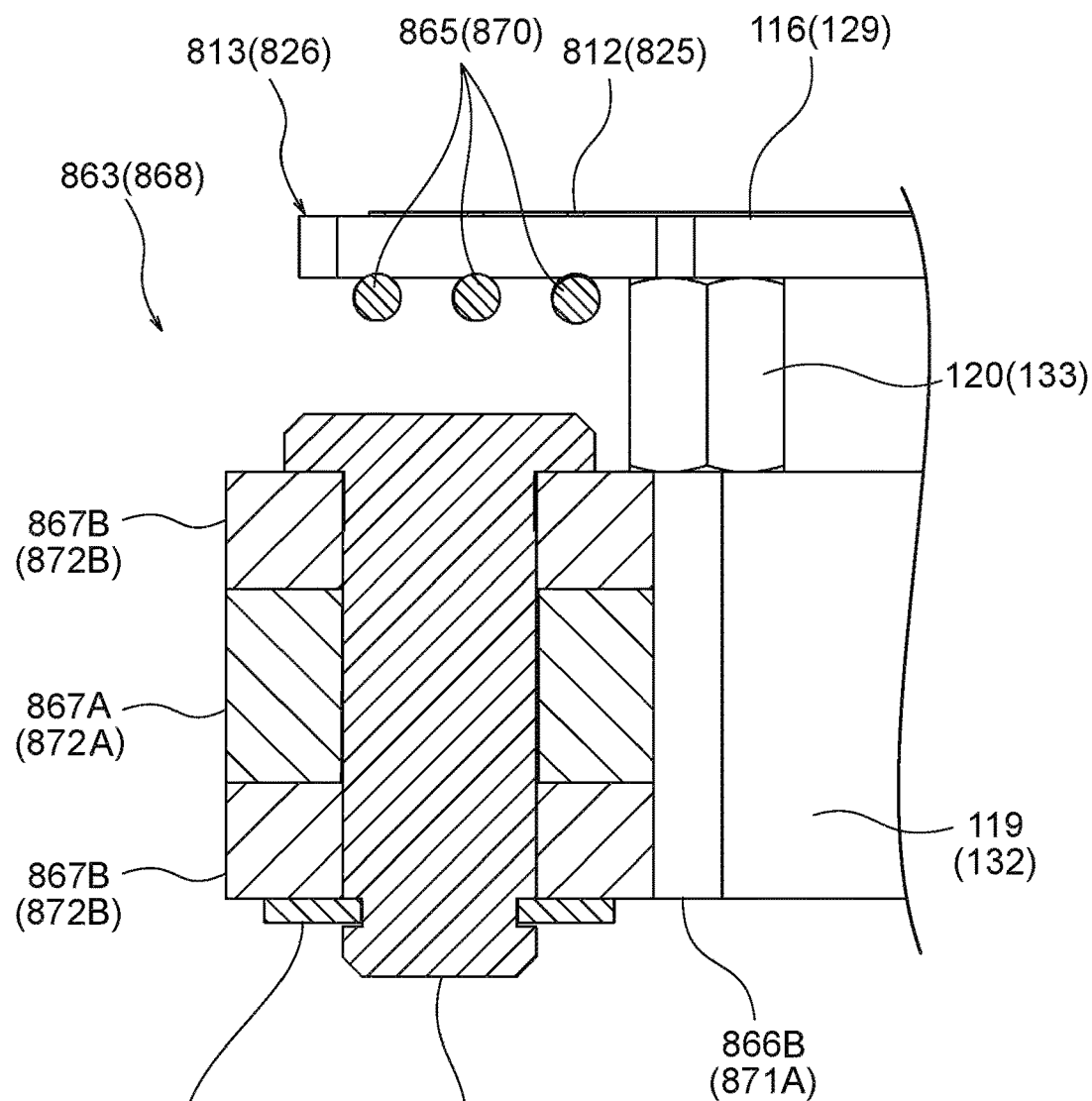
FIG. 33 is a cross-sectional view of the first unit (second unit) constituting the wireless connector used in the robot device illustrated in FIG. 31, taken along a first dividing plane (second dividing plane), enlargedly showing the vicinity of a first connecting mechanism (second connecting mechanism)

As shown in FIG. 33, the first connecting element 864 is composed of a first connecting pin 864A and a first fastener 864B.

Here, FIG. 33 is a sectional view of the first unit 810 on the first dividing plane (a plane including the rotation axis AR and facing the front-and-rear direction), and is an enlarged view of the vicinity of the first connecting mechanism 863.

The first connecting pin 864A is a member formed to penetrate the through-holes of the first primary connecting segment 867A and the pair of second primary connecting segments 867B, and is, for example, a metal pin having a head portion locked around the through-holes. The first fastener 864B is a C-shaped (an annular shape with a cutout) member locked to a tip of the first connecting pin 864A so that the first connecting pin 864A does not escape from the through-holes, and is, for example, a C-shaped (an annular shape with a cutout) member made of metal.

The first connecting mechanism 863 is a hinge composed of the first primary connecting segment 867A, the pair of second primary connecting segments 867B, and the first connecting element 864, and connects the first primary guide body 866A and the second primary guide body 866B so as to be rotatable around the first connecting pin 864A.

The first transmission/reception unit 813 is configured so that, by releasing fitting of the first coil connector 118 included in the first coil 812, the first coil 812 can be separated into the two first coil parts at one position on the rear side where the first coil connector 118 is provided.

Further, the first primary piece 810A on the right side and the second primary piece 810B on the left side are connected on the front side by the first connecting mechanism 863 to be rotatable around the first connecting pin 864A which is directed in the up-and-down direction.

Figure 34:
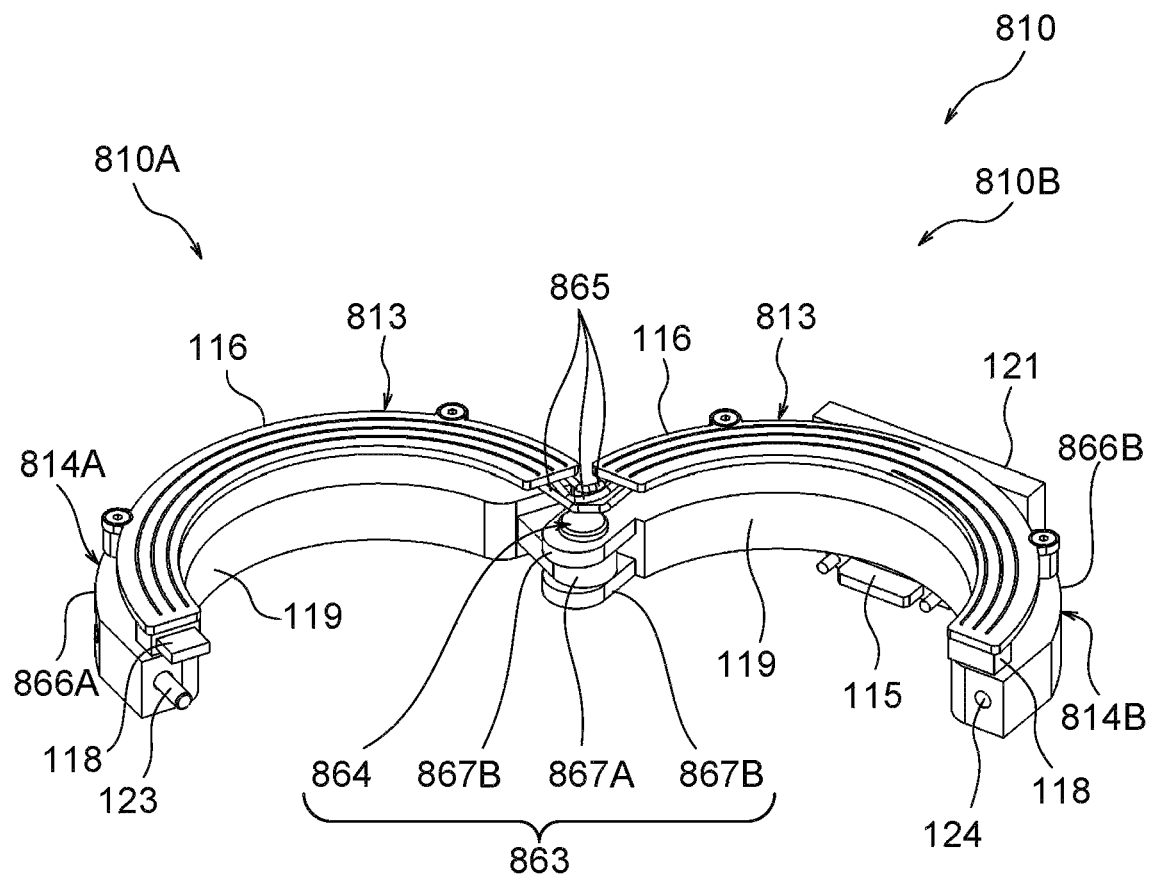
FIG. 34 is a perspective view showing an open state of the first unit illustrated in FIG. 32.

Therefore, the first unit 810 can be separated on the rear side into the first primary piece 810A and the second primary piece 810B via the first dividing plane including the rotation axis AR, and opened on the front side in the left-and-right direction to the extent that the first shaft portion 105 is allowed to pass through, as shown in a perspective view of FIG. 34.

In the state where the first unit 810 according to the sixth embodiment is closed, the first primary guide piece 814A and the second primary guide piece 814B are fastened on the rear side to be fixed to each other by the first bolt 123 inserted into and fitted to the first bolt hole 124, like in the above-mentioned first embodiment. Consequently, the first unit 810 can maintain the closed state so as not to be easily opened during rotating operation of the robot device 800 or the like.

In the sixth embodiment, description has been made of the example in which the first primary piece 810A and the second primary piece 810B are connected by the first connecting mechanism 863 provided in the first primary guide piece 814A and the second primary guide piece 814B. However, the first primary guide piece 814A and the second primary guide piece 814B may not be provided. In this case, a mechanism corresponding to the first connecting mechanism 863 may be provided in the first transmission/reception unit 813. Further, a plurality of the first connecting mechanisms 863 may be provided. Further, the first unit may include three or more primary pieces, where some of the primary pieces are connected by the first connecting mechanism 863 and the remaining primary pieces are configured to be completely separable.

Figure 35:
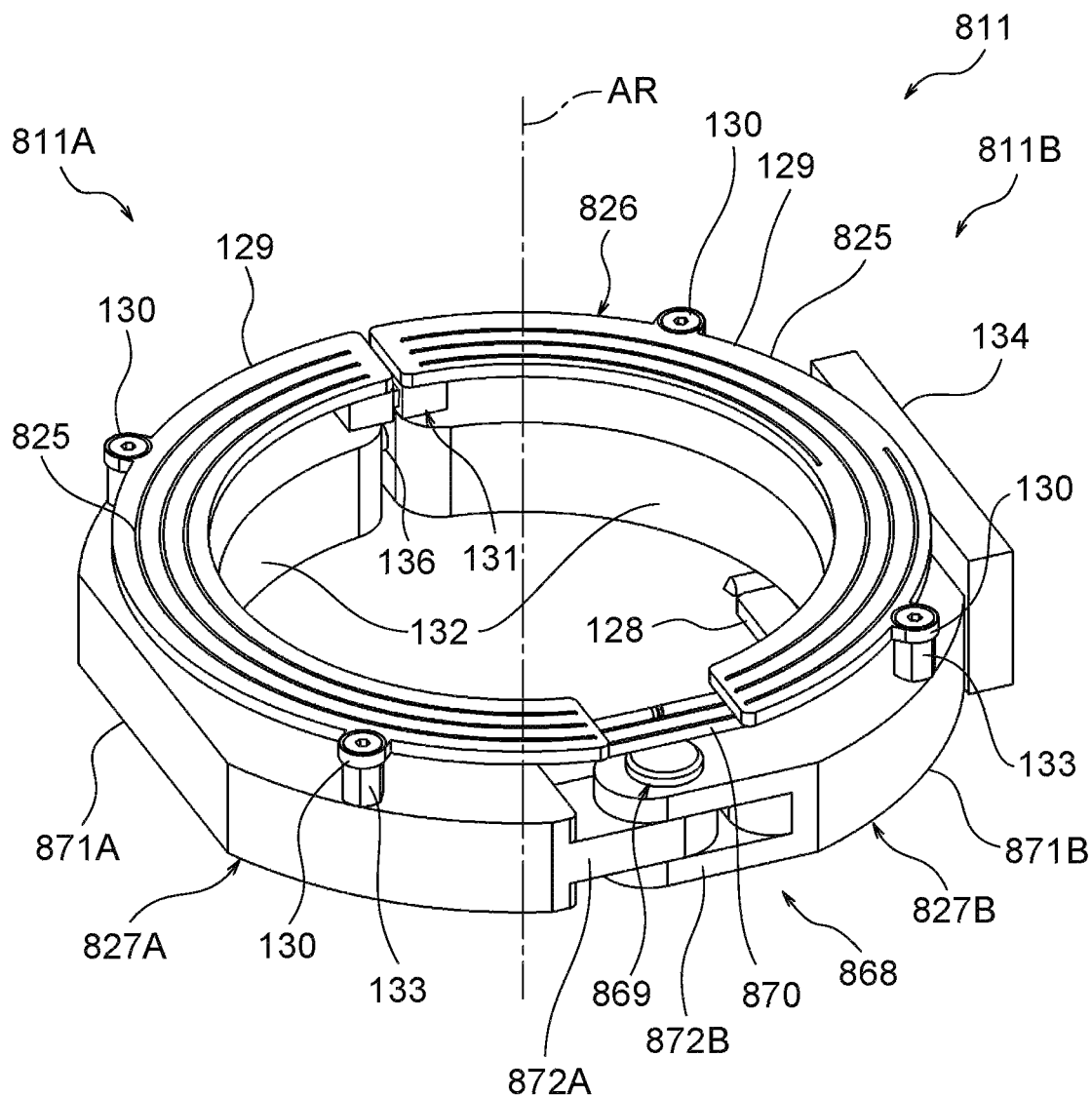
FIG. 35 is a perspective view showing a closed state of the second unit constituting the wireless connector used in the robot device illustrated in FIG. 31.
Figure 35:
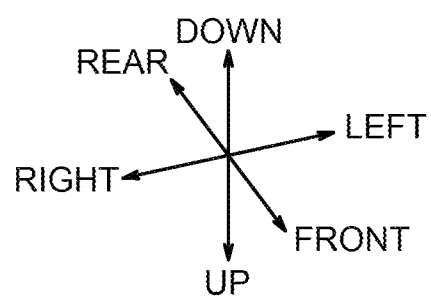
Figure 36A:
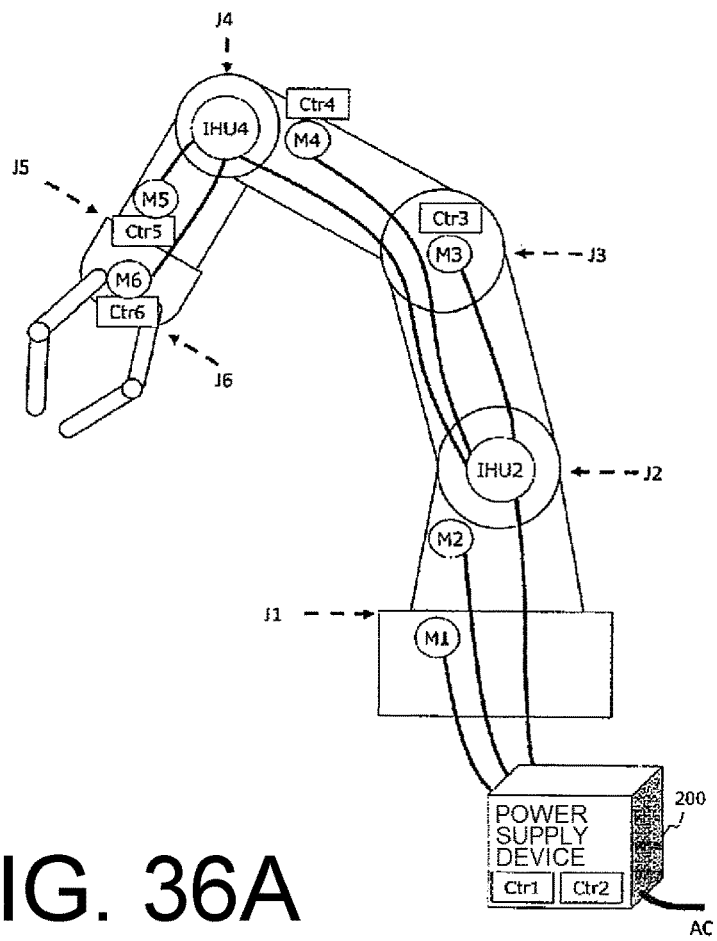
FIG. 36A is a diagram showing a configuration of a robot arm device according to the related art disclosed in Patent Document 1.
Figure 36B:
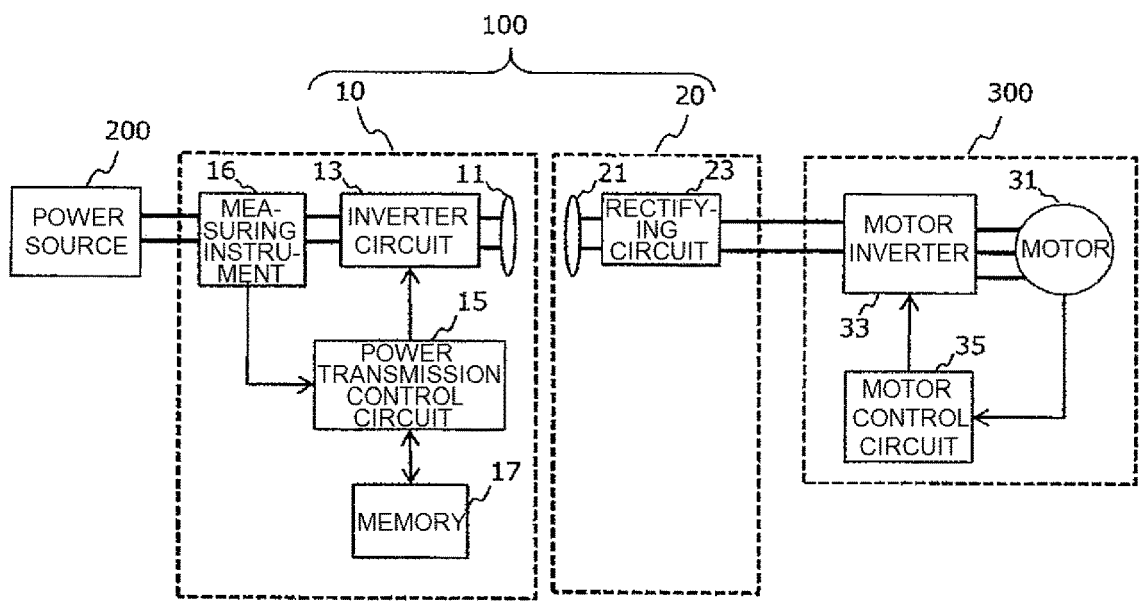
FIG. 36B is a diagram showing a circuit configuration of a wireless power transmission system according to the related art disclosed in Patent Document 1.

As shown in FIG. 35 being a perspective view showing a closed state, the second unit 811 is configured by combining a first secondary piece 811A on the right side and a second secondary piece 811B on the left side, which are separable at one position on the rear side via the second dividing plane including the rotation axis AR.

The second unit 811 according to the sixth embodiment further includes a second connecting mechanism 868 for connecting the first secondary piece 811A and the second secondary piece 811B on the front side, which are adjacent secondary pieces. By providing the second connecting mechanism 868, the first secondary piece 811A and the second secondary piece 811B are connected so as to open and close on the rear side.

In detail, the second unit 811 includes the second main connector portion 128 similar to that of the above-mentioned first embodiment, and a second transmission/reception unit 826 and second guide portions (827A, 827B) in place of the second transmission/reception unit 126 and the second guide portions 127 according to the above-mentioned first embodiment, respectively. Further, the second unit 811 according to the sixth embodiment includes a second connecting element 869.

Similarly to the second transmission/reception unit 126 according to the above-mentioned first embodiment, in a closed state, the second transmission/reception unit 826 has, as a whole, a generally circular disc shape having a through-hole centered on the rotation axis AR. The second transmission/reception unit 826 includes a second coil 825 instead of the second coil 125 according to the above-mentioned first embodiment, and the second holding plate 129 similar to that of the above-mentioned first embodiment. Similarly to the first coil 812, the second coil 825 is composed of two second coil parts separable at one position and bendable with respect to each other.

The second coil 825 is configured by connecting two printed wirings, which are conductors comprising the two second coil parts printed on one main surface (a lower surface in the sixth embodiment) of the second holding plate 129, via the one second coil connector 131 and a second connection wiring 870. The second connection wiring 870 is, for example, a conductor wire coated with an insulator.

In detail, among four end portions of the two printed wirings formed on two rigid substrates of the second holding plate 129, the two end portions close to the second connecting mechanism 868 are connected by the second connection wiring 870, whereas the two end portions far from the second connecting mechanism 868 are connected by the second coil connector 131.

Consequently, the second coil 825 is provided in a generally circular annular region having a through-hole centered on the rotation axis AR when viewed from above in the state where the second transmission/reception unit 826 is closed and, in the sixth embodiment, is configured to form a generally flat spiral shape. In detail, parts of the printed wiring formed at the two end portions of each rigid substrate of the second holding plate 129, which are far from the second connecting mechanism 868, are electrically connected to the second coil connector 131 via a through-hole (not shown). Therefore, by electrically connecting the two printed wirings via the one second coil connector 131 and the second connection wiring 870, the second coil 825 has a substantially spiral shape. In the sixth embodiment, the through-hole connector is used as the second coil connector 131. However, the present invention is not limited thereto. Specifically, similarly to the case of the above-mentioned first embodiment, for example, an SMT connector, an adhesive film connector, or a combination of an FPC connector and an FPC may be used as the second coil connector 131, as described above, instead of the through-hole connector.

Similarly to the above-mentioned first embodiment, the four end portions of the two printed wirings formed on the second holding plate 129 may be connected by the two second coil connectors 131.

The second guide portions (827A, 827B) is composed of the first secondary guide piece 827A on the right side and the second secondary guide piece 827B on the left side. This point is similar to the second guide portions 127 according to the above-mentioned first embodiment. Unlike the above-mentioned first embodiment, the second guide portions (827A, 827B) according to the sixth embodiment are connected by the second connecting mechanism 868 so as not to be completely separated.

In detail, the first secondary guide piece 827A includes a first secondary guide body 871A and a first secondary connecting segment 872A. Similarly, the second secondary guide piece 827B includes a second secondary guide body 871B and second secondary connecting segments 872B.

The first secondary guide body 871A and the second secondary guide body 871B are configured similarly to the second guide portions 127 according to the above-mentioned first embodiment. Specifically, in the state where the first unit 810 is closed, the first secondary guide body 871A and the second secondary guide body 871B have a generally annular shape as a whole, and have the second peripheral surface portions 132 disposed in contact with the second shaft portion 106 as in the above-mentioned first embodiment.

The first secondary connecting segment 872A is a flat-plate-shaped part extending leftward from one end face of the first secondary guide body 871A. In the sixth embodiment, the first secondary connecting segment 872A is one flat-plate-shaped part extending leftward from a front end face among those end surfaces of the first secondary guide body 871A which face the second secondary guide body 871B, and is provided with a through-hole in the up-and-down direction.

The second secondary connecting segments 872B are flat-plate-shaped part extending rightward from one end face of the second secondary guide body 871B. In the sixth embodiment, the second secondary connecting segments 872B are two flat-plate-shaped parts extending rightward from upper and lower ends of a front end face among those end faces of the second secondary guide body 871B which face the first secondary guide body 871A, and is provided with a through-hole in the up-and-down direction.

The first secondary connecting segment 872A is disposed between the pair of second secondary connecting segments 872B, so that the first secondary connecting segment 872A is sandwiched in the up-and-down direction by the pair of second secondary connecting segments 872B. The through-holes formed in the first secondary connecting segment 872A and the pair of second secondary connecting segments 867B are arranged to penetrate in the up-and-down direction.

As shown in the sectional view of FIG. 33, the second connecting element 869 is composed of a second connecting pin 869A and a second fastener 869B.

FIG. 33 is an enlarged view of the vicinity of the first connecting mechanism 863 as described above. An enlarged view of the vicinity of the second connecting mechanism 868 is also shown in the same manner to the enlarged view of the vicinity of the first connecting mechanism 863. Specifically, FIG. 33 is a sectional view of the second unit 811 on the second dividing plane (a plane including the rotation axis AR and facing the front-and-rear direction), and is also an enlarged view of the vicinity of the second connecting mechanism 868.

In FIG. 33, reference numerals of the constituent components of the second unit 811 are indicated in parentheses following reference numerals of the corresponding components of the first unit 810. Arrows in parentheses indicating frontward, rearward, upward, and downward directions corresponds to the second unit 811.

The second connecting pin 869A is a member formed to penetrate the through-holes of the first secondary connecting segment 872A and the pair of second secondary connecting segments 872B, and is, for example, a metal pin having a head portion locked around the through-holes. The second fastener 869B is a member locked to a tip of the second connecting pin 869A so that the second connecting pin 869A does not escape from the through-holes, and is, for example, a C-shaped (an annular shape with a cutout) member made of metal.

The second connecting mechanism 868 is a hinge composed of the first secondary connecting segment 872A, the pair of second secondary connecting segments 872B, and the second connecting element 869, and connects the first secondary guide body 871A and the second secondary guide body 871B so as to be rotatable around the second connecting pin 869A.

The second transmission/reception unit 826 is configured so that, by releasing fitting of the second coil connector 131 included in the second coil 825, the second coil 825 can be separated into the two second coil parts at one position on the rear side where the second coil connector 131 is provided.

Further, the first secondary piece 811A on the right side and the second secondary piece 811B on the left side are connected on the front side by the second connecting mechanism 868 to be rotatable around the second connecting pin 869A which is directed in the up-and-down direction. Therefore, the second unit 811 can be separated on the rear side into the first secondary piece 811A and the second secondary piece 811B via the second dividing plane including the rotation axis AR, and opened on the front side in the left-and-right direction to the extent that the second shaft portion 106 is allowed to pass through.

In the state where the second unit 811 according to the sixth embodiment is closed, the first secondary guide piece 827A and the second secondary guide piece 827B are fastened on the rear side to be fixed to each other by the second bolt 136 inserted into and fitted to the second bolt hole opened on the right side, like in the above-mentioned first embodiment. Consequently, the second unit 811 can maintain the closed state so as not to be easily opened during the rotating operation of the robot device 800 or the like.

In the sixth embodiment, description has been made of the example in which the first secondary piece 811A and the second secondary piece 811B are connected by the second connecting mechanism 868 provided in the first secondary guide piece 827A and the second secondary guide piece 827B. However, the first secondary guide piece 827A and the second secondary guide piece 827B may not be provided. In this case, a mechanism corresponding to the second connecting mechanism 868 may be provided in the second transmission/reception unit 826. Further, a plurality of the second connecting mechanisms 868 may be provided. Further, the second unit may include three or more secondary pieces, where some of the secondary pieces are connected by the second connecting mechanism 868 and the remaining secondary pieces are configured to be completely separable.

(Operation of Wireless Connector 803 According to Sixth Embodiment)

According to the wireless connector 803 of the sixth embodiment, the first coil 812 and the second coil 825 are magnetically coupled similarly to the first coil 112 and the second coil 125 of the wireless connector 103 according to the above-mentioned first embodiment described with reference to FIG. 7. Therefore, the wireless connector 803 can also operate similarly to the wireless connector 103 according to the above-mentioned first embodiment.

(Wireless Connector Attaching and Detaching Method According to Sixth Embodiment)

Heretofore, the operation of the wireless connector 803 according to the sixth embodiment of the present invention has been described. Now, a wireless connector attaching and detaching method according to the sixth embodiment will be described with reference to the drawings.

Also in the sixth embodiment, the wireless connector 803 can be attached to the object (101, 102) and can be detached from the object (101, 102) in the process substantially same as that of the above-mentioned first embodiment. Therefore, in the sixth embodiment also, the wireless connector attaching and detaching method will be described with reference to FIGS. 8 and 13.

(Method of Attaching Wireless Connector 803)

A method of attaching the wireless connector 803 is started by preparing the robot device (see FIG. 3) including the object (101, 102), and the wireless connector 803.

As shown in FIG. 8, the first unit 810 is attached to the first object 101 from the outside of the first object 101 (step 1; step of attaching the first unit)

In detail, in step 1, the second primary piece 810B is attached to the first object 101 (step 1A: step of attaching the second primary piece)

In the sixth embodiment, in a state where the first coil 812 is faced upward and the first unit 810 is opened together with the first transmission/reception unit 813, the first shaft portion 105 passes through an open space on the rear side of the first primary piece 810A and the second primary piece 810B. The second primary piece 810B is disposed so that the first peripheral surface portion 119 is brought into contact with the outer peripheral surface of the first shaft portion 105.

Then, the first main connector portion 115 is fitted to the first mating connector portion 108. Consequently, the first main connector portion 115 and the first mating connector portion 108 are electrically connected to each other, and the second primary piece 810B is attached to the first object 101.

As shown in FIG. 8, the first primary piece 810A is attached to the first object 101 so as to surround the rotation axis AR together with the second primary piece 810B (step 1B; step of attaching the first primary piece).

In the sixth embodiment, since the first primary piece 810A is connected to the second primary piece 810B by the first connecting mechanism 863, the first coil 812 is faced upward.

Therefore, the first primary piece 810A is rotated around the first connecting pin 864A so that the first peripheral surface portion 119 is brought into contact with the outer peripheral surface of the first shaft portion 105. Then, the first coil connector 118 provided in the first primary piece 810A is fitted to the first coil connector 118 provided in the second primary piece 810B, and the first unit 810 is closed together with the first transmission/reception unit 813.

Consequently, the first primary piece 810A is attached to the first object 101, and the first coil 812 connected via the first coil connector 118 is formed.

As shown in FIG. 8, the first primary piece 810A and the second primary piece 810B are fastened and fixed by the first bolt 123 (step 1C; step of fixing the first unit).

In detail, the first bolt 123 is inserted from the right side of the first bolt hole 124 and tightened. Consequently, the first unit 810 is assembled and fixed to the first object 101 in the state where the first unit 810 is closed together with the first transmission/reception unit 813.

As shown in FIG. 8, the second unit 811 is attached to the second object 102 from the outside of the second object 102 (step 2; step of attaching the second unit).

In detail, in step 2, the second secondary piece 811B is attached to the second object 102 (step 2A: step of attaching the second secondary piece).

In the sixth embodiment, in a state where the second coil 825 is faced downward and the second unit 811 is opened together with the second transmission/reception unit 826, the second shaft portion 106 passes through an open space on the rear side of the first secondary piece 811A and the second secondary piece 811B. The second secondary piece 811B is disposed so that the first peripheral surface portion 119 is brought into contact with the outer peripheral surface of the second shaft portion 106.

Then, the second main connector portion 128 is fitted to the second mating connector portion 109. Thus, the second main connector portion 128 and the second mating connector portion 109 are electrically connected to each other, and the second secondary piece 811B is attached to the second object 102.

As shown in FIG. 8, the first secondary piece 811A is attached to the second object 102 so as to surround the rotation axis AR together with the second secondary piece 811B (step 2B: step of attaching the first secondary piece).

In the sixth embodiment, since the first secondary piece 811A is connected to the second secondary piece 811B by the second connecting mechanism 868, the second coil 825 is faced downward.

Therefore, the first secondary piece 811A is rotated around the second connecting pin 869A so that the first peripheral surface portion 119 is brought into contact with the outer peripheral surface of the second shaft portion 106. Then, the second coil connector 131 provided in the first secondary piece 811A is fitted to the second coil connector 131 provided in the second secondary piece 811B, and the second unit 811 is closed together with the second transmission/reception unit 826.

Consequently, the first secondary piece 811A is attached to the second object 102, and the second coil 825 connected via the second coil connector 118 is formed.

As shown in FIG. 8, the first secondary piece 811A and the second secondary piece 811B are fastened and fixed by the second bolt 136 (step 2C; step of fixing the second unit).

In detail, the second bolt 136 is inserted from the right side of the second bolt hole 137 provided in the first secondary guide piece 827A and tightened. Consequently, the second unit 811 is assembled and fixed to the second object 102 in the closed state.

Thus, the method of attaching the wireless connector 803 to the object (101, 102) is finished, and the wireless connector 803 is attached to the first object 101 and the second object 102 in a fixed state. In addition, the first transmission/reception unit 813 and the second transmission/reception unit 826 are disposed generally in parallel to each other in a direction generally perpendicular to the rotation axis AR in a state of being faced to each other in a non-contact manner along the rotation axis AR outside the first shaft portion 105 and the second shaft portion 106, so as to wirelessly transmit the electric power.

Also in the method of attaching the wireless connector 803 to the object (101, 102) according to the sixth embodiment, the order of performing the first unit attaching step (step 1) and the second unit attaching step (step 2) may be replaced, like in the above-mentioned first embodiment. In step 1, the order of performing the second primary piece attaching step (step 1A) and the first primary piece attaching step (step 1B) may be replaced. Similarly, in step 2, the order of performing the second secondary piece attaching step (step 2A) and the first secondary piece attaching step (step 2B) may be replaced.

(Method of Detaching Wireless Connector 803)

A method of detaching the wireless connector 803 from the object (101, 102) is typically performed as necessary after the wireless connector 803 is attached to the robot device 800 by the above-mentioned method of attaching the wireless connector 803. This is similar to the method of detaching the wireless connector 103 according to the above-mentioned first embodiment.

As shown in FIG. 13, the first unit 810 is detached from the first object 101 by work outside the first object 101 (step 3; step of detaching the first unit).

Specifically, in step 3, fixation between the first primary piece 810A and the second primary piece 810B is released (step 3A; step of releasing fixation of the first unit).

In the sixth embodiment, after the first bolt 123 is loosened to release fitting by the screw action, the first bolt 123 is pulled out from the right side of the first bolt hole 124. Thus, fixation of the first unit 810 is released.

The first primary piece 810A is detached from the first object 101 (step 3B; step of detaching the first primary piece).

In the sixth embodiment, fitting of the first coil connector 118 is released and the first primary piece 810A is rotated around the first connecting pin 864A. Consequently, fitting of the first coil connector 118 is released and the first primary piece 810A is detached from the first object 101. At the same time, the first unit 810 is put into an open state together with the first transmission/reception unit 813.

The second primary piece 810B is detached from the first object 101 (step 3C; step of detaching the second primary piece).

In the sixth embodiment, the second primary piece 810B is pulled out to the left side. Consequently, fitting of the first main connector portion 115 and the first mating connector portion 108 is released and the second primary piece 810B is detached from the first object 101.

By making the first shaft portion 105 pass through the open space on the rear side of the first primary piece 810A and the second primary piece 810B, the first unit 810 is detached from the first object 101.

The second unit 811 is detached from the second object 102 by work outside the second object 102 (step 4; step of detaching the second unit).

In detail, in step 4, fixation between the first secondary piece 811A and the second secondary piece 811B is released (step 4A; step of releasing fixation of the second unit)

In the sixth embodiment, after the second bolt 136 is loosened to release fitting by the screw action, the second bolt 136 is pulled out from the right side of the second bolt hole 137. Thus, fixation of the second unit 811 is released.

The first secondary piece 811A is detached from the first object 101 (step 4B; step of detaching the first secondary piece).

In the sixth embodiment, fitting of the second coil connector 131 is released, and the first secondary piece 811A is rotated around the second connecting pin 869A. Consequently, fitting of the second coil connector 131 is released, and the first secondary piece 811A is detached from the first object 101. At the same time, the second unit 811 is put in an open state together with the second transmission/reception unit 826.

The second secondary piece 811B is removed from the second object 102 (step 4C; step of detaching the second secondary piece).

In the sixth embodiment, the second secondary piece 811B is pulled out to left side. Consequently, fitting of the second main connector portion 128 and the second mating connector portion 109 is released and the second secondary piece 811B is detached from the second object 102.

By making the second shaft portion 106 pass through the open space on the rear side of the first secondary piece 811A and the second secondary piece 811B, the second unit 811 is detached from the second object 102.

Thus, the method of detaching the wireless connector 803 is finished, and the wireless connector 803 is detached from the object (101, 102).

In the wireless connector 803 according to the sixth embodiment, the order of performing the first unit detaching step (step 3) and the second unit detaching step (step 4) may be replaced. In step 3, the order of performing the first primary piece detaching step (step 3B) and the second primary piece detaching step (step 3C) may be replaced. Similarly, in step 4, the order of performing the first secondary piece detaching step (step 4B) and the second secondary piece detaching step (step 4C) may be replaced.

According to the sixth embodiment, similarly to the above-mentioned first embodiment, when the first main connector portion 115 and the second main connector portion 128 are attached to the first mating connector portion 108 and the second mating connector portion 109, respectively, the first transmission/reception unit 813 and the second transmission/reception unit 826 are disposed in a state of being faced to each other in a non-contact manner along the rotation axis AR outside the first object 101 and the second object 102 so as to wirelessly transmit the electric power.

In other words, when the first unit 810 and the second unit 811 are attached to the first object 101 and the second object 102, respectively, the first transmission/reception unit 813 and the second transmission/reception unit 826 are disposed in a state of being faced to each other in a non-contact manner so as to wirelessly transmit the electric power. In this case, the first coil 812 and the second coil 825 are arranged in parallel with each other in a state of being faced to each other in a non-contact manner so as to wirelessly transmit the electric power.

Thus, it is possible to wirelessly transmit the electric power between the first object 101 and the second object 102 without providing parts interfering with each other between the first unit 810 and the second unit 811 or a part restricting the rotation range of the first object 101 and the second object 102 when the first object 101 and the second object 102 are relatively rotated.

Similarly to the above-mentioned first embodiment, the wireless connector 803 according to the sixth embodiment can wirelessly transmit the electric power between the first object 101 and the second object 102 without restricting the relative rotation range between the first object 101 and the second object 102. In addition, similarly to the wireless connector 103 according to the above-mentioned first embodiment, the wireless connector 803 can easily be attached to and detached from the first object 101 and the second object 102 from the outside. Therefore, it is possible to quickly repair the wireless connector 803 when failure occurs.

Further, in the sixth embodiment, the first primary piece 810A and the second primary piece 810B are connected by the first connecting mechanism 863. Therefore, the first unit 810 can more easily be attached and detached than the above-mentioned first embodiment. Since the first secondary piece 811A and the second secondary piece 811B are connected by the second connecting mechanism 868, the second unit 811 can more easily be attached and detached than the above-mentioned first embodiment. Therefore, attachment to and detachment from the first object 101 and the second object 102 from the outside can more easily be performed. Thus, it is possible to further quickly repair the wireless connector 803 when failure occurs.

Heretofore, the embodiments and the modifications of the present invention have been described. However, the present invention is not limited thereto. For example, the present invention also encompasses modes obtained by appropriately combining a part or a whole of the embodiments and the modifications described above, as well as modes obtained by adding any modification to the above-mentioned modes.

DESCRIPTION OF REFERENCE NUMERALS 100, 500, 600, 700, 800 robot device
101 first object
102 second object
103, 203, 303, 403, 503, 603, 703, 803 wireless connector
AR rotation axis
104 base portion
105 first shaft portion
106 second shaft portion
107 different member connecting portion
108 first mating connector portion
109 second mating connector portion
110, 210, 310, 410, 510, 610, 710, 810 first unit
110A, 210A, 310A, 410A, 510A, 610A, 710A, 810A first primary piece
110B, 210B, 310B, 410B, 510B, 610B, 710B, 810B second primary piece
111, 211, 311, 411, 511, 611, 711, 811 second unit
111A, 211A, 311A, 411A, 511A, 611A, 711A, 811A first secondary piece
111B, 211B, 311B, 411B, 511B, 611B, 711B, 811B second secondary piece
112, 412, 512, 612, 812 first coil
113, 213, 313, 413, 513, 613, 713, 813 first transmission/reception unit
114, 314, 714, 814A, 814B first guide portion
115 first main connector portion
116, 216, 316, 716 first holding plate
117, 417, 517 first protrusion
118, 418, 518, 618 first coil connector
119 first peripheral surface portion
120 first spacer
121 first circuit portion
122 power transmission circuit
123 first bolt
124 first bolt hole
125, 425, 525, 625, 825 second coil
126, 226, 326, 426, 526, 626, 726, 826 second transmission/reception unit
127, 327, 727, 827A, 827B second guide portion
128 second main connector portion
129, 229, 329, 729 second holding plate
130, 430, 530 second protrusion
131, 431, 531, 631 second coil connector
132 second peripheral surface portion
133 second spacer
134 second circuit portion
135 power reception circuit
136 second bolt
137 second bolt hole
438, 538, 638 first holding portion
439, 539, 639 second holding portion
640 first annular groove portion
641 second annular groove portion
742 elastic member
743 first protective cover portion
744 second protective cover portion
745 first flat plate portion
746 first protruding portion
747 first inner groove portion
748 first outer groove portion
749 first inner sealing member
750 first outer sealing member
751 first coil cover portion
751A first annular flat plate portion
751B first outer wall portion
751C first inner wall portion
752 first connection cover portion
752A first interposed portion
752B first elastic portion
753 first connector cover portion
754 second flat plate portion
755 second protruding portion
756 second inner groove portion 757 second outer groove portion
758 second inner sealing member
759 second outer sealing member
760 second coil cover portion
760A second annular flat plate portion
760B second outer wall portion
760C second inner wall portion
761 second connection cover portion
761A second interposed portion
761B second elastic portion
762 second connector cover portion
814A first primary guide piece
814B second primary guide piece
827A first secondary guide piece
827B second secondary guide piece
863 first connecting mechanism
864 first connecting element
864A first connecting pin
864B first fastener
865 first connection wiring
866A first primary guide body
866B second primary guide body
867A first primary connecting segment
867B second primary connecting segment
868 second connecting mechanism
869 second connecting element
869A second connecting pin
869B second fastener
870 second connection wiring
871A first secondary guide body
871B second secondary guide body
872A first secondary connecting segment
872B second secondary connecting segment

The invention claimed is:

1. A wireless connector attaching and detaching method for attaching and detaching a wireless connector to and from a first object and a second object which are rotatably connected around a rotation axis, the wireless connector being configured to wirelessly transmit electric power between the first object and the second object, wherein:
the wireless connector includes:
a first unit including a first transmission/reception unit provided with a first coil configured to wirelessly transmit the electric power and composed of a plurality of first coil parts which are separable from each other or which are separable at one position and bendable with respect to each other; and a first main connector portion configured to transmit the electric power to/from the first object; and
a second unit including a second transmission/reception unit provided with a second coil configured to wirelessly transmit the electric power to/from the first coil and composed of a plurality of second coil parts which are separable from each other or which are separable at one position and bendable with respect to each other; and a second main connector portion configured to transmit the electric power to/from the second object;
the first transmission/reception unit being configured to be openable and closable, and configured to be annular when the first transmission/reception unit is closed so that the first coil is formed by connecting the plurality of first coil parts via one or a plurality of first coil connectors;
the second transmission/reception unit being configured to be openable and closable, and configured to be annular when the second transmission/reception unit is closed so that the second coil is formed by connecting the plurality of second coil parts via one or a plurality of second coil connectors,
the wireless connector attaching and detaching method including:
a step of attaching the wireless connector to the first object and the second object in a state where the first transmission/reception unit and the second transmission/reception unit are faced to each other in a non-contact manner so as to wirelessly transmit the electric power; and
a step of detaching the wireless connector from the first object and the second object;
the step of attaching including:
a step of fitting the one or the plurality of first coil connectors from the outside of the first object so that the first transmission/reception unit is disposed in a closed annular shape so as to surround the rotation axis and that the first main connector portion is attached to the first object; and
a step of fitting the one or the plurality of second coil connectors from the outside of the second object so that the second transmission/reception unit is disposed in a closed annular shape so as to surround the rotation axis and that the second main connector portion is attached to the second object;
the step of detaching including:
a step of releasing fitting of the one or the plurality of first coil connectors by work outside the first object so that the first transmission/reception unit is put into an open state and that the first main connector portion is detached from the first object; and
a step of releasing fitting of the one or the plurality of second coil connectors by work outside the second object so that the second transmission/reception unit is put into an open state and that the second main connector portion is detached from the second object.

2. The wireless connector attaching and detaching method according to claim 1, wherein:
the first coil comprises the plurality of first coil parts separable from each other;
the second coil comprising the plurality of second coil parts separable from each other;
the first transmission/reception unit being configured to be separable at a plurality of positions to be openable and closable and configured to be annular when the first transmission/reception unit is closed so that the first coil is formed by connecting the plurality of first coil parts via the plurality of first coil connectors;
the first unit being assembled to be divisible into first to i-th primary pieces (i being an integer not smaller than 2), which are not annular, so that the first coil is separated into the plurality of first coil parts by releasing fitting of the plurality of first coil connectors;
the second transmission/reception unit being configured to be separable at a plurality of positions to be openable and closable and configured to be annular when the second transmission/reception unit is closed so that the second coil is formed by connecting the plurality of second coil parts via the plurality of second coil connectors;
the second unit being assembled to be divisible into first to j-th secondary pieces (j being an integer not smaller than 2), which are not annular, so that the second coil is separated into the plurality of second coil parts by releasing fitting of the plurality of second coil connectors;

the step of attaching including:
a step of fitting the plurality of first coil connectors from the outside of the first object so that the first transmission/reception unit is disposed in a closed annular shape so as to surround the rotation axis and that the first main connector portion is attached to the first object; and
a step of fitting the plurality of second coil connectors from the outside of the second object so that the second transmission/reception unit is disposed in a closed annular shape so as to surround the rotation axis and that the second main connector portion is attached to the second object.

3. The wireless connector attaching and detaching method according to claim 1, wherein:
the first coil comprises the plurality of first coil parts which are separable at one position and bendable with respect to each other;
the second coil comprises the plurality of second coil parts which are separable at one position and bendable with respect to each other;
the first unit includes:
first to i-th primary pieces (i being an integer not smaller than 2) which are not annular and which include, respectively, the plurality of first coil parts bendable with respect to each other; and
a first connecting mechanism for connecting adjacent ones of the first to the i-th primary pieces so that the first coil is opened in a state of being bent into the plurality of first coil parts by releasing fitting of the one first coil connector;
the second unit includes:
first to j-th secondary pieces (j being an integer not smaller than 2) which are not annular and which include, respectively, the plurality of second coil parts bendable with respect to each other; and
a second connecting mechanism for connecting adjacent ones of the first to the j-th secondary pieces so that the second coil is opened in a state of being bent into the plurality of second coil parts by releasing fitting of the one second coil connector.

4. A robot device including:
a first object and a second object which are connected to each other to be rotatable around a rotation axis; and
a wireless connector for wirelessly transmitting electric power between the first object and the second object;
wherein the first object includes a first mating connector portion exposed to the outside;
wherein the second object includes a second mating connector portion exposed to the outside;
wherein the wireless connector comprises:
a first unit including:
a first transmission/reception unit provided with a first coil configured to wirelessly transmit the electric power and composed of a plurality of first coil parts which are separable from each other or which are separable at one position and bendable with respect to each other; and
a first main connector portion connected to the first mating connector portion in order to transmit the electric power to/from the first object;
a second unit including:
a second transmission/reception unit provided with a second coil configured to transmit the electric power to/from the first coil and composed of a plurality of second coil parts which are separable from each other or which are separable at one position and bendable with respect to each other; and
a second main connector portion connected to the second mating connector portion in order to transmit the electric power to/from the second object;
wherein the first transmission/reception unit is configured to be openable and closable and configured to be annular when the first transmission/reception unit is closed so that the first coil is formed by connecting the plurality of first coil parts via one or a plurality of first coil connectors;
wherein the second transmission/reception unit is configured to be openable and closable and configured to be annular when the second transmission/reception unit is closed so that the second coil is formed by connecting the plurality of second coil parts via one or a plurality of second coil connectors;
wherein the first transmission/reception unit and the second transmission/reception unit are arranged, when the first unit and the second unit are attached to the first object and the second object, respectively, each in a closed annular state and in a state of being faced to each other in a non-contact manner so as to transmit the electric power outside the first object and the second object.

5. The robot device according to claim 4, wherein:
the first coil comprises the plurality of first coil parts separable from each other;
the second coil comprises the plurality of second coil parts separable from each other;
the first transmission/reception unit is configured to be separable at a plurality of positions to be openable and closable and configured to be annular when the first transmission/reception unit is closed so that the first coil is formed by connecting the plurality of first coil parts via the plurality of first coil connectors;
the first unit is assembled to be divisible into first to i-th primary pieces (i being an integer not smaller than 2), which are not annular, so that the first coil is separated into the plurality of first coil parts by releasing fitting of the plurality of first coil connectors;
the second transmission/reception unit is configured to be separable at a plurality of positions to be openable and closable and configured to be annular when the second transmission/reception unit is closed so that the second coil is formed by connecting the plurality of second coil parts via the plurality of second coil connectors; and
the second unit is assembled to be divisible into first to j-th secondary pieces (j being an integer not smaller than 2), which are not annular, so that the second coil is separated into the plurality of second coil parts by releasing fitting of the plurality of second coil connectors.

6. The robot device according to claim 4, wherein:
the first coil comprises the plurality of first coil parts which are separable at one position and bendable with respect to each other;
the second coil comprises the plurality of second coil parts which are separable at one position and bendable with respect to each other;
the first unit includes:
first to i-th primary pieces (i being an integer not smaller than 2) which are not annular and which include, respectively, the plurality of first coil parts bendable with respect to each other; and
a first connecting mechanism for connecting adjacent ones of the first to the i-th primary pieces so that the first coil is opened in a state of being bent into the plurality of first coil parts by releasing fitting of the one first coil connector;

the second unit includes:

first to j-th secondary pieces (j being an integer not smaller than 2) which are not annular and which include, respectively, the plurality of second coil parts bendable with respect to each other; and a second connecting mechanism for connecting adjacent ones of the first to the j-th secondary pieces so that the second coil is opened in a state of being bent into the plurality of second coil parts by releasing fitting of the one second coil connector.

7. The robot device according to claim 4, wherein:

the wireless connector is attached to a recess formed at a connecting part of the first object and the second object so as not to protrude outward beyond the first object and the second object when viewed along the rotation axis.

8. A wireless connector for wirelessly transmitting electric power between a first object and a second object, the wireless connector including:

a first unit detachably attached to the first object from the outside of the first object; and a second unit detachably attached to the second object from the outside of the second object;

wherein the first unit includes:

a first transmission/reception unit provided with a first coil configured to wirelessly transmit the electric power and composed of a plurality of first coil parts which are separable from each other or which are separable at one position and bendable with respect to each other; and a first main connector portion for transmitting the electric power to/from the first object by being detachably attached to the first object from the outside of the first object;

wherein the second unit includes:

a second transmission/reception unit provided with a second coil configured to wirelessly transmit the electric power to/from the first coil of the first transmission/reception unit and composed of a plurality of second coil parts which are separable from each other or which are separable at one position and bendable with respect to each other; and a second main connector portion for transmitting the electric power to/from the second object by being detachably attached to the second object from the outside of the second object;

wherein the first transmission/reception unit is configured to be openable and closable and configured to be annular when the first transmission/reception unit is closed so that the first coil is formed by connecting the plurality of first coil parts via one or a plurality of first coil connectors;

wherein the second transmission/reception unit is configured to be openable and closable and configured to be annular when the second transmission/reception unit is closed so that the second coil is formed by connecting the plurality of second coil parts via one or a plurality of second coil connectors;

wherein the first transmission/reception unit and the second transmission/reception unit are arranged, when the first unit and the second unit are attached to the first object and the second object, respectively, each in a closed annular state and in a state of being faced to each other in a non-contact manner so as to wirelessly transmit the electric power.

9. The wireless connector according to claim 8, wherein:

the first coil comprises the plurality of first coil parts separable from each other;

the second coil comprises the plurality of second coil parts separable from each other;

the first transmission/reception unit is configured to be separable at a plurality of positions to be openable and closable and configured to be annular when the first transmission/reception unit is closed so that the first coil is formed by connecting the plurality of first coil parts via the plurality of first coil connectors;

the first unit is assembled to be divisible into first to i-th primary pieces (i being an integer not smaller than 2), which are not annular, so that the first coil is separated into the plurality of first coil parts by releasing fitting of the plurality of first coil connectors;

the second transmission/reception unit is configured to be separable at a plurality of positions to be openable and closable and configured to be annular when the second transmission/reception unit is closed so that the second coil is formed by connecting the plurality of second coil parts via the plurality of second coil connectors; and the second unit is assembled to be divisible into first to j-th secondary pieces (j being an integer not smaller than 2), which are not annular, so that the second coil is separated into the plurality of second coil parts by releasing fitting of the plurality of second coil connectors.

10. The wireless connector according to claim 8, wherein:

the first coil comprises the plurality of first coil parts which are separable at one position and bendable with respect to each other;

the second coil comprises the plurality of second coil parts which are separable at one position and bendable with respect to each other;

the first unit includes:

first to i-th primary pieces (i being an integer not smaller than 2) which are not annular and which include, respectively, the plurality of first coil parts bendable with respect to each other; and a first connecting mechanism for connecting adjacent ones of the first to the i-th primary pieces so that the first coil is opened in a state of being bent into the plurality of first coil parts by releasing fitting of the one first coil connector;

the second unit includes:

first to j-th secondary pieces (j being an integer not smaller than 2) which are not annular and which include, respectively, the plurality of second coil parts bendable with respect to each other; and a second connecting mechanism for connecting adjacent ones of the first to the j-th secondary pieces so that the second coil is opened in a state of being bent into the plurality of second coil parts by releasing fitting of the one second coil connector.

11. A wireless connector for wirelessly transmitting electric power between a first object and a second object; the wireless connector including:

a first unit detachably attached to the first object from the outside of the first object; and a second unit detachably attached to the second object from the outside of the second object;

wherein the first unit includes:

a first transmission/reception unit provided with a first coil configured to wirelessly transmit the electric power and composed of a plurality of first coil parts which are separable from each other or which are separable at one position and bendable with respect to each other; and a first main connector portion for transmitting the electric power to/from the first object by being detachably attached to the first object from the outside of the first object;

wherein the second unit includes:

a second transmission/reception unit provided with a second coil configured to wirelessly transmit the electric power to/from the first coil of the first transmission/reception unit and composed of a plurality of second coil parts which are separable from each other or which are separable at one position and bendable with respect to each other; and a second main connector portion for transmitting the electric power to/from the second object by being detachably attached to the second object from the outside of the second object;

wherein the first transmission/reception unit is configured to be openable and closable and configured to be annular when the first transmission/reception unit is closed so that the first coil is formed by connecting the plurality of first coil parts via one or a plurality of first coil connectors;

wherein the second transmission/reception unit is configured to be openable and closable and configured to be annular when the second transmission/reception unit is closed so that the second coil is formed by connecting the plurality of second coil parts via one or a plurality of second coil connectors;

wherein the first coil and the second coil are arranged, when the first unit and the second unit are attached to the first object and the second object, respectively, each in a closed annular state and in parallel to each other in a state of being faced to each other in a non-contact manner so as to wirelessly transmit the electric power.

12. The wireless connector according to claim 11, wherein:

the first coil comprises the plurality of first coil parts separable from each other;

the second coil comprises the plurality of second coil parts separable from each other;

the first transmission/reception unit are configured to be separable at a plurality of positions to be openable and closable and configured to be annular when the first transmission/reception unit is closed so that the first coil is formed by connecting the plurality of first coil parts via the plurality of first coil connectors;

the first unit is assembled to be divisible into first to i-th primary pieces (i being an integer not smaller than 2), which are not annular, so that the first coil is separated into the plurality of first coil parts by releasing fitting of the plurality of first coil connectors;

the second transmission/reception unit is configured to be separable at a plurality of positions to be openable and closable and configured to be annular when the second transmission/reception unit is closed so that the second coil is formed by connecting the plurality of second coil parts via the plurality of second coil connectors; and the second unit is assembled to be divisible into first to j-th secondary pieces (j being an integer not smaller than 2), which are not annular, so that the second coil is separated into the plurality of second coil parts by releasing fitting of the plurality of second coil connectors.

13. The wireless connector according to claim 11, wherein:

the first coil comprises the plurality of first coil parts which are separable at one position and bendable with respect to each other;

the second coil comprises the plurality of second coil parts which are separable at one position and bendable with respect to each other;

the first unit includes:

first to i-th primary pieces (i being an integer not smaller than 2) which are not annular and which include, respectively, the plurality of first coil parts bendable with respect to each other; and a first connecting mechanism for connecting adjacent ones of the first to the i-th primary pieces so that the first coil is opened in a state of being bent into the plurality of first coil parts by releasing fitting of the one first coil connector;

the second unit includes:

first to j-th secondary pieces (j being an integer not smaller than 2) which are not annular and which include, respectively, the plurality of second coil parts bendable with respect to each other; and a second connecting mechanism for connecting adjacent ones of the first to the j-th secondary pieces so that the second coil is opened in a state of being bent into the plurality of second coil parts by releasing fitting of the one second coil connector.

14. A wireless connector for wirelessly transmitting electric power between a first object and a second object, the wireless connector including:

a first unit detachably attached to the first object from the outside of the first object; and a second unit detachably attached to the second object from the outside of the second object;

wherein the first unit includes:

a first transmission/reception unit provided with a first coil configured to wirelessly transmit the electric power and composed of a plurality of first coil parts which are separable from each other or which are separable at one position and bendable with respect to each other; and a first main connector portion for transmitting the electric power to/from the first object by being detachably attached to the first object from the outside of the first object;

wherein the second unit includes:

a second transmission/reception unit provided with a second coil configured to wirelessly transmit the electric power to/from the first coil of the first transmission/reception unit and composed of a plurality of second coil parts which are separable from each other or which are separable at one position and bendable with respect to each other; and a second main connector portion for transmitting the electric power to/from the second object by being detachably attached to the second object from the outside of the second object;

wherein the first transmission/reception unit is configured to be openable and closable and configured to be annular when the first transmission/reception unit is closed so that the first coil is formed by connecting the plurality of first coil parts via one or a plurality of first coil connectors;

wherein the second transmission/reception unit is configured to be openable and closable and configured to be annular when the second transmission/reception unit is closed so that the second coil is formed by connecting the plurality of second coil parts via one or a plurality of second coil connectors;

wherein the first coil and the second coil are arranged, when the first unit and the second unit are attached to the first object and the second object, respectively, each in a closed annular state and in parallel to each other in a state of being faced to each other in a non-contact manner so as to be magnetically coupled to each other.

15. The wireless connector according to claim 14, wherein:
the first coil comprises the plurality of first coil parts separable from each other;
the second coil comprises the plurality of second coil parts separable from each other;
the first transmission/reception unit is configured to be separable at a plurality of positions to be openable and closable and configured to be annular when the first transmission/reception unit is closed so that the first coil is formed by connecting the plurality of first coil parts via the plurality of first coil connectors;
the first unit is assembled to be divisible into first to i-th primary pieces (i being an integer not smaller than 2), which are not annular, so that the first coil is separated into the plurality of first coil parts by releasing fitting of the plurality of first coil connectors;
the second transmission/reception unit is configured to be separable at a plurality of positions to be openable and closable and configured to be annular when the second transmission/reception unit is closed so that the second coil is formed by connecting the plurality of second coil parts via the plurality of second coil connectors; and
the second unit is assembled to be divisible into first to j-th secondary pieces (j being an integer not smaller than 2), which are not annular, so that the second coil is separated into the plurality of second coil parts by releasing fitting of the plurality of second coil connectors.

16. The wireless connector according to claim 14, wherein:
the first coil comprises the plurality of first coil parts which are separable at one position and bendable with respect to each other;
the second coil comprises the plurality of second coil parts which are separable at one position and bendable with respect to each other;
the first unit includes:
first to i-th primary pieces (i being an integer not smaller than 2) which are not annular and which include, respectively, the plurality of first coil parts bendable with respect to each other; and
a first connecting mechanism for connecting adjacent ones of the first to the i-th primary pieces so that the first coil is opened in a state of being bent into the plurality of first coil parts by releasing fitting of the one first coil connector;
the second unit includes:
first to j-th secondary pieces (j being an integer not smaller than 2) which are not annular and which include, respectively, the plurality of second coil parts bendable with respect to each other; and
a second connecting mechanism for connecting adjacent ones of the first to the j-th secondary pieces so that the second coil is opened in a state of being bent into the plurality of second coil parts by releasing fitting of the one second coil connector.

17. The wireless connector according to claim 8, wherein:
the first object and the second object are connected to each other to be rotatable around a rotation axis;

each of the first transmission/reception unit and the second transmission/reception unit forms, in a closed state, a circular annular shape having a through-hole centered on the rotation axis or a polygonal annular shape having the through-hole.

18. The wireless connector according to claim 8, wherein:
the first object and the second object are connected to each other to be rotatable around a rotation axis; and
each of the first coil and the second coil is arranged, in a state where each of the first transmission/reception unit and the second transmission/reception unit is closed, in a circular annular region having a through-hole centered on the rotation axis or a polygonal annular region having the through-hole.

19. The wireless connector according to claim 8, wherein:
the first object and the second object are connected to each other to be rotatable around a rotation axis; and
each of the first transmission/reception unit and the second transmission/reception unit forms, in a closed state, a circular disk shape having a through-hole centered on the rotation axis.

20. The wireless connector according to claim 8, wherein:
each of the first coil and the second coil forms a spiral shape in a state where each of the first transmission/reception unit and the second transmission/reception unit is closed.

21. The wireless connector according to claim 8,
wherein the first transmission/reception unit includes:
the first coil which is openable at least at one position so that the first coil is formed by connecting the plurality of first coil parts via the one or the plurality of first coil connectors; and
a first holding portion which has one main surface provided with the first coil and which is separable at a position common to the first coil;
wherein the second transmission/reception unit includes:
the second coil which is openable at least at one position so that the second coil is formed by connecting the plurality of second coil parts via the one or the plurality of second coil connectors; and
a second holding portion which has one main surface provided with the second coil and which is separable at a position common to the second coil,
wherein the one main surface of the first holding portion and the one main surface of the second holding portion are those surfaces of the first holding portion and the second holding portion which are close to each other.

22. The wireless connector according to claim 8,
wherein the first transmission/reception unit includes:
the first coil which is openable at least at one position so that the first coil is formed by connecting the plurality of first coil parts via the one or the plurality of first coil connectors; and
a first holding portion which accommodates the first coil and which is separable at a position common to the first coil;
wherein the second transmission/reception unit includes:
the second coil which is openable at least at one position so that the second coil is formed by connecting the plurality of second coil parts via the one or the plurality of second coil connectors; and
a second holding portion which accommodates the second coil and which is separable at a position common to the second coil.

23. The wireless connector according to claim 8, wherein:
the first object and the second object are connected to each other to be rotatable around a rotation axis;

each of the first transmission/reception unit and the second transmission/reception unit has, in a closed state, a cylindrical shape having a through-hole centered on the rotation axis.

24. The wireless connector according to claim 23, wherein:
each of the first transmission/reception unit and the second transmission/reception unit has, in the closed state, a circular cylindrical shape.

25. The wireless connector according to claim 23, wherein:
each of the first coil and the second coil has a spiral shape along the rotation axis in a state where each of the first transmission/reception unit and the second transmission/reception unit is closed.

26. The wireless connector according to claim 23, wherein:
the first transmission/reception unit and the second transmission/reception unit are configured so that, when attached to the first object and the second object, respectively, the first transmission/reception unit and the second transmission/reception unit are spaced from each other along the rotation axis in the closed state.

27. The wireless connector according to claim 26, wherein the first transmission/reception unit includes:
the first coil which is openable at least at one position so that the first coil is formed by connecting the plurality of first coil parts via the one or the plurality of first coil connectors; and
a first holding portion of a cylindrical shape which is provided with the first coil on an inner surface or an outer surface thereof and which is separable at a position common to the first coil;
wherein the second transmission/reception unit includes:
the second coil which is openable at least at one position so that the second coil is formed by connecting the plurality of second coil parts via the one or the plurality of second coil connectors; and
a second holding portion of a cylindrical shape which is provided with the second coil on an inner surface or an outer surface thereof and which is separable at a position common to the second coil.

28. The wireless connector according to claim 26, wherein the first transmission/reception unit includes:
the first coil which is openable at least at one position so that the first coil is formed by connecting the plurality of first coil parts via the one or the plurality of first coil connectors; and
a first holding portion of a cylindrical shape which accommodates the first coil and which is separable at a position common to the first coil;
wherein the second transmission/reception unit includes:
the second coil which is openable at least at one position so that the second coil is formed by connecting the plurality of second coil parts via the one or the plurality of second coil connectors; and
a second holding portion of a cylindrical shape which accommodates the second coil and which is separable at a position common to the second coil.

29. The wireless connector according to claim 23, wherein:
the first transmission/reception unit and the second transmission/reception unit, each in the closed state, are disposed so as to overlap each other when viewed from a direction perpendicular to the rotation axis by fitting the second transmission/reception unit to an inside of the first transmission/reception unit with a gap left therefrom.

30. The wireless connector according to claim 29, wherein the first transmission/reception unit includes:
the first coil which is openable at least at one position so that the first coil is formed by connecting the plurality of first coil parts via the one or the plurality of first coil connectors; and
a first holding portion of a cylindrical shape which is provided with the first coil on an inner surface thereof and which is separable at a position common to the first coil;
wherein the second transmission/reception unit includes:
the second coil which is openable at least at one position so that the second coil is formed by connecting the plurality of second coil parts via the one or the plurality of second coil connectors; and
a second holding portion of a cylindrical shape which is provided with the second coil on an outer surface thereof and which is separable at a position common to the second coil.

31. The wireless connector according to claim 29, wherein the first transmission/reception unit includes:
the first coil which is openable at least at one position so that the first coil is formed by connecting the plurality of first coil parts via the one or the plurality of first coil connectors; and
a first holding portion of a cylindrical shape which accommodates the first coil and which is separable at a position common to the first coil;
wherein the second transmission/reception unit includes:
the second coil which is openable at least at one position so that the second coil is formed by connecting the plurality of second coil parts via the one or the plurality of second coil connectors; and
a second holding portion of a cylindrical shape which accommodates the second coil and which is separable at a position common to the second coil.

32. A wireless connector for wirelessly transmitting electric power between a first object and a second object which are connected to each other to be rotatable around a rotation axis, the wireless connector including:
a first unit detachably attached to the first object from the outside of the first object; and
a second unit detachably attached to the second object from the outside of the second object;
wherein the first unit includes:
a first transmission/reception unit provided with a first coil configured to wirelessly transmit the electric power and composed of a plurality of first coil parts which are separable from each other or which are separable at one position and bendable with respect to each other; and
a first main connector portion for transmitting the electric power to/from the first object by being detachably attached to the first object from the outside of the first object;
wherein the second unit includes:
a second transmission/reception unit provided with a second coil configured to wirelessly transmit the electric power to/from the first coil of the first transmission/reception unit and composed of a plurality of second coil parts which are separable from each other or which are separable at one position and bendable with respect to each other; and
a second main connector portion for transmitting the electric power to/from the second object by being detachably attached to the second object from the outside of the second object;

wherein the first transmission/reception unit is configured to be openable and closable and configured to be annular when the first transmission/reception unit is closed so that the first coil is formed by connecting the plurality of first coil parts via one or a plurality of first coil connectors;

wherein the second transmission/reception unit is configured to be openable and closable and configured to be annular when the second transmission/reception unit is closed so that the second coil is formed by connecting the plurality of second coil parts via one or a plurality of second coil connectors;

wherein the first transmission/reception unit and the second transmission/reception unit are spaced from each other along the rotation axis in a closed state so as to be disposed in a state of being faced to each other in a non-contact manner.

33. The wireless connector according to claim 32, wherein:

the first coil comprises the plurality of first coil parts separable from each other;

the second coil comprises the plurality of second coil parts separable from each other;

the first transmission/reception unit is configured to be separable at a plurality of positions to be openable and closable and configured to be annular when the first transmission/reception unit is closed so that the first coil is formed by connecting the plurality of first coil parts via the plurality of first coil connectors;

the first unit is assembled to be divisible into first to i-th primary pieces (i being an integer not smaller than 2), which are not annular, so that the first coil is separated into the plurality of first coil parts by releasing fitting of the plurality of first coil connectors;

the second transmission/reception unit is configured to be separable at a plurality of positions to be openable and closable and configured to be annular when the second transmission/reception unit is closed so that the second coil is formed by connecting the plurality of second coil parts via the plurality of second coil connectors; and the second unit is assembled to be divisible into first to j-th secondary pieces (j being an integer not smaller than 2), which are not annular, so that the second coil is separated into the plurality of second coil parts by releasing fitting of the plurality of second coil connectors.

34. The wireless connector according to claim 32, wherein:

the first coil comprises the plurality of first coil parts which are separable at one position and bendable with respect to each other;

the second coil comprises the plurality of second coil parts which are separable at one position and bendable with respect to each other;

the first unit includes:

first to i-th primary pieces (i being an integer not smaller than 2) which are not annular and which include, respectively, the plurality of first coil parts bendable with respect to each other; and a first connecting mechanism for connecting adjacent ones of the first to the i-th primary pieces so that the first coil is opened in a state of being bent into the plurality of first coil parts by releasing fitting of the one first coil connector;

the second unit includes:

first to j-th secondary pieces (j being an integer not smaller than 2) which are not annular and which include, respectively, the plurality of second coil parts bendable with respect to each other; and a second connecting mechanism for connecting adjacent ones of the first to the j-th secondary pieces so that the second coil is opened in a state of being bent into the plurality of second coil parts by releasing fitting of the one second coil connector.

35. A wireless connector for wirelessly transmitting electric power between a first object and a second object which are connected to each other to be rotatable around a rotation axis, the wireless connector including:

a first unit detachably attached to the first object from the outside of the first object; and a second unit detachably attached to the second object from the outside of the second object;

wherein the first unit includes:

a first transmission/reception unit provided with a first coil configured to wirelessly transmit the electric power and composed of a plurality of first coil parts which are separable from each other or which are separable at one position and bendable with respect to each other; and a first main connector portion for transmitting the electric power to/from the first object by being detachably attached to the first object from the outside of the first object;

wherein the second unit includes:

a second transmission/reception unit provided with a second coil configured to wirelessly transmit the electric power to/from the first coil of the first transmission/reception unit and composed of a plurality of second coil parts which are separable from each other or which are separable at one position and bendable with respect to each other; and a second main connector portion for transmitting the electric power to/from the second object by being detachably attached to the second object from the outside of the second object;

wherein the first transmission/reception unit is configured to be openable and closable and configured to be annular when the first transmission/reception unit is closed so that the first coil is formed by connecting the plurality of first coil parts via one or a plurality of first coil connectors;

wherein the second transmission/reception unit is configured to be openable and closable and configured to be annular when the second transmission/reception unit is closed so that the second coil is formed by connecting the plurality of second coil parts via one or a plurality of second coil connectors;

wherein the first transmission/reception unit and the second transmission/reception unit are spaced from each other along a direction perpendicular to the rotation axis in a closed state so as to be disposed in a state of being faced to each other in a non-contact manner.

36. The wireless connector according to claim 35, wherein:

the first coil comprises the plurality of first coil parts separable from each other;

the second coil comprises the plurality of second coil parts separable from each other;

the first transmission/reception unit is configured to be separable at a plurality of positions to be openable and closable and configured to be annular when the first transmission/reception unit is closed so that the first coil is formed by connecting the plurality of first coil parts via the plurality of first coil connectors;

the first unit is assembled to be divisible into first to i-th primary pieces (i being an integer not smaller than 2), which are not annular, so that the first coil is separated into the plurality of first coil parts by releasing fitting of the plurality of first coil connectors;

the second transmission/reception unit is configured to be separable at a plurality of positions to be openable and closable and configured to be annular when the second transmission/reception unit is closed so that the second coil is formed by connecting the plurality of second coil parts via the plurality of second coil connectors; and the second unit is assembled to be divisible into first to j-th secondary pieces (j being an integer not smaller than 2), which are not annular, so that the second coil is separated into the plurality of second coil parts by releasing fitting of the plurality of second coil connectors.

37. The wireless connector according to claim 35, wherein:

the first coil comprises the plurality of first coil parts which are separable at one position and bendable with respect to each other;

the second coil comprises the plurality of second coil parts which are separable at one position and bendable with respect to each other;

the first unit includes:

first to i-th primary pieces (i being an integer not smaller than 2) which are not annular and which include, respectively, the plurality of first coil parts bendable with respect to each other; and a first connecting mechanism for connecting adjacent ones of the first to the i-th primary pieces so that the first coil is opened in a state of being bent into the plurality of first coil parts by releasing fitting of the one first coil connector;

the second unit includes:

first to j-th secondary pieces (j being an integer not smaller than 2) which are not annular and which include, respectively, the plurality of second coil parts bendable with respect to each other; and a second connecting mechanism for connecting adjacent ones of the first to the j-th secondary pieces so that the second coil is opened in a state of being bent into the plurality of second coil parts by releasing fitting of the one second coil connector.

38. The wireless connector according to claim 8, wherein:
the first object and the second object are connected to each other to be rotatable around a rotation axis; and
each of the first transmission/reception unit and the second transmission/reception unit has a center which substantially coincides with a center of the rotation axis.

39. The wireless connector according to claim 8, wherein:
the first object and the second object are connected to each other to be rotatable around a rotation axis; and each of the first coil and the second coil has a center which substantially coincides with a center of the rotation axis.

40. The wireless connector according to claim 8, further comprising:

a protecting portion which includes an elastic member closing at least a part of a gap continuous to a facing space as a space between the first transmission/reception unit and the second transmission/reception unit in the state of being faced to each other, and which prevents intrusion of foreign matter into the facing space.

41. The wireless connector according to claim 40, wherein:

the protecting portion further includes a first protective cover portion and a second protective cover portion which seal and cover the first coil and the second coil in a closed state, respectively; and the elastic member has a base end provided in one of the first protective cover portion and the second protective cover portion, and a top end brought into contact with the other of the first protective cover portion and the second protective cover portion, thereby closing at least a part of the gap continuous to the facing space.

42. The wireless connector according to claim 8, wherein:
each of the first coil and the second coil includes a printed wiring.

43. The wireless connector according to claim 8, wherein:
each of the first coil and the second coil includes a conductor wire.

44. A wireless connector unit which constitutes a wireless connector for wirelessly transmitting electric power between two objects and which is attached to each of the objects; the wireless connector unit including:

a transmission/reception unit provided with a coil configured to wirelessly transmit the electric power and composed of a plurality of coil parts which are separable from each other or which are separable at one position and bendable with respect to each other; and a main connector portion for transmitting the electric power to/from the objects by being detachably attached to the objects from the outside of the objects;

wherein the transmission/reception unit is configured to be openable and closable and configured to be annular when the transmission/reception unit is closed so that the coil is formed by connecting the plurality of coil parts via at least one coil connector;

wherein the transmission/reception unit is disposed, when attached to one of the two objects in a closed state, in a state of being faced to a different transmission/reception unit in a non-contact manner so as to wirelessly transmit the electric power, the different transmission/reception unit being attached to the other of the two objects in the closed state.

* * * * *